US012108268B2

(12) United States Patent
McLean et al.

(10) Patent No.: US 12,108,268 B2
(45) Date of Patent: Oct. 1, 2024

(54) SYSTEM FOR MONITORING AND MEASURING MULTIPLE HETEROGENEOUS RADIO COMMUNICATIONS NETWORKS

(71) Applicant: RANLYTICS LIMITED, Chatswood (AU)

(72) Inventors: Brad McLean, Parramatta (AU); Keith Sheridan, Parramatta (AU)

(73) Assignee: RANLYTICS LIMITED, Chatswood (AU)

( * ) Notice: Subject to any disclaimer, the term of this patent is extended or adjusted under 35 U.S.C. 154(b) by 0 days.

(21) Appl. No.: 18/577,998

(22) PCT Filed: Jul. 8, 2022

(86) PCT No.: PCT/AU2022/050718
§ 371 (c)(1),
(2) Date: Jan. 9, 2024

(87) PCT Pub. No.: WO2023/279170
PCT Pub. Date: Jan. 12, 2023

(65) Prior Publication Data

US 2024/0284212 A1 Aug. 22, 2024

(30) Foreign Application Priority Data

Jul. 9, 2021 (AU) ................................ 2021902112
Jul. 9, 2021 (AU) ................................ 2021902113
Jul. 9, 2021 (AU) ................................ 2021902114

(51) Int. Cl.
*H04W 24/08* (2009.01)

(52) U.S. Cl.
CPC .................................. *H04W 24/08* (2013.01)

(58) Field of Classification Search
CPC ....... H04W 24/08; H04W 4/38; H04W 24/10; H04W 88/06; H04M 1/24
See application file for complete search history.

(56) References Cited

U.S. PATENT DOCUMENTS 9,143,968 B1 9/2015 Manku et al.
2004/0077352 A1 4/2004 Mahany
(Continued)

FOREIGN PATENT DOCUMENTS

CN 211047242 7/2020
CN 211047242 U 7/2020

OTHER PUBLICATIONS

Examination Report, AU App. No. 2022252814, Mailed Nov. 17, 2022, 5 pages.

*Primary Examiner* — Tu X Nguyen
(74) *Attorney, Agent, or Firm* — Berkeley Law & Technology Group, LLP

(57) ABSTRACT

The invention relates to an integrated system for the periodic or continuous monitoring of multiple heterogeneous radio communications networks, and the processing, storage and analysis of the measurement data generated from that monitoring. In particular, the present invention relates to a radio network monitoring device that is capable of periodically or continuously monitoring multiple heterogeneous radio communications networks, including of networks used for cellular, P25, TETRA, Wi-Fi, NB-IoT, LoRA, and CAT-M1/CAT-M2 communications; and a high-performance, and highly-scalable and extensible computer system that supports the processing, storing and analysis of large quantities of heterogeneous radio network measurement data received from multiple monitoring devices, and that assists in the understanding of the propagation characteristics and performance of those heterogeneous radio networks, and therefore supports the design, engineering, optimisation, operation, management, maintenance, support and benchmarking of those heterogeneous radio networks.

20 Claims, 7 Drawing Sheets

(A) Mobile handsets and scanning receivers
(B) Power source for handsets & scanners
(C) Wired or wireless tethers
(D) One or more bus, aggregation or other communication hub devices
(E) Power source for communication hubs
(F) Computer/tablet tethered to handsets, receivers and data processing device
(G) Centralised data processing device
(H) Power source for data processing devices
(J) One or more data storage devices
(K) Power source for data storage devices Legacy cellular RF measurement tool architecture comprising multiple separate physical components tethered together

(56) References Cited

U.S. PATENT DOCUMENTS

| | | | |
|---|---|---|---|
| 2005/0227625 | A1 | 10/2005 | Diener |
| 2011/0183685 | A1 | 7/2011 | Burton |
| 2019/0274059 | A1 | 9/2019 | Kleinbeck et al. |
| 2020/0194875 | A1 | 6/2020 | Tiner et al. |

Figure 1: Legacy cellular RF measurement tool architecture comprising multiple separate physical components tethered together Figure 2: Legacy P25 and TETRA RF measurement tool architecture comprising multiple separate physical components tethered together Figure 3: Functional architecture block diagram of the RF measurement device

SYSTEM FOR MONITORING AND MEASURING MULTIPLE HETEROGENEOUS RADIO COMMUNICATIONS NETWORKS

This application is filed under 35 USC § 371 based on PCT Application No. PCT/AU2022/050718, titled "A SYSTEM FOR MONITORING AND MEASURING MULTIPLE HETEROGENEOUS RADIO COMMUNICATIONS NETWORKS" filed Jul. 8, 2022, which claims the benefit of priority to Australian Appl. Nos. AU2021902112, titled "A SYSTEM FOR MONITORING AND MEASURING MULTIPLE HETEROGENEOUS RADIO COMMUNICATIONS NETWORKS," filed Jul. 9, 2021, AU2021902113, titled "A SYSTEM FOR MONITORING AND MEASURING MULTIPLE HETEROGENEOUS RADIO COMMUNICATIONS NETWORKS," filed Jul. 9, 2021, and AU2021902114, titled "A SYSTEM FOR MONITORING AND MEASURING MULTIPLE HETEROGENEOUS RADIO COMMUNICATIONS NETWORKS" filed Jul. 9, 2021, the subject matter of the above identified applications being incorporated herein by reference in their entirety.

FIELD OF THE INVENTION

The invention relates to an integrated system for the periodic or continuous monitoring of multiple heterogeneous radio communications networks, and the processing, storage and analysis of the measurement data generated from that monitoring. In particular, the present invention relates to a radio network monitoring device that is capable of periodically or continuously monitoring multiple heterogeneous radio communications networks, including of networks used for cellular, P25, TETRA, Wi-Fi, NB-IoT, LoRA, and CAT-M1/CAT-M2 communications; and a high-performance, and highly-scalable and extensible computer system that supports the processing, storing and analysis of large quantities of heterogeneous radio network measurement data received from multiple monitoring devices, and that assists in the understanding of the propagation characteristics and performance of those heterogeneous radio networks, and therefore supports the design, engineering, optimisation, operation, management, maintenance, support and benchmarking of those heterogeneous radio networks.

BACKGROUND

The radio frequency ("RF") spectrum is allocated by international agreement to numerous uses, including unlicensed communication technologies such as Wi-Fi, and licensed communication technologies such as cellular telephony, emergency services radio networks based on P25 and TETRA technologies, and internet-of-things (IOT) communications networks based on NB-IoT and CAT-M1/CAT-M2.

The part of the radio spectrum allocated to cellular telephony, NB-IoT and CAT-M1/CAT-M2 comprises a number of defined frequency bands. Each band in turn comprises a set of channels. Radio communication between network operators' cellular antennas and end users' mobile communication devices including cellular telephones, data communication modems, remotely controlled devices, autonomous vehicles, and Internet of Things ("IoT") end points use one or more of these bands or channels per communications session. The strict management of this arrangement is administered globally by the International Telecommunications Union ("ITU"), and in respective countries by government regulatory bodies, such as the Australian Communications and Media Authority.

Similarly, the part of the radio spectrum allocated to P25 and TETRA-based communications uses prescribed bands and channels; that support wireless communication between radio communications providers' antennas and 2-way radio system end points. The standards that administer the use of this spectrum are set by international groups that are affiliated with the ITU, and country-specific regulatory bodies.

The radio signals propagated by these various radio networks interact with both the built and natural environments in complex ways that are difficult to predict. Furthermore, the radio network equipment used to transmit these radio signals is frequently altered in an ongoing process of fine-tuning and optimisation by the operators of the respective radio networks. Consequently, the coverage and quality patterns of these radio networks are extremely complex and chaotic and are subject to frequent change. Because the wavelengths of regulated radio signals vary from approximately 36 kilometres at 8.3 kHz for meteorological aids to approximately 1 millimetre at 270 GHz for radionavigation satellite signals, significant changes in radio signal coverage and quality and therefore in the ability of these networks to provide effective coverage can occur over distances of metres to centimetres.

As a result, radio communications networks, and particularly cellular and P25/TETRA networks, must be measured as extensively and as frequently as possible, and detailed RF parameters collected by measuring these radio network and made available to radio engineers and others so as to inform the design, engineering, operation, optimisation, maintenance, support and benchmarking of these networks.

In any given country a given cellular operator typically owns and operates between 8 and 20 cellular bands in total, spanning 2G, 3G (or 'UMTS'), 4G (or 'LTE'), and 5G technologies. Each operator seeks to not only measure its own bands, but also those of its competitors for the purposes of competitive benchmarking and to inform its sales and marketing activities. So, in a typical market with between 3 and 5 operators, there will generally be between 25 and 60 cellular radio bands that must be measured as frequently and as extensively as possible.

Similarly, in any given country a P25 or TETRA network operator typically manages multiple bands for emergency services providers and first responders.

The equipment used to measure and analyse each network type differs, so that the equipment used to measure and analyse cellular networks differs from that used to measure and analyse emergency services/first responder networks such as P25 and TETRA; and the equipment used to measure and analyse Wi-Fi networks is different again.

Prior art radio testing and measurement systems and tools have been used to measure radio communications networks since the introduction of cellular telephony, 2-way trunked radio systems and Wi-Fi networks in the 1980s. These systems and tools are each specific to radio network type; are highly specialised, complex, and expensive; and must be operated be used by users with high degrees of technical skills and knowledge. Further, the systems and tools used for the processing, storage and analysis of radio network measurement data are each specific to the type of radio network that was measured, are complex and expensive, and can only be used by users with specialised technical skills.

Current radio network measurement and testing approaches use cellular handsets when measuring cellular networks; physically distinct and separate scanning radio receivers or P25 or TETRA radio transceivers when measuring P25 or TETRA networks respectively; and physically distinct and separate dedicated Wi-Fi scanners when measuring Wi-Fi networks. Therefore, all pre-existing radio network measurement and monitoring tools are complex, expensive, suffer reliability issues, and in the case of continuous monitoring, require secure installation—which limits their usefulness.

The need to closely administer handsets, scanning radio receivers and radios during testing and measurement of radio networks typically requires that the measurement equipment be installed inside vehicles when tests of large geographic areas are conducted, which results in the attenuation of the received radio signals because of the metal structure of the vehicle. The resulting measurement data is therefore inaccurate and require that appropriate compensations be calculated and applied after the data is collected, further complicating, and increasing the cost of the measurement process.

Furthermore, the testing, monitoring and measurement of these various radio networks can generate large amounts of radio network measurement data, which must be processed, stored, and made available to both technical and non-technical users for querying, reporting, and analysis, including temporal querying, reporting, and analysis.

Existing cellular radio network measurement data processing, management, and analysis systems and tools have been used to process and analyse measurement data pertaining to cellular radio communications networks since the introduction of cellular telephony in the 1980s. These systems and tools are highly specialised, expensive, and can only be used by users with high degrees of technical skills and knowledge. Additionally, processing, storage, and analysis of large amounts of cellular radio network measurement data is difficult and costly with these tools, and their ability to support the temporal analysis of this data is severely limited.

Similarly, different specialised systems and tools are used to process, store, and analyse the radio network measurement data resulting from the measurement and testing of P25 radio networks, of TETRA radio networks, and of other radio networks such as those supporting IoT and maritime, aircraft, military, and other private and government radio communications. All of these systems and tools are impacted by the same issues and constraints as those used for cellular radio network measurement data.

International Patent Application PCT/US2016/026118 disclosed a multi-receive multi-subscriber identity module (SIM) user equipment where one SIM or subscription may help with measurements of another SIM or subscription to help address the issue of large latency caused by insufficient measurement gaps. The apparatus has a first subscription served by a first radio access technology (RAT) and a second subscription served by a second RAT. The apparatus is adapted to forwarding a neighbour cell list from the first subscription to the second subscription when preparing for measurement. The apparatus is adapted to performing measurements of neighbours from the neighbour cell list by the second subscription, and forwarding the measurements of neighbours from the neighbour cell list, from the second subscription, to the first subscription. The first subscription may measure a portion of the neighbours from the neighbour list while the second subscription measures another portion of the neighbour. The second subscription may or may not tune from a serving RAT to perform the measurements. However, this equipment is limited to consumer-grade cellular handsets to test cellular radio networks and does not provide any flexibility on software or test configuration.

U.S. Pat. No. 7,983,667 discloses a system for generating a radio-frequency coverage map. The device implements a method that includes receiving coverage map data comprising a plurality of locations within a region, and an identification of a location in the plurality of locations corresponding to a radio transceiver. The locations within the region are represented by at least corresponding x- and y-terms of a Cartesian coordinate system. The system is adapted to receiving calibration data comprising a plurality of observed signal strength values at corresponding ones of the plurality of locations, converting the x- and y-terms of the locations of the coverage map data to corresponding first and second warped coordinate terms of a warped coordinate system, and computing, using linear interpolation and the first and second warped coordinate terms, predicted received signal strength values at one or more locations in the coverage map based on the calibration data. However, the system relies on relatively stable or non-mobile access points. The system is also not adapted to map different types of networks, such as cellular networks, concurrently, and nor does it measure non-cellular networks such as P25 or TETRA.

U.S. Pat. No. 8,526,961 discloses an apparatus for mapping an operating parameter in a coverage area of a wireless network. The apparatus is adapted to obtaining parameter measurements for an operating parameter associated with mobile stations operating in a select portion of a network coverage area for a wireless network. The network coverage area is formed by cellular coverage areas of the base stations therein. The select portion is formed by at least one base station. Each of the at least one base station includes multiple sector antennas. Each sector antenna defines a sector coverage area within the cellular coverage area. For each obtained parameter measurement, the apparatus is adapted to estimating an instant geographic location of the mobile station in relation to at least one base station, each instant geographic location based on a round trip measurement and a signal strength measurement associated with the mobile station. Each round trip measurement is associated with the serving base station. However, the apparatus relies on a relatively stable or non-mobile access point. It is also not adapted to map different types of networks concurrently Current radio communications network measurement, monitoring, and data analysis tools therefore suffer from a common set of constraints and issues, including:

- Reliance on consumer-grade cellular handsets to measure cellular radio networks and gather measurement data. Cellular handsets are easy to acquire and deploy, but are expensive, can often interrupt testing due to overheating, or because of software or test configuration issues; and consume significant amounts of electrical power that necessitates the use of heavy, cumbersome, and expensive auxiliary power or battery systems. In the case when all cellular radio bands used by multiple operators are measured concurrently, tools supporting dozens of handsets are required—increasing cost and complexity substantially, and reducing reliability.
- Radio handsets and scanning receivers are also used to measure P25, TETRA, NB-IoT or CAT-M1/CAT-M2 radio networks. Again, these tools are complex, require skilled technicians with specialised skills to operate, and suffer reliability issues; and auxiliary power is generally required.
- Centralised data processing and storage hubs to which multiple cellular handsets, scanners, and/or radio handsets ('UEs') are connected by physical tethers, with measurement data routed from UEs to the centralised hubs are required. These centralised hubs and the associated tethers constitute points of failure in complex systems, degrading overall reliability, and increasing the cost of measurement when failures require re-tests.

Computers are physically tethered to the data processing equipment to allow tests to be configured and administered.

In all configurations multiple separate physical devices are connected by physical or wireless tethers, all of which constitute potential points of failure, degrading reliability significantly.

Equipment complexity typically requires multi-person teams of skilled technicians to configure, monitor and operate the equipment, and to rectify failures and faults that are common during operation of the equipment, adding to the overall cost.

When measuring cellular networks, it is difficult and expensive to scale legacy test tools so as to fully measure all cellular radio technologies and bands—so it is common to only measure a subset of bands with band-specific cellular handsets, and use scanning receivers to collect data from remaining bands. This results in a mixture of high-quality data comprising hundreds of RF parameters captured by each handset and lower-quality data comprising less than 10 RF parameters captured by the scanning receiver. The result is an incomplete understanding of the coverage and quality of radio transmissions on all cellular bands.

It is impractical and economically unviable to measure radio communications networks, and particularly cellular and P25 & TETRA networks, as extensively and as frequently as is ideal. Consequently, cellular and P25 & TETRA radio network coverage and quality has historically been determined using a sampling and interpolation methodology whereby measurements are made on a small subset of the road network within a particular target area using test equipment carried in vehicles, and the resulting measurement data then used as the basis for interpolations and projections that estimate coverage and quality in those areas not driven. This leads to inaccurate radio network coverage maps, and to a poor understanding of coverage and quality, and of where coverage and quality issues exist. Thus, there is an unmet need for a system that is capable of accurately and cost-effectively measuring radio network coverage and quality extensively and frequently, and particularly that related to cellular and P25 & TETRA radio networks.

Multiple costly and complex systems and tools are required for the processing, storage and analysis of radio network measurement data relating to different types of radio networks. Furthermore, each of those systems and tools require specialised skills to use. Thus, there is an unmet need for a data processing, storage and analysis system for storing large amounts of radio network measurement data that results from the testing or measurement or monitoring of multiple heterogeneous radio communications networks, and for the temporal querying, visualisation and analysis of that data by both technically-skilled and lay users.

SUMMARY

It is an object for the present invention to provide an adaptable radio network monitoring device.

It is another object of the present invention to provide an adaptable radio network monitoring device that is capable of either separately or concurrently monitoring multiple instances of multiple heterogeneous radio communications networks and technologies, including those utilising multi-technology cellular, P25, TETRA, Wi-Fi, and IoT-specific networks including LoRA, NB-IoT and CAT-M1/CAT-M2, and of collecting comprehensive radio network measurement data accordingly.

It is another object of the present invention to provide a radio network monitoring device that eliminates the reliance on cellular handsets, P25 or TETRA radio handsets, Wi-Fi access points, scanning radio receivers and other items of user equipment so as to reduce complexity and cost, and to improve reliability.

It is another object of the present invention to provide a radio network monitoring device that can be configured to periodically measure or to continuously monitor multiple instances of multiple heterogeneous radio communications networks.

It is another object of the present invention to provide a radio network monitoring device that is fully self-contained and does not comprise multiple, physically separate components—so as to reduce complexity and cost, and to improve reliability.

It is another object of the present invention to provide a radio network monitoring device that is small and inconspicuous, enabling it to be readily installed in any indoor or outdoor environment for long-term continuous real-time or near real-time monitoring of multiple instances of multiple heterogeneous radio networks at fixed locations.

It is another object of the present invention to provide a radio network monitoring device that is sufficiently reliable and simple to use as to eliminate the dependency on skilled technicians to configure, administer and operate the radio network monitoring device.

It is another object of the present invention to provide a radio network monitoring device that can be installed easily at a fixed location for continuous or periodic monitoring of multiple instances of multiple heterogeneous radio networks without requiring specialised technical skills or experience.

It is another object of the present invention to provide a radio network monitoring device that can be deployed in a zero-touch configuration on vehicles to undertake measurements of multiple instances of multiple heterogeneous radio networks autonomously, automatically and without supervision, thereby supporting widescale and frequent measurement of radio networks with standard fleet vehicles, including those operated by postal and parcel/mail delivery operators, waste collection and disposal companies, taxi and ride share providers and by and on behalf of government agencies and departments such as those providing first responder and emergency response services.

It is another object of the present invention to provide a radio network monitoring device that can be provided at a price point that supports deployment at scale.

It is an object of the present invention to provide a data processing, storage, and analysis system adapted to process, store, and support the generation of reports pertaining to and the analysis of, radio network measurement data sourced from the testing, measurement and monitoring of multiple instances of multiple heterogeneous radio networks, including cellular, P25, TETRA, Wi-Fi, LoRA, NB-IoT, CAT-M1/CAT-M2, maritime, aircraft, military, and other private and government radio networks.

It is another object of the present invention to provide a data processing, storage, and analysis system adapted to persistently store very large amounts of radio network measurement data relating to multiple instances of multiple heterogeneous radio networks, and that makes all stored data available for immediate querying, visualisation, reporting and analysis by both technically-skilled and lay users; and that supports the temporal analysis of all radio network measurement data stored within it.

It is another object of the present invention to provide a data processing, storage, and analysis system adapted to provide a platform for the creation and deployment of automated and non-automated radio network measurement data analysis tools, including data analysis tools that employ artificial intelligence algorithms to identify certain patterns in the radio network measurement data, or in data derived from radio network measurement data.

It is another object of the present invention to provide a data processing, storage, and analysis system adapted to support the export of radio network measurement data, or of selected subsets of the radio network measurement data, or of data derived from the radio network measurement data, to external systems such as GIS platforms, marketing systems, and reporting tools.

It is another object of the present invention to provide a data processing, storage, and analysis system adapted to support the generation of reports containing radio network measurement data, or of data derived from radio network measurement data pertaining to multiple instances of multiple heterogeneous radio networks.

It is, therefore, an object of the present invention to provide a new and novel system for periodically or continuously monitoring, and for processing, storing and analysing the measurement data pertaining to, multiple heterogeneous radio communications networks.

Other objectives and advantages will become apparent when taken into consideration with the following specification and drawings.

It is also an object of the present invention to overcome or ameliorate at least one of the disadvantages of the prior art, or to provide a useful alternative.

In one aspect of the present invention, there is provided a radio network monitoring device comprising:

a plurality of removable or fixed network functional modules, wherein each network functional module comprises one or more cellular or other radios or radio transceivers; one or more internal antenna array modules adapted to receive and transmit radio signals; and one or more antenna interface modules and accompanying SMA, SMB, BNC, or similar antenna ports that support the connection of external antennas; and, one or more processing units removably connected to the plurality of network functional modules through one or more internal computer communication buses;

wherein the processing unit is adapted to dynamically reconfigure the plurality of network functional modules to continuously or periodically monitor each of multiple instances of multiple heterogeneous radio communications networks and collect a comprehensive range of radio network type-specific measurement data from each of those monitored networks, and to optionally analyse the collected measurement data and generate events when any RF parameter is found to be outside a specified operating range; and to forward the collected radio network measurement data to an external data processing, storage, reporting and analysis system for further processing and analysis.

Preferably, the events comprise the forwarding of alert messages to external systems or to communication devices.

Preferably, one of the radio transceivers in one or more of the plurality of network functional modules is in the form of a discrete cellular modem or cellular modem embedded within a 'system on chip' (SOC) or a 'system on module' (SOM) or a 'system in package' (SIP) module that is configured to operate as a multi-technology, multi-band capable cellular modem for testing, measuring, monitoring, and gathering radio network measurement data pertaining to, cellular radio networks.

Preferably, one of the radio transceivers in one or more of the plurality of network functional modules comprises any one or more of a machine to machine (M2M) based radio transceiver module, a software defined radio transceiver module (SDR), a field programmable gate array (FPGA) based radio transceiver or application-specific integrated circuit (ASIC) based radio transceiver.

Preferably, one of the radio transceivers in one or more of the plurality of network functional modules is adapted to operate as a multi-band and multi-channel P25 radio transceiver for testing, measuring, monitoring, and gathering radio network measurement data pertaining to P25 radio networks.

Preferably, one of the radio transceivers in one or more of the plurality of network functional modules is adapted to operate as a multi-band and multi-channel TETRA radio transceiver for testing, measuring, monitoring, and gathering radio network measurement data pertaining to TETRA radio networks.

Preferably, one of the radio transceivers in one or more of the plurality of network functional modules is adapted to operate as a multi-band and multi-channel Wi-Fi radio transceiver or scanning radio receiver for testing, measuring, monitoring, and gathering radio network measurement data pertaining to Wi-Fi radio networks.

Preferably, one of the radio transceivers in one or more of the plurality of network functional modules is adapted to operate as a multi-channel LoRA radio transceiver for testing, measuring, monitoring, and gathering radio network measurement data pertaining to LoRA radio networks.

Preferably, one of the radio transceivers in one or more of the plurality of network functional modules is adapted to operate as a multi-band and multi-channel capable NB-IoT cellular radio modem for testing, measuring, monitoring, and gathering radio network measurement data pertaining to NB-IoT cellular radio networks.

Preferably, one of the radio transceivers in one or more of the plurality of network functional modules is adapted to operate as a multi-band and multi-channel capable CAT-M1/CAT-M2 cellular radio modem for testing, measuring, monitoring, and gathering radio network measurement data pertaining to CAT-M1/CAT-M2 cellular radio networks.

Preferably, the processing unit comprises one or more central processing units for the management of the operation of the radio network measurement and monitoring device, the execution of specific scripted tests of target radio networks, the processing or partial processing of the radio network measurement data that is collected, and the management of the storage and uploading of the radio network measurement data to an external computing system for processing, persistent storage, and analysis.

Preferably, the processing unit comprises non-volatile data storage to store the radio network measurement data collected during the testing, measurement, and monitoring of radio networks.

Preferably, the processing unit is adapted to periodically or to continuously measure prescribed RF parameters associated with selected radio networks, including but not limited to transmission power levels, signal to noise ratios, signal quality measures, transmitter identifiers, serving and neighbouring cell information, and Layer 3 messages, and storing the RF parameters on internal non-volatile memory for later processing, or for uploading to an external system or computer.

Preferably, the processing unit is adapted to receive data from a user or an external system or computer that describes the normal operating ranges for any of the RF parameters that the radio network monitoring device measures whilst monitoring any radio network, and details of the frequency with which each of the measurements for those RF parameters is to be made.

Preferably, the operating range for a particular RF parameter may be defined by an upper and a lower threshold; or as an average level and an operating tolerance constrained by upper and lower threshold values for that particular RF parameter.

Preferably, the processing unit is adapted to automatically and autonomously derive a normal operating range for any of the RF parameters that the radio network monitoring device measures whilst monitoring any of the radio networks, and the frequencies with which these periodic measurements are to be made.

Preferably, the processing unit is adapted to derive a normal operating range for any given parameter by measuring that parameter for a period of time and then algorithmically determining the normal operating range for that parameter using statistical modelling, and the automated derivation of standard deviation levels for that RF parameter.

Preferably, the processing unit is adapted to automatically and autonomously alter any threshold that defines the normal operating range for any of the monitored RF parameters.

Preferably, the processing unit is adapted to compare any particular RF parameter measurement with normal operating threshold limits for that particular RF parameter to determine whether the measurement falls within a normal operating range for that particular RF parameter or falls outside of the normal operating range for that particular RF parameter.

Preferably, the processing unit is adapted to compare any particular RF parameter measurement with normal operating threshold limits either immediately after the RF parameter is measured, or at any time after the measurement is made by retrieving the measurement data from the internal non-volatile memory.

Preferably, the processing unit is adapted to measure particular combinations of RF parameters pertaining to prescribed networks, store the resulting measurement data in internal non-volatile memory, and retrieve that measurement data at a later point in time to batch process it and determine whether user-definable combinations of RF parameters fall within normal operating ranges.

Preferably, the processing unit is adapted to determine whether additional measurements of the same or different RF parameters should be made in order to determine whether any particular radio network is operating within normal range after measuring particular RF parameters and comparing those parameters to the normal operating ranges for each parameter.

Preferably, the processing unit is adapted to generate an alert in the event that any RF parameter pertaining to one or more monitored radio networks is found to be outside of the normal operating range for that RF parameter, or in the event that any combination of RF parameters are found to be outside of the normal operating ranges for that combination of RF parameters.

Preferably, the processing unit is adapted to forward an alert to a defined set of recipients in electronic form, including via email or short message service (SMS) text message; or may be communicated audibly via a sound alarm or visually via a light alarm or as an event in a trouble ticketing, help desk or similar external system.

Preferably, the processing unit is adapted to forward either an alert or the raw radio network measurement data to the Radio Network Measurement Data Management System ('Radio Network Measurement Data Management System') via an application programming interface (API), or as a data payload in a flow-based data stream that uses a protocol such as NetFlow, sFlow, jFlow, MQTT or IPFIX, or similar data communication format. The Radio Network Measurement Data Management System can then perform analyses of the data imported from a large number of radio network monitoring devices in the same way that the processing unit of a single device does, and make determinations as to whether given RF parameters are within prescribed limits, and generate alerts accordingly.

Preferably, the processing unit is adapted to continuously measure user-specified RF parameters pertaining to a specific radio network.

Preferably, the processing unit is adapted to be programmatically configured to periodically or repeatedly execute specific tests of selected radio communications networks according to sequenced test steps contained within scripts, including but not limited to, placing voice calls, and downloading data from specific servers so that the radio network monitoring device can measure the effects of the tests on the radio networks being tested and collect radio network measurement data, Preferably, the processing unit comprises a bootstrap module adapted to automatically boot up and automatically commence testing, measurement or monitoring of multiple instances of multiple heterogeneous radio networks by executing multiple pre-defined and stored test scripts when the radio network monitoring device is powered on, and automatically saving radio network measurement data to log files when powered down; thereby negating the need to manually initiate test scripts and separately save log files at the end of radio communications network measurement tests.

Preferably, the radio network monitoring device is adapted to operate autonomously and in zero-touch mode such that the radio network monitoring device can be remotely configured and managed, and so that no direct user interaction or intervention is necessary when configuring or operating the radio network monitoring device, or when retrieving radio network measurement data therefrom.

Preferably, the management server that forms part of the Radio Network Measurement Data Management System is one of a centralised management server, distributed management server, or a hybrid of a centralised and distributed management server.

Preferably the databases that form part of the Radio Network Measurement Data Management System are virtualised databases, each of which comprise one or more distributed or non-distributed physical databases.

Preferably, when an alert is forwarded to a recipient in the form of an email or SMS message, the alert comprises details of the alert, of the network that resulted in the alert being generated, of the location of the radio network monitoring device, relevant radio network measurement data, and optionally a hyperlink that a user can click on to be directed to a system or portal or web page that contains additional details of the alert.

Preferably, the Radio Network Measurement Data Management System is adapted to import radio network measurement data from one or more radio network monitoring devices, decode the radio network measurement data and extract the RF parameter values from that data, store the original raw ratio network measurement data and the decoded RF parameter values persistently, analyse any combination of imported RF parameter data; and optionally generate alerts if any RF parameter pertaining to one or more monitored radio networks is found to be outside of the normal operating range for that RF parameter, or if any combination of RF parameters are found to be outside of the normal operating ranges for that combination of RF parameters.

Preferably, the Radio Network Measurement Data Management System is adapted to be programmatically automated, or be triggered manually by a user for the administration and alert generation.

Preferably, the Radio Network Measurement Data Management System incorporates one or more databases in which raw radio network measurement, decoded RF parameter data, data derived from the RF parameter data, and alert data imported from one or more remote radio network monitoring devices can be stored indefinitely, and that support the processing, querying, visualisation, reporting of, and analysis of the data stored in them by both technically skilled and lay users of the Radio Network Measurement Data Management System.

Preferably, the Radio Network Measurement Data Management System is adapted to forward RF parameters or data derived from radio network measurement data or alerts to self-optimising network (SON) controllers or systems in real time or in near real time.

Preferably, the radio network monitoring device comprises one or more internal power sources, and interfaces to external power sources.

Preferably, the radio network monitoring device further comprises a power module to receive power over Ethernet (POE) or from an external direct current (DC) power source or alternating current (AC) power source.

Preferably, the processing unit is adapted to execute test scripts separately and concurrently on each of the plurality of removable network functional modules, so as to simultaneously or sequentially test multiple instances of multiple radio networks of multiple types and modulation schemes.

Preferably, the processing unit is adapted to generates RF log files containing radio network measurement data resulting from the scripted tests, or from the periodic or continuous measurement of monitoring of radio networks.

Preferably, the processing unit is adapted to store the radio network measurement data collected in an internal non-volatile data storage.

Preferably, the processing unit is adapted to automatically or manually upload the stored radio network measurement data to the Radio Network Measurement Data Management System or other external server or system.

Preferably, the processing unit is adapted to periodically upload the radio network measurement data to the Radio Network Measurement Data Management System or other external server or system, or to continuously upload the radio network measurement data to the Radio Network Measurement Data Management System or other external server or system in real time or near real time whilst the radio network measurement data is being collected, wherein the onboard storage module is adapted to act as a data buffer if required.

Preferably, the processing unit has a communication module to connect to a user device remotely via wireless connection or via an Ethernet connection to support the periodic or continuous determination of the status of the radio network monitoring device and of the radio network measurements being made.

Preferably, the processing unit is adapted to receive instructions from the Radio Network Measurement Data Management System that alter the configuration and operation of the plurality of removable network functional modules and of the measurement, testing and monitoring of radio networks.

Preferably, the processing unit is adapted to continuously monitor transmissions from radio transmitters at geographically dispersed locations so as to determine geographical locations of each radio transmitter, the number of antennas at each location, the vertical and horizontal orientation of each such antenna, and the direction of propagation of radio signals from each antenna.

Preferably, the Radio Network Measurement Data Management System or other external server or system is adapted to determine the geographical locations of each radio transmitter over a large geographical area, the number of antennas at each location, the vertical and horizontal orientation of each such antenna, and the direction of propagation of radio signals from each antenna by analysis of the radio network measurement data uploaded to it from multiple radio network monitoring devices.

Preferably, the processing unit is adapted to detect the presence of, geographically locate, and track the location of stationary or mobile rogue radio transmitters, and especially of rogue cellular radio transmitters or IMSI catcher devices in real time or in near real time.

Preferably, the Radio Network Measurement Data Management System or other external server or system is adapted to detect the presence of, geographically locate, and track the location of stationary or mobile rogue radio transmitters, and especially of rogue cellular radio transmitters or IMSI catcher devices over a large area in real time by analysis of the radio network measurement data uploaded to it from multiple radio network monitoring devices.

Preferably, the processing unit is adapted to configure the network functional modules to allow other types of radio networks, such as maritime radio, aircraft radio, military radio and private government radio, to be tested, measured and monitored.

Preferably, the processing unit is adapted to automatically self-organise the radio network monitor into a mesh network, utilising either wireless or Ethernet connections, such that each radio network monitoring device becomes a node within a localised mesh network.

Preferably, the processing unit is adapted to provide resilience by ensuring that when one or more individual radio network monitoring devices is unable to upload alerts or radio network measurement data or other data payload to users or to the Radio Network Measurement Data Management System via the wireless or Ethernet connections, the radio network monitoring devices can still upload those alerts or radio network measurement data via the mesh network to other local radio network monitoring devices.

Preferably, the alert or radio network measurement data or other data payload continues to be transmitted from one radio network monitoring device in the mesh network to another radio network monitoring device on that mesh network until the alert or radio network measurement data or other data payload reaches a radio network monitoring device that is able to establish a wireless or Ethernet or other connection to the internet, therefore allowing the alert or radio network measurement data or other data payload to reach the user or the Radio Network Measurement Data Management System.

Preferably, the processing unit is adapted to periodically or continuously monitor and measure network, radio network operator, technology, band and channel specific electromagnetic energy (EME) levels associated with one or more radio networks, record corresponding EME data and make that data available for analysis.

Preferably, the processing unit is adapted to apply either instantaneous or cumulative EME threshold levels for one or more radio networks, radio network operators, technologies, bands and channels.

Preferably, the processing unit is adapted to automatically measure RF parameters via the network functional modules so as to determine instantaneous and cumulative network, network operator, technology, band and channel specific EME levels, and compare those measured EME levels with the predefined EME threshold levels to determine whether thresholds have been exceeded.

Preferably, the processing unit is adapted to automatically generate an alert if an instantaneous or cumulative network, network operator, technology, band and channel specific EME level threshold is exceeded.

Preferably, the processing unit is adapted to periodically or continuously upload network, network operator, technology, band and channel specific EME data, together with the RF parameters used to derive EME data, to the Radio Network Measurement Data Management System.

Preferably, the processing unit is adapted to forward an EME alert to the Radio Network Measurement Data Management System or to a defined set of recipients wherein the EME alerts are communicated in electronic form, including via email or short message service (SMS) text message; or may be communicated audibly via a sound alarm or visually via a light alarm or as an event in a trouble ticketing, help desk or similar external system.

Preferably, the processing unit is adapted to forward an EME alert message to the Radio Network Measurement Data Management System via an application programming interface (API), or as a data payload in a flow-based data stream that uses a protocol such as NetFlow, sFlow, jFlow, or IPFIX, or similar data communication message format.

Preferably, the radio network monitoring device is in communication with a Radio Network Measurement Data Management System that incorporates a database in which radio network, radio network operator, radio technology, radio band and channel-specific EME measurement data and alert data and RF parameter data from which EME level data is derived, and that is imported from one or more radio network monitoring devices can be stored indefinitely, and where that EME data can be processed, queried, visualised, reported upon, and analysed by users of the Radio Network Measurement Data Management System; and where EME level alerts can be generated as the result of the analysis of data originating from multiple radio network monitoring devices.

Preferably, the radio network monitoring device is adapted to incorporate sensors including but not limited to those measuring environmental temperature, humidity, barometric pressure, air quality, light intensity, sound, device orientation, movement, acceleration and vibration, and the ability to periodically or continuously forward data originating from those sensors to a Radio Network Measurement Data Management System for analysis and reporting.

In another aspect of the present invention, there is provided a radio network monitoring device comprising:

a plurality of removable network functional modules, wherein each network functional module comprises one or more radio modems or transceivers; one or more internal antenna array modules adapted to receive and transmit radio signals; and one or more antenna interface modules and accompanying SMA, SMB, BNC, or similar antenna ports that support the connection of external antennas; and one or more processing units removably connected to the plurality of network functional modules through one or more internal computer expansion buses;

wherein the processing unit is adapted to dynamically reconfigure the plurality of network functional modules for testing, measuring and monitoring multiple instances of radio networks of different types, technologies and modulation schemes, and collecting radio network measurement data in the form of multiple RF measurement parameters from the plurality of network functional modules to produce multiple RF log files containing radio network measurement data.

Preferably, one cellular radio modem on one or more of the plurality of network functional modules is adapted to operate as a multi-cellular technology, multi-band capable cellular modem for testing, measuring, and monitoring, and gathering radio network measurement data pertaining to, cellular radio networks.

Preferably, the processing unit comprises one or more central processing units for the processing or partial processing of the radio network measurement data that is collected, and the management of the storage and upload of the radio network measurement data as either RF log files or as streamed data to the Radio Network Measurement Data Management System.

Preferably, the radio network monitoring device further comprises one or more geo-location modules adapted to receive signals from external radio navigation systems such as GPS, GLONASS, Galileo, BeiDou, NavIC, and QZSS for establishing the current geographic location of the radio network monitoring device.

Preferably, the radio network monitoring device further comprises non-volatile data storage for storing one or more RF log files in a journaling or similar format to a fault-tolerant file structure.

Preferably, the radio network monitoring device further comprises one or more internal power sources, and additionally supports connection to external electrical power sources if required.

Preferably, the processing unit is adapted to connect to a user device for configuring, monitoring and managing the plurality of removable network functional modules whilst collecting radio network measurement data during an RF walk or RF drive test in real time.

Preferably, the processing unit is adapted to provide remote procedure calls for users to alter the configuration and operation of the plurality of removable network functional modules and the test cases thereof.

Preferably, the processing unit is adapted to provide remote procedure call for users to store the radio network measurement data in the internal data storage whilst testing, measuring or monitoring radio networks and until such time that the radio network monitoring device is automatically or programmatically or manually triggered to download the stored radio network measurement data to the Radio Network Measurement Data Management System; or that can continuously or periodically upload the radio network measurement data collected over the course of testing, measuring or monitoring radio networks to the Radio Network Measurement Data Management System in real time or near real time whilst the radio network measurement data is being collected.

Preferably, the processing unit is adapted to automatically detect data connectivity to a host computing device or to the Radio Network Measurement Data Management System, and to automatically download the radio network measurement data accumulated in the onboard data storage to that companion host computing device or to the Radio Network Measurement Data Management System respectively.

Preferably, the radio antennas are configured such that the effects of absorption of received and transmitted radio signals by an external object or person are minimised or eliminated to ensure that the radio network measurement data collected is true and correct, and that the need to apply adjustments to the data to compensate for the attenuation of received radio signals caused by such absorption is eliminated.

Preferably, the radio network monitoring device further comprises with an enclosure adapted to be removably secured onto vehicles in a standard vehicle rooftop box, pod or rooftop cargo carrier where the radio network monitoring device's antennas are located such that the effects of absorption of received and transmitted radio signals by the vehicle are minimised to ensure that the radio network measurement data collected are true and correct, and that the need to apply adjustments to the data to compensate for the attenuation of received radio signals caused by such absorption is eliminated.

Preferably, the radio network monitoring device further comprises a companion electrical power distribution and management unit.

Preferably, the processing unit is adapted to embed an image of a plan of a site at which radio networks are being measured into each of the RF log files produced to ensure that the correct plan image is persistently associated with corresponding RF log files produced, thereby eliminating the possibility of an error in manually associating the correct plan image with the corresponding test RF log file after an RF walk test is completed.

Preferably, the processing unit is adapted to operate with a set of zoomable Slippy Maps covering one or more countries or part thereof in the radio communications network monitoring device's non-volatile data store, thereby eliminating the requirement that the measurement device be connected to the internet to operate; and with an associated method of storing all vector map data such that the maps can be retrieved and rendered without requiring access to external servers or resources, thereby reducing CPU load and processing time.

In another aspect of the present invention, there is provided a Radio Network Measurement Data Management System for the processing, storage and analysis of heterogeneous radio network measurement data and comprising a system controller, a processing unit, and databases for the storage of raw radio network measurement data and of the RF parameters extracted from raw radio network measurement data; wherein the system controller is adapted to analyse received radio network measurement data, determine the type of radio network to which the data pertains and therefore the RF parameters that the received data contains, decode the received radio network measurement data and extract the RF parameters from it, persistently store the RF parameters in a database, persistently store the original radio network measurement data in a database, and make the original radio network measurement data and the extracted RF parameter data available for querying, visualisation, reporting and analysis, including temporal analysis, and for the derivation of other data from the extracted RF parameter data.

Preferably, the radio network measurement data comprises timestamped and geo-tagged data containing RF parameter values that arise from the measurement, testing, or monitoring of multi-technology cellular radio networks, P25 and TETRA 2-way trunked radio networks, Wi-Fi, IoT-specific networks including those supporting LoRA, NB-IoT, and CAT-M1/CAT-M2 and maritime, aircraft, military and other private and government radio networks ('RF Measurement Data').

Preferably, the Radio Network Measurement Data Management System is adapted to operate either within a cloud computing environment, or in an on-premises computing environment, or in a combination of cloud and on-premises computing environments.

Preferably, the Radio Network Measurement Data Management System further comprises a set of radio network-specific RF Measurement Data import and decoding functions ('RF Measurement Data Decoder') that either automatically or manually import RF Measurement Data in the form of either log files or streamed data, decode the imported RF Measurement Data to extract the radio network-specific RF parameters pertaining to the radio network that was tested, measured or monitored, and store the RF parameters in a virtualised database that comprises one or more distributed or non-distributed physical databases that may be logically segmented, wherein the RF parameters that result from the measurement or monitoring or testing of cellular networks will be extracted from the RF Measurement Data by a cellular RF Measurement Data Decoder; the RF parameters that result from the measurement or monitoring or testing of P25 networks will be extracted from the RF Measurement Data by a P25 RF Measurement Data Decoder; the RF parameters that result from the measurement or monitoring or testing of TETRA networks will be extracted from the RF Measurement Data by a TETRA RF Measurement Data Decoder; the RF parameters that result from the measurement or monitoring or testing of Wi-Fi networks will be extracted from the RF Measurement Data by a Wi-Fi RF Measurement Data Decoder; the RF parameters that result from the measurement or monitoring or testing of LoRA networks will be extracted from the RF data by a LoRA RF Measurement Data Decoder; the RF parameters that result from the measurement or monitoring or testing of NB-IoT networks will be extracted from the RF Measurement Data by a NB-IoT RF Measurement Data Decoder; the RF parameters that result from the measurement or monitoring or testing of CAT-M1 and CAT-M2 networks will be extracted from the RF Measurement Data by a CAT-M1/CAT-M2 RF Measurement Data Decoder; the RF parameters include, but are not limited, to RSRP and RSSI that describe received power levels, SiNR and ECNO that describe signal to noise levels, radio band and channel identifiers, PCI and SSID that identify serving cells or transmitters, TXP that describes transmission power, MIMO rank and Layer 3 cellular messages.

Preferably, the RF Measurement Data Decoder is adapted to automatically analyse an RF Measurement Data log file when the log file is loaded into a log file importation directory, determine the type of RF Measurement Data and the radio network-type specific decoding processes to invoke, and invoke the appropriate decoder function to process the RF Measurement Data log file contents.

Preferably, the RF Measurement Data Decoder is adapted to automatically analyse streamed RF Measurement Data imported into the system via an application programming interface ('API') or other data importation mechanism, determine the type of RF Measurement Data and the radio network-type specific decoding processes to invoke, and invoke the appropriate decoder function to process the streamed RF Measurement Data in real time or in near real time, or at any time of a user's choosing.

Preferably, the RF parameter data is stored in a virtualised database system that comprises one or more distributed or non-distributed physical databases that may be logically segmented in which RF parameter value data are stored ('RF Parameter Database'), such that the RF Parameter Database is adapted to be temporally segmented, or segmented on the basis of the geographic locations in which RF parameter data have been collected, or on the basis of radio network types, or on the basis of radio technology (such as 3G, 4G and 5G cellular), or on the basis of individual network operators, or on the basis of any combination of temporality, geography, radio network type, radio technology and network operator.

Preferably, the RF Parameter Database is adapted to resiliently and reliably import, persistently store and index very large amounts of data, and so is capable of persistently storing exabytes of RF parameter data, and of rendering all stored data searchable and immediately retrievable.

Preferably, the RF Measurement Data database is adapted to resiliently and reliably import, persistently store and index very large amounts of data, and so is capable of persistently storing exabytes of RF Measurement Data, and of rendering all stored data searchable and immediately retrievable.

Preferably, the Radio Network Measurement Data Management System further comprises a user authentication and authorisation system and a data access control system that allow for access to functions and features, and to segmented data stored in the RF Parameter Database and the RF Measurement Data database to be restricted to specific users or groups of users.

Preferably, the Radio Network Measurement Data Management System further comprises a data querying engine that interprets data querying commands and language and executes queries against any data that is stored in the RF Parameter Database, and any data that is stored in the RF Measurement Data database.

Preferably, the data querying engine is adapted to provide one or more graphical data query building tools for building data queries by graphically selecting and linking symbols representing data query commands or groups of data query commands, thereby alleviating the need for the user to understand data querying commands and language.

Preferably, the data querying engine is adapted to allow each user to build customised data queries to be executed against any data stored in the RF Measurement Data database and any data stored in the RF Parameter Database as and when required, and to be persistently stored in personalised data query libraries such that a user can execute any such query against any data stored in any database at any time.

Preferably, the data querying engine is adapted to return data from the RF Parameter Database that can be represented graphically on an authorised user's computing device screen as an overlay on a map or a plan of a building or site; or used to populate a report; or may be used to populate a file for export from the Radio Network Measurement Data Management System; or combined with other data that may be sourced from the Radio Network Measurement Data Management System or from elsewhere to produce a new dataset.

Preferably, the data querying engine comprises one or more different graphical user interfaces ('GUIs') that allow authorised users of varying skill levels to interact with the Radio Network Measurement Data Management System and the data contained in the RF Parameter Database and in the RF Measurement Data database through GUIs that comprise varying collections of pre-defined data queries; data query editing functions; data visualisation, reporting and analysis functions; and interactive links and graphical icons that trigger actions that may be taken by an authorised user.

Preferably, the GUIs are adapted to use the user authentication and authorisation system and data access control system to associate a particular GUI with a particular user or particular group of users so as to allow users with varying technical experience and skills to use functions and features that are suited to their individual skill and experience level whilst still using and referencing the same datasets stored in the RF Parameter Database and the RF Measurement Data database; and to therefore provide a singular definitive set of radio network coverage and quality data that may be referenced and used by many users and groups of users.

Preferably, the system controller is adapted to support importation of data in the form of geospatial information system (GIS) overlays from an external data source, and combine the overlay data with RF parameter data to produce composite maps that combine geo-located attributes of input data sets with various data RF parameter data.

Preferably, the data querying engine is adapted to support the querying of RF parameter data that relates to a given radio network and that has been collected at one or more locations at any two or more points in time so as to support rapid temporal analysis of RF parameter data, and identification of changes that have occurred in the RF parameters over time, which may be indicative of certain changes that have occurred over time in that radio network, or of network degradation, or of issues that have impacted that radio network, or of issues or faults that may yet arise within that radio network.

Preferably, the data querying engine is adapted to generate a single consolidated graphical representation of matching data returned from one or more queries of radio network measurement data pertaining to one or more locations of interest; or to populate a consolidated file for export from the Radio Network Measurement Data Management System or to be combined with other data that may be sourced from the Radio Network Measurement Data Management System or from elsewhere to produce a new dataset.

Preferably, the data querying engine is adapted to support queries of RF parameter data that relate to two or more radio networks of the same type and that utilise the same technology, to support comparative benchmarking of different radio services of the same network type, including but not limited to two or more cellular radio networks; or to two or more cellular radio bands or channels; or to two or more P25 radio networks; or to two or more TETRA radio networks; or to two or more Wi-Fi radio networks; or to two or more LoRA radio networks; or to two or more NB-IoT radio networks, or to two or more CAT-M1/CAT-M2 radio networks, wherein the queries can be used to produce a single consolidated graphical representation of data matching the queries; or to populate a consolidated file for export or to be combined with other data to produce a new dataset. In this way, the system enables a significant improvement in the ability to quickly and easily benchmark radio network coverage and quality for two or more radio networks.

Preferably, the data querying engine is adapted to support queries of RF parameter data that relate to multiple networks of the same type operated by a single network operator at specific locations, including but not limited to multiple cellular radio networks operated by a single cellular operator, or multiple P25 networks operated by a single P25 network operator, or multiple TETRA networks operated by a single TETRA network operator, or multiple Wi-Fi networks operated by a single Wi-Fi network operator, or multiple LoRA networks operated by a single LoRA network operator, or multiple NB-IoT networks operated by a single NB-IoT network operator; or multiple CAT-M1/CAT-M2 networks operated by a single CAT-M1/CAT-M2 network operator to identify areas where a particular operator provides no radio coverage of the type being queried or poor-quality radio coverage of the type being queried at those specific locations (areas known as 'black spots'). These queries can be used to produce a single consolidated graphical representation of the data matching the query at the desired locations; or to populate a consolidated file for export from the Radio Network Measurement Data Management System or to be combined with other data that may be sourced from the Radio Network Measurement Data Management System or from elsewhere to produce a new dataset. In this way, the system enables a significant improvement in the ability to quickly and easily identify and locate radio coverage blackspots and areas in which radio coverage is of a poor quality.

Preferably, the data querying engine is adapted to support queries of RF parameter data that relate to multiple networks of the same type operated by multiple network operators at specific locations, including but not limited to multiple cellular radio networks operated by multiple cellular operators, or multiple P25 networks operated by multiple P25 network operators, or multiple TETRA networks operated by multiple TETRA network operators, or multiple Wi-Fi networks operated by multiple Wi-Fi network operators, or multiple LoRA networks operated by multiple LoRA network operators, or multiple NB-IoT networks operated by multiple NB-IoT network operators, or multiple CAT-M1/CAT-M2 networks operated by multiple CAT-M1/CAT-M2 network operators to identify areas with no radio coverage of the type being queried or poor-quality radio coverage of the type being queried (areas known as 'no spots'). These queries can be used to produce a single consolidated graphical representation of the data matching the query at the desired locations; or to populate a consolidated file for export from the Radio Network Measurement Data Management System or to be combined with other data that may be sourced from the Radio Network Measurement Data Management System or from elsewhere to produce a new dataset. In this way, the system enables a significant improvement in the ability to quickly and easily identify and locate areas that are not served by a typical type of radio network coverage.

Preferably, the data querying engine is adapted to support queries of RF parameter data that relate to two or more different types of radio networks at once, to support comparative benchmarking of different radio services of different network types at specific locations. In this way, any combination of RF parameter data pertaining to one or more cellular radio networks, one or more P25 radio networks, one or more TETRA radio networks, one or more Wi-Fi radio networks, one or more LoRA radio networks, one or more NB-IoT radio networks and one or more CAT-M1/CAT-M2 radio networks may be compared by executing a single query. These queries can be used to produce a single consolidated graphical representation of the data matching the query at the desired locations; or to populate a consolidated file for export from the Radio Network Measurement Data Management System or to be combined with other data that may be sourced from the Radio Network Measurement Data Management System or from elsewhere to produce a new dataset.

Preferably, the system is adapted to preserve raw and unfiltered RF Measurement Data by storing raw and unfiltered RF Measurement Data in its original form in the RF Measurement Data database, and to cross-reference raw and unfiltered RF Measurement Data to the decoded RF parameter data that has been extracted from that RF Measurement Data, so that the raw and unfiltered RF data can be easily identified by reference to RF parameters that may be queried, and then downloaded from the system.

Preferably, the system further comprises a report generation engine that interprets data querying, filtering, analysis and manipulation commands and language contained within report templates and produces reports by executing those commands against data stored in the RF Parameter Database ('RF Report Generator').

Preferably, the RF Report Generator is adapted to support the collation and combination of any data stored in the RF Parameter Database pertaining to multiple radio network types or instances in a single report.

Preferably, the RF Report Generator is adapted to dynamically adjust sizes of images such as building plans and maps in a generated report to ensure that all images appearing in a given report are of a consistent shape and size.

Preferably, the RF Report Generator is adapted to support the recursive execution of data querying, filtering, manipulation and output rendering logic so that a particular query can be made to run on the data that results from the output of a preceding query, filter or manipulation, with no limit as to the number of recursive loops that may be executed.

Preferably, the RF Report Generator is adapted to populate and output each page in a report only if data that would populate that page is returned from the query that built that page; and populates and outputs each element on a report page, such as a table, plot or graph only if data that would populate that element is returned from the query that built that element. In this way, pages that are empty due to null data, or page elements that are empty due to null data are not output in reports.

Preferably, the system comprises an integral and extensible radio network data analytics engine that supports RF Measurement Data analysis applications that run against the data stored in the RF Parameter Database.

Preferably, the radio network data analytics engine supports a computer application that programmatically determines the location of each radio transmitter in a geographic area in which RF Measurement Data has been collected by a process of triangulation and analysis of radio propagation paths in a given area ('RF Transmitter Locator').

Preferably, the RF Transmitter Locator is adapted to identify the orientation of the individual antennas that constitute a radio transmitter, including the pan and tilt angles of each antenna head, and the radio network, radio technology and radio band specific transmission power output by each antenna.

Preferably, the RF Transmitter Locator is adapted to allow a user to define a geographic area in which the location of transmitters is to be determined by drawing a polygon representing the boundary of the geographic area of interest on a map displayed on a GUI, or by specifying boundaries using geographic co-ordinates.

Preferably, the RF Transmitter Locator is adapted to automatically identify, locate and track movements of rogue transmitters, cell spoofers, or 'IMSI catchers' in real-time or in near real time, and either generates alerts when a rogue transmitter, cell spoofer, or IMSI catcher is identified and/or located, or highlights the location or locations of any rogue transmitter, cell spoofer, or IMSI catcher on a map displayed on a GUI, or outputs the alerts in a report.

Preferably, the radio network data analytics engine comprises an integral application for programmatically scanning data in the RF Parameter Database using artificial intelligence (AI) pattern matching and other algorithmic techniques to automatically identify geographic areas impacted by radio coverage issues that include overshooting, shadowing, pilot pollution, congestion, swapped feeders and handover failures ('Coverage Issue Identifier'); and either generates alerts when a coverage issue is found, or highlights the issue on a map displayed on a GUI.

Preferably, the Coverage Issue Identifier is adapted to automatically determine the root cause of each identified coverage issue using artificial intelligence (AI) pattern matching and other algorithmic techniques to identify patterns of data in the RF Parameter Database that correlate to each type of coverage issue.

Preferably, the Coverage Issue Identifier is adapted to automatically determine a recommended rectification approach for each coverage issue that has been identified, so as to perform an automated first-pass radio engineering function.

Preferably, the radio network data analytics engine comprises an integral application for programmatically scanning data in the RF Parameter Database using artificial intelligence (AI) pattern matching and other algorithmic techniques to automatically identify patterns in RF parameter data that are correlated with radio network fault conditions, before such faults actually occur ('Fault Prediction Engine'); predicts when and where such faults are likely to occur; and either generates alerts when a fault prediction is made, or highlights the issue on a map displayed on a GUI, or outputs the alerts in a report.

Preferably, the radio network data analytics engine comprises an integral application for deriving electromagnetic energy ('EME') levels from radio power metric data, including RSRP and RSSI values, that have been recorded by one or more radio network monitors; and stores the resulting time-stamped and geo-located EME data in the RF Parameter Database ('EME Analyser').

Preferably, the EME Analyser is adapted to discriminate between the EME emitted by different types of radio networks, by different network operators, using different radio technologies, on different radio bands and channels, by different radio transmitters and antennas, and by any combination of network type, network operator, radio technology, radio band or channel, and radio transmitter or antenna, wherein the EME Analyser can determine EME emitted by a particular type of radio network, and by a particular cellular operator or other radio network operator, and with a particular radio technology (such as 3G or 4G or 5G in the case of cellular networks), and on a particular radio band or channel, and from a particular transmitter, and from a particular antenna, and on any combination of radio network, radio network operator, radio technology, radio band or channel, and radio transmitter or antenna, wherein time-stamped and geo-located EME level data are stored in the RF Parameter Database, and are available to be queried, reported upon, represented as GIS map overlays on GUIs and analysed.

Preferably, the EME Analyser is adapted to determine the changes in EME level emitted over time by a particular type of radio network, and by a particular cellular operator or other radio network operator, and with a particular radio technology (such as 3G or 4G or 5G in the case of cellular networks), and on a particular radio band or channel, and from a particular transmitter, and from a particular antenna, and on any combination of radio network, radio network operator, radio technology, radio band or channel, and radio transmitter or antenna.

Preferably, the EME Analyser is adapted to determine the cumulative EME levels based on measured data at any geographical location over any user or system-defined time period, wherein the EME Analyser can determine cumulative EME levels emitted over prescribed time periods by a particular type of radio network, by particular cellular operator or other radio network operator, with a particular radio technology (such as 3G or 4G or 5G in the case of cellular networks), on a particular radio band or channel, from a particular radio transmitter, and from a particular antenna, and on any combination of radio network type, radio network operator, radio technology, radio band or channel, and transmitter or antenna.

Preferably, the EME Analyser is adapted to make provision for a user or a Radio Network Measurement Data Management System computer application or process or an external system to specify an EME operating range bound by upper and lower threshold EME values for any specified network operator, any specified radio network, any specified radio technology, any specified radio band or channel, any specified radio transmitter or antenna, or for any combination of specified network operator, specified radio network, specified radio technology, specified radio band or channel, and specified radio transmitter or antenna at a particular geographic location, wherein the geographic area may be defined by a user drawing a polygon representing the boundary of the geographic area of interest on a map displayed on a GUI, or by specifying boundaries using geographic co-ordinates which allows the instantaneous EME level at a particular location and emitted by a particular radio network type, particular network operator, particular radio transmitter or antenna on a particular radio band or channel to be determined.

Preferably, the EME Analyser is adapted to make provision for a user or a Radio Network Measurement Data Management System computer application or process or an external system to specify a cumulative EME operating range bound by upper and lower threshold EME values and by a date range or a time range for any specified network operator, any specified radio network, any specified radio technology, any specified radio band or channel, any specified radio transmitter or antenna, or for any combination of specified network operator, specified radio network, specified radio technology, specified radio band or channel, and specified radio transmitter or antenna at a particular geographic location, wherein the date range may be defined by a user specifying start and end dates, or the time range may be defined by a user specifying start and end times so as to allow the cumulative EME level at a particular location and emitted by a particular radio network type, particular network operator, particular radio transmitter or antenna on a particular radio band or channel to be determined.

Preferably, the EME Analyser is adapted to present derived EME level data graphically as GIS overlays on maps displayed in GUIs which allow users to query and visualise EME level data and determine whether EME emitted in any combination of radio network type, network operator, radio band or channel and radio transmitter or antenna at locations of interest is within prescribed EME levels.

Preferably, the EME Analyser is adapted to either generate alerts when an EME level is determined to be outside of the prescribed EME operating range, or highlight the issue on a map displayed on a GUI, or document the issue in a report.

Preferably, the EME Analyser is adapted to output derived EME level data in reports produced by the Radio Network Measurement Data Management System's report generator which allows users to generate reports describing EME levels emitted by any combination of radio network type, network operator, radio technology, radio band or channel and radio transmitter or antenna at user-specified geographic locations and over user-specified date or time ranges; or in datasets that can be exported to a separate system that can analyse EME levels emitted by any combination of radio network type, network operator, radio technology, radio band or channel and radio transmitter or antenna at user-specified geographic locations and over user-specified date or time ranges

BRIEF DESCRIPTION OF THE FIGURES

Features and advantages of the present invention will become apparent from the following description of embodiments thereof, by way of example only, with reference to the accompanying drawings, in which.

DESCRIPTION OF THE INVENTION

Current radio network testing, measurement and monitoring devices rely heavily on off-the-shelf handsets, radio receivers and scanning radio receivers ('user equipment', or 'UE'). In one embodiment of the present invention, there is provided an extensible radio network monitoring device that can be equipped and configured to separately or concurrently measure, test and monitor multiple instances of multiple heterogeneous radio networks, including cellular, P25 and TETRA 2-way trunked radio services, Wi-Fi, and IoT-specific networks including LoRA, NB-IoT and CAT-M1/CAT-M2 without the need for dedicated UE, and collect complete radio network measurement data from each measured, tested or monitored radio network accordingly.

Figure 1:
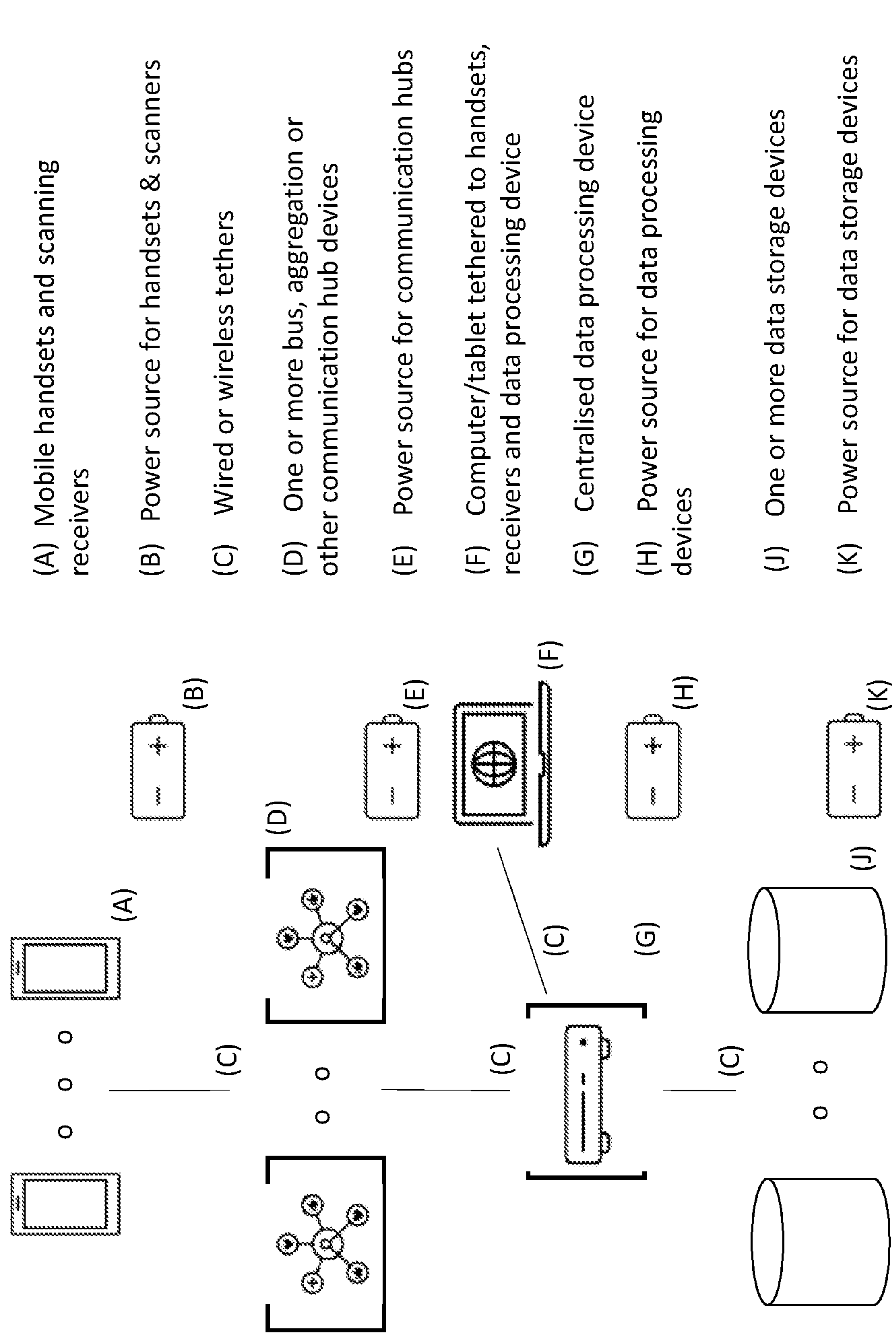
FIG. 1 shows a schematic diagram of a legacy cellular radio measurement tool architecture comprising multiple separate physical components tethered together.
Figure 2:
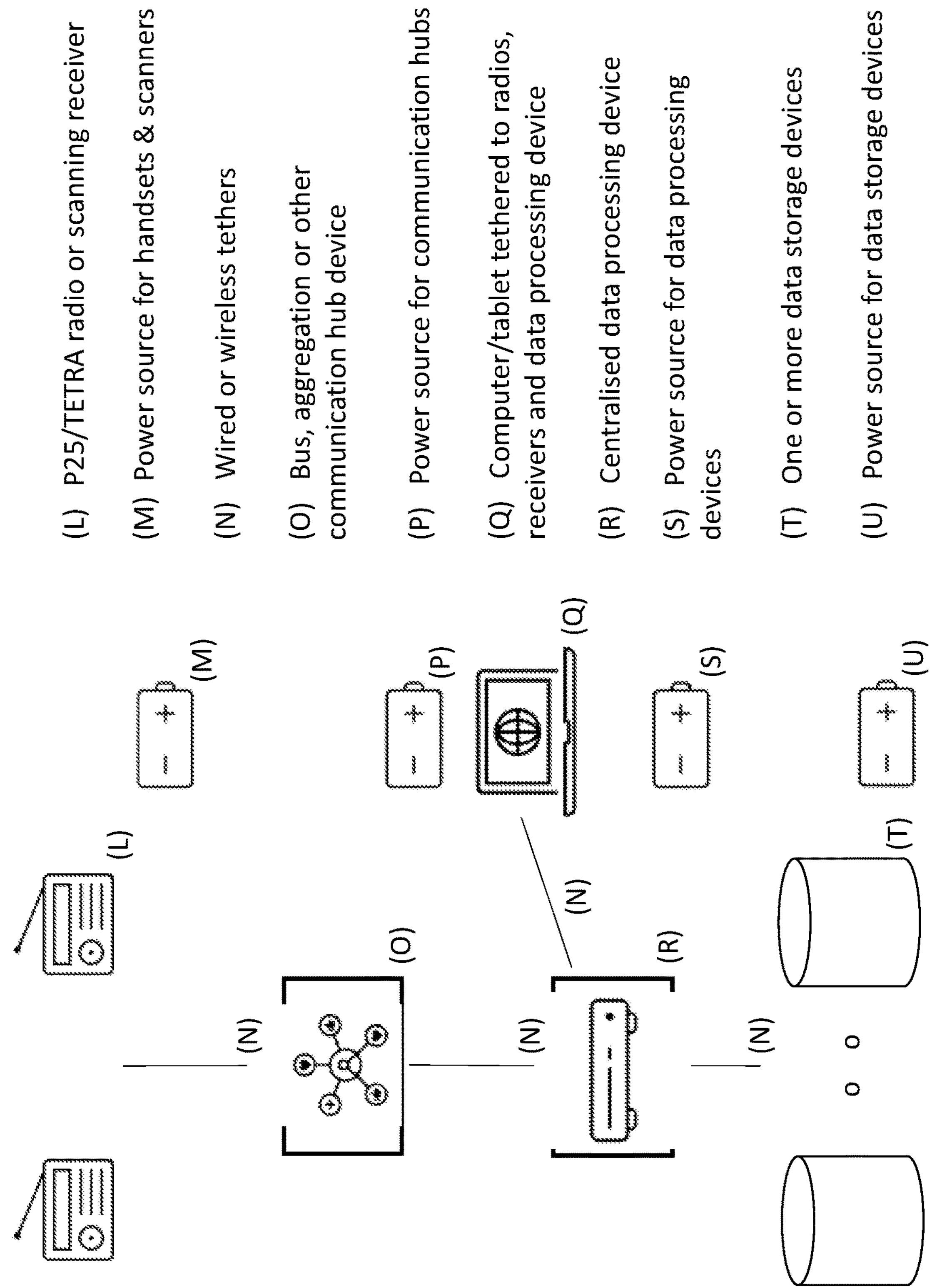
FIG. 2 shows a schematic diagram of a legacy P25 and TETRA radio measurement tool architecture comprising multiple separate physical components connected with tethers.
Figure 3:
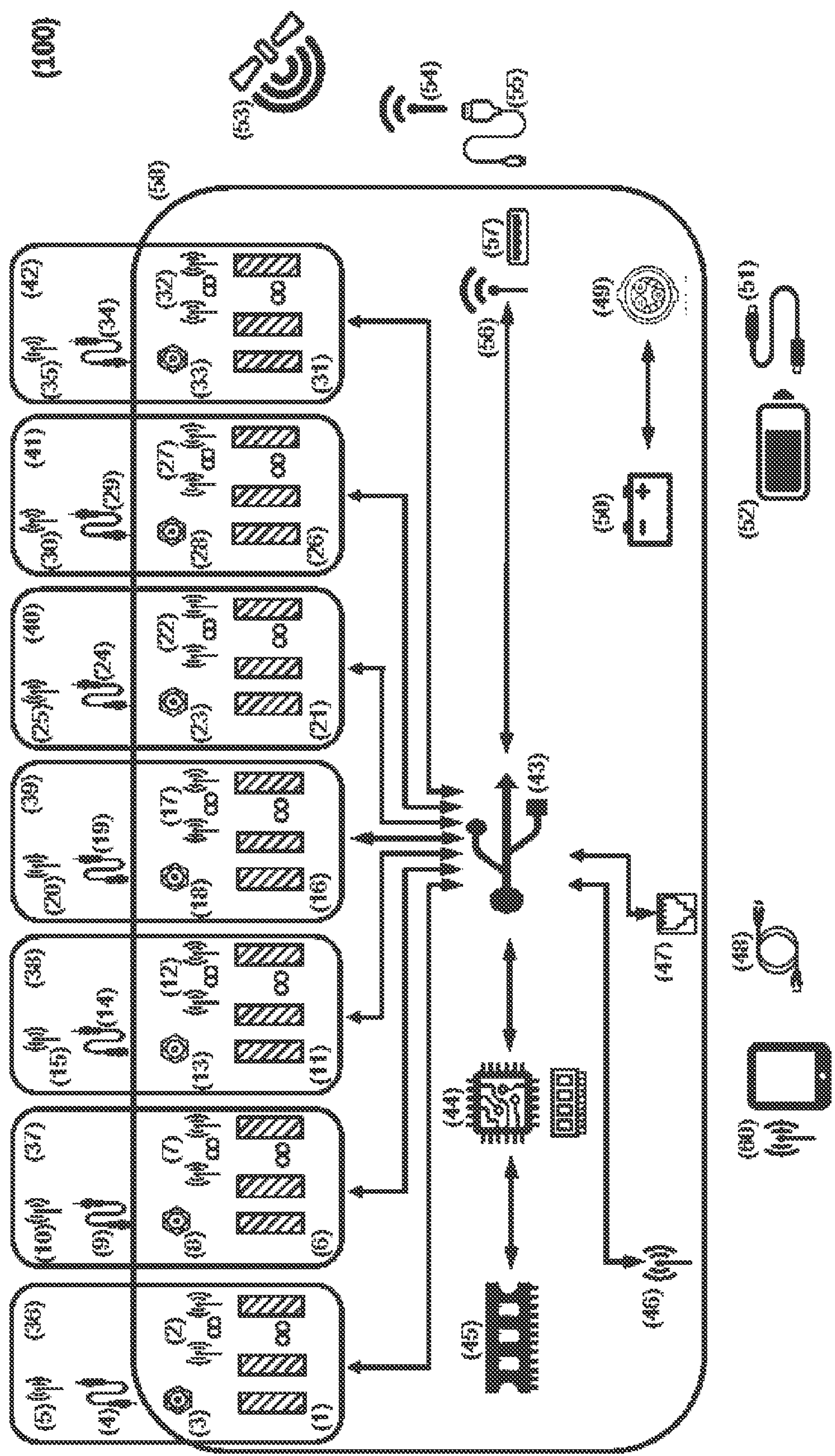
FIG. 3 shows a functional architecture block diagram of the radio network monitoring device of an embodiment of the present invention.

Referring to FIG. 3, there is provided a radio network monitoring device (100) in one embodiment of the present invention. The radio network monitoring device (100) comprises a plurality of removable or fixed radio network functional modules capable of interacting with cellular radio networks (36), P25 radio networks (37), TETRA radio networks (38), Wi-Fi radio networks (39), LoRA radio networks (40), NB-IoT cellular radio networks (41) and CAT-M1/CAT-M2 cellular radio networks (42). The radio network functional module (36, 37, 38, 39, 40, 41, 42) each comprises one or more cellular radio modems or other radio transceivers (1, 6, 11, 16, 21, 26, 31); one or more internal antenna array modules adapted to receive and to transmit radio signals (2, 7, 12, 17, 22, 27, 32); and one or more antenna interface modules and accompanying SMA, SMB, BNC, or similar antenna ports (3, 8, 13, 18, 23, 28, 33) that support the connection of external antennas (5, 10, 15, 20, 25, 30, 35) with appropriate antenna cables (4, 9, 14, 19, 24, 29, 34).

The radio network monitoring device (100) comprises a processing unit (44) connected to the plurality of radio network functional modules through one or more internal computer expansion buses (43). The processing unit (44) is adapted to dynamically reconfigure the plurality of radio network functional modules (36, 37, 38, 39, 40, 41, 42) for collecting multiple RF parameter measurements from the plurality of radio network functional modules to produce multiple RF log files containing radio network measurement data.

In one embodiment, the processing unit (44) is adapted to generate events when any measured parameter is outside a normal or desired operating range. The events comprise alert messages that are forwarded to a centralised management server or system (60). The events may also result from analysis of radio network measurement data collected during the normal operation of the radio network monitoring device, or after the execution of scripted tests or test programs.

In one embodiment, the radio network measurement data collected by the radio network functional modules (36, 37, 38, 39, 40, 41, 42) is transferred to one or more processing units (44). The processing unit (44) then manages the transfer of the collected radio network measurement data to the internal non-volatile data storage module (45), and that is then uploaded over a wireless link (46) or Ethernet link (47) to a centralised management server or system (60) for analysis and action.

The radio modem or transceiver (1, 6, 11, 16, 21, 26, 31) may be in the form of discrete cellular radio modems or cellular radio modems embedded within ‘systems on chip’ (SOCs), ‘systems on module’ (SOM) or ‘systems in package’ (SIP); or in the form of non-cellular radio transceivers in the form of a machine to machine (M2M) module based radio transceiver, a software defined radio (SDR) transceiver, a field programmable gate array (FPGA) based radio transceiver or application-specific integrated circuit (ASIC) based radio transceiver.

The radio network functional modules (36, 37, 38, 39, 40, 41, 42) may be equipped and configured to test, measure and either periodically or continuously monitor, and collect multiple radio network parameter measurements related to, multiple different radio networks, including multi-technology cellular, P25 and TETRA 2-way trunked radio services, Wi-Fi, and IoT-specific networks including LoRA, NB-IoT and CAT-M1/CAT-M2.

Each radio network functional module may be a separate internal physical or virtualised module. The network functional modules comprise any one or more of:

- one or more internal radio transceivers (1, 6, 11, 16, 21, 26, 31), which are adapted to receive radio signals from, and transmit radio signals to, any one or more cellular, P25, TETRA, Wi-Fi, NB-IoT, LoRA or CAT-M1/CAT-M2 radio networks;
- one or more internal radio antenna array modules (2, 7, 12, 17, 22, 27, 32) of types capable of receiving radio signals from, and transmitting radio signals to, cellular, P25, TETRA, Wi-Fi, NB-IoT, LoRA or CAT-M1/CAT-M2 radio networks;
- one or more radio antenna interface modules (3, 8, 13, 18, 23, 28, 33) and accompanying SMA, SMB, BNC, or similar antenna ports that support the connection of external radio antennas capable of receiving radio signals from, and transmitting radio signals to, cellular, P25, TETRA, Wi-Fi, NB-IoT, LoRA and CAT-M1/CAT-M2 radio networks if required;

As such, there is no need for dedicated user equipment (UE) such as cellular handsets, or P25 and TETRA radio handsets or Wi-Fi receivers or IoT sensors or scanning radio receivers, or for the tethers that would be required for those components to interoperate. Subsequently, numerous potential points of failure are removed, and reliability of operation is improved considerably.

The radio network monitoring device (100) has a processing unit (44) to control the operation of the radio network measurement modules, including but not limited to the collection of radio network measurement data originating from the monitoring and testing of radio networks, the execution of scripted tests of various target radio networks, the processing or partial processing and analysis of the radio network measurement data collected by the radio network functional modules, the management of the storage of the radio network measurement data, the control of the uploading of the radio network measurement data to the centralised management server or system (60), the downloading and execution of programmatic instructions including test scripts, and the application of upgrades and updates to the firmware and software running on the radio network monitoring device (100).

Reference is now made to FIG. 3, wherein the radio network monitoring device (100) of an embodiment of the present invention has one or more internal cellular radio modems (1) in the cellular radio network functional module (36). The internal cellular radio modems (1) in the form of discrete cellular modems or cellular modems embedded within ‘systems on chip’ (SOCs), ‘systems on modules’ (SOMs), or ‘systems in package’ (SIPs) are provided.

Each of the cellular radio modems (1) supports multi-cellular technology and multi-band radio communications capabilities covering all available low and high cellular bands.

Each of the cellular radio modems (1) are associated with a target cellular network to be tested, measured or monitored by using a physical subscriber identity module (SIM) card or a digital SIM such as an electronic SIM (eSIM), virtual SIM (vSIM), Remotely Provisioned SIM, or soft SIM, etc. As such, the cellular radio modem (1) may dynamically download or change the subscriber information on the digital SIM.

Each of the cellular radio modems (1) interface to an internal cellular antenna (2) and/or an external cellular antenna (5) connected by an appropriate co-axial or similar cable (4) to an antenna port (3) provided on the radio network monitoring device (100).

These internal and external cellular radio antennas (2, 5) may be passive or active cellular antennas, or a combination of passive and active cellular antennas, capable of receiving and transmitting cellular-modulated radio signals on various combinations of radio bands utilised for cellular radio communications.

External antennas may be required for specific use cases such as monitoring cellular coverage in remote areas, on construction vehicles and at mining sites. This arrangement allows the cellular radio modems to interact with, and to transmit radio signals to, and to receive radio signals from, the target cellular network or networks.

The cellular radio components together constitute a cellular radio network functional module (36).

Various tests of the target cellular radio networks, including, for example, voice calls, data downloads, and data uploads may be defined in the form of a series of operational instructions that are written as test scripts that are stored on internal memory accessible by the radio network monitoring device's internal central processing unit module (CPU) (44). These test scripts contain specific instructions that define the desired test sequences, and which are sent to the cellular radio modems by the CPU via an internal data bus connection (43) during the course of testing or measuring the target cellular radio networks. These scripted instructions control the operation of the cellular radio modems so as to test the target networks in specific ways—such as making repeated short voice calls, or downloading files from specific web sites, and in turn, to collect the various RF parameter measurement data that results from those tests. If desired, these test scripts can run periodically or continuously or in response to trigger events or alerts.

The radio network measurement data collected by the cellular radio modems (1) is transferred via an internal data bus (43) to one or more CPU modules (44), where certain parts of the recorded radio network measurement data may be extracted, decoded, and analysed. The CPU then manages the transfer of the collected cellular radio network measurement data from the cellular radio modems (1) to the internal non-volatile data storage module (45).

The radio network monitoring device (100) may be configured so as to then upload any or all of the cellular radio network measurement data that has been stored in the internal non-volatile data storage (45) over a cellular or Wi-Fi or Ethernet or cabled link to the centralised management server or system (60) during the period in which the monitoring and testing is occurring and whilst the radio network measurements are being made. In this mode of operation, the internal data non-volatile storage (45) acts to buffer the data during the transfer.

Alternatively, the radio network monitoring device may be configured so as retain any or all of the cellular radio network measurement data on the internal data storage module (45) until such time as either the user expressly downloads the stored data in part or in whole from the internal data storage module (45), or the data is downloaded in part or in whole in response to a timed or other programmatic instruction from the CPU (44) or from the centralised management server or system (60).

Preferably, the radio network monitoring device (100) can have zero, one or more internal P25 radio transceivers (6). The internal P25 radio transceivers (6) are each in the form of a discrete P25 radio transceiver or a SDR, FPGA, or ASIC-based P25 radio transceiver. Each of these P25 radio transceivers may provide multi-band radio communications capabilities covering all available P25 radio bands, which typically range from 200 MHz to 950 MHz.

In one implementation of an embodiment of the present invention, the internal P25 radio transceivers (6) may be pre-configured or dynamically programmed by the processor or processing unit (44) to cover different combinations of P25 radio bands and channels.

Each of these P25 radio transceivers (6) interface to either an internal P25 antenna module (7) or an external P25 antenna (10) connected by an appropriate co-axial or similar cable (9) to an antenna port (8) provided on the radio network monitoring device. These internal and external antennas may be a combination of passive and active antennas capable of receiving and transmitting P25 trunked radio-modulated radio signals on various combinations of P25 bands and channels.

This arrangement allows the P25 radio transceivers (6) to interact with, and to transmit radio signals to, and receive radio signals from, the target P25 network or networks. In this way, those same target P25 networks may be periodically or continuously monitored, measured, and tested, and various RF parameter data measured and collected and analysed, and various alerts generated.

The radio network monitoring device's P25 radio components together constitute the P25 radio functional module or network functional module (37).

Various tests of the target P25 radio networks, including for example voice calls, may be defined or pre-programmed in the form of test scripts that are stored on internal RAM memory accessible by the radio network monitoring device's CPU (44). These test scripts contain specific instructions that define the desired test sequences, and which are sent to the P25 radio transceivers (6) by the CPU (44) via an internal data bus connection (43) during the course of testing, measuring or monitoring of the target P25 radio networks. These scripted instructions control the operation of the P25 radio transceivers (6) so as to test the target P25 network in specific ways, and in turn, to collect the various RF parameter measurement data that results from those tests. If desired, these test scripts can run periodically or continuously or in response to trigger events or alerts.

The radio network monitoring device (100) may be optionally pre-programmed with instructions defining the particular combination of P25 RF parameters that it will monitor; or such instructions can be optionally downloaded to the radio network monitoring device (100) by a remote user, or by the centralised management server or system (60).

The radio network measurement data collected by the P25 radio transceivers (6) is transferred via an internal data bus connection (43) to one or more CPU modules (44), where certain parts of the recorded P25 radio network measurement data may be extracted, decoded and analysed. The CPU (44) then manages the transfer of the collected P25 radio network measurement data from the P25 radio transceivers (6) to the internal data storage module (45).

The radio network monitoring device (100) may be configured so as then upload any or all of the P25 radio network measurement data over a cellular or Wi-Fi or cabled link to the centralised management server or system (60) during the period in which the monitoring or measurement or testing is occurring and whilst the radio network measurements are being made. In this mode of operation, the internal data storage module acts to buffer the data during the transfer.

The radio network monitoring device (100) may also be pre-programmed or remotely re-programmed at any time with revised thresholds or ranges to be applied to each such monitored P25 RF parameter; these thresholds establishing the normal operating range for each such monitored P25 RF parameter.

Alternatively, the radio network monitoring device may be configured so as retain any or all of the P25 radio network measurement data on the internal data storage module (45) until such time as either the user expressly downloads the stored data in part or in whole from the internal data storage module (45), or the data is downloaded in part or in whole in response to a timed or other programmatic instruction from the CPU (44) or from the centralised management server or system (60).

Preferably, the radio network monitoring device (100) can have zero, one or more internal TETRA radio transceivers (11). The internal TETRA radio transceivers (11) are each in the form of a discrete TETRA radio transceiver or a SDR, FPGA, or ASIC-based TETRA radio transceiver. Each of these TETRA radio transceivers (11) may provide multi-band radio communications capabilities covering all available TETRA bands that typically range from 350 MHz to 450 MHz.

In one implementation of an embodiment of the present invention, the internal TETRA radio transceivers (11) may be pre-configured or dynamically programmed by the processor or processing unit (44) to cover different combinations of TETRA bands and channels.

Each of these TETRA radio transceivers (11) interface to either an internal TETRA antenna module (12) or an external TETRA antenna (15) connected by an appropriate co-axial or similar cable (14) to an antenna port (13) provided on the radio network monitoring device. These internal and external antennas may be a combination of passive and active antennas capable of receiving and transmitting TETRA trunked radio-modulated radio signals on various combinations of TETRA bands and channels.

This arrangement allows the TETRA radio transceivers (11) to interact with, and to transmit radio signals to, and receive radio signals from, the target TETRA network or networks. In this way, those same target TETRA networks may be periodically or continuously monitored, measured and tested, and various RF parameter data measured and collected and analysed, and various alerts generated.

The radio network monitoring device's TETRA radio components together constitute the TETRA radio functional module or network functional module (38).

Various tests of the target TETRA radio networks, including for example voice calls, data downloads, and data uploads may be defined or pre-programmed in the form of test scripts that are stored on internal RAM memory accessible by the radio network monitoring device's CPU (44). These test scripts contain specific instructions that define the desired test sequences, and which are sent to the TETRA radio transceivers (11) by the CPU (44) via an internal data bus connection (43) during the course of testing, measuring or monitoring of the target TETRA radio networks. These scripted instructions control the operation of the TETRA radio transceivers so as to test the target TETRA network in specific ways, and in turn, to collect the various RF parameter measurement data that results from those tests. If desired, these test scripts can run periodically or continuously or in response to trigger events or alerts.

The radio network monitoring device (100) may be optionally pre-programmed with instructions defining the particular combination of TETRA RF parameters that it will monitor; or such instructions can be optionally downloaded to the radio network monitoring device (100) by a remote user, or by the centralised management server or system (60).

The radio network measurement data collected by the TETRA radio transceivers (11) is transferred via an internal data bus connection (43) to one or more CPU modules (44), where certain parts of the recorded TETRA radio network measurement data may be extracted, decoded, and analysed. The CPU (44) then manages the transfer of the collected TETRA radio network measurement data from the TETRA radio transceivers (11) to the internal data storage module (45).

The radio network monitoring device (100) may be configured so as then upload any or all of the TETRA radio network measurement data over a cellular or Wi-Fi or cabled link to the centralised management server or system (60) during the period in which the monitoring or measurement or testing is occurring and whilst the radio network measurements are being made. In this mode of operation, the internal data storage module acts to buffer the data during the transfer.

The radio network monitoring device may also be pre-programmed or remotely re-programmed at any time with revised thresholds or ranges to be applied to each such monitored TETRA RF parameter; these thresholds establishing the normal operating range for each such monitored TETRA RF parameter.

Alternatively, the radio network monitoring device may be configured so as retain any or all of the TETRA radio network measurement data on the internal data storage module (45) until such time as either the user expressly downloads the stored data in part or in whole from the internal data storage module (45), or the data is downloaded in part or in whole in response to a timed or other programmatic instruction from the CPU (44) or from the centralised management server or system (60).

Preferably, the radio network monitoring device (100) can have zero, one or more internal Wi-Fi radio transceivers (16). The internal Wi-Fi radio transceivers (16) are each in the form of a discrete Wi-Fi radio transceiver or a SDR, FPGA, or ASIC-based Wi-Fi radio transceiver. Each of these Wi-Fi radio transceivers may provide multi-band, multi-channel radio communications capabilities covering all available Wi-Fi technologies and Wi-Fi bands such as 2.4 GHz, 5 GHZ, and 6 GHz.

In one implementation of an embodiment of the present invention, the internal Wi-Fi radio transceivers (16) may be pre-configured or dynamically programmed by the processor or processing unit (44) to cover different combinations of Wi-Fi bands and channels.

Each of these Wi-Fi radio transceivers (16) interface to either an internal Wi-Fi antenna module (17) or an external Wi-Fi antenna (20) connected by an appropriate co-axial or similar cable (19) to an antenna port (18) provided on the radio network monitoring device. These internal and external antennas may be a combination of passive and active antennas capable of receiving and transmitting Wi-Fi-modulated radio signals on various combinations of Wi-Fi bands, including 2.4 GHz, 5 GHZ, and 6 GHz.

This arrangement allows the Wi-Fi radio transceivers (16) to interact with, and to transmit radio signals to, and receive radio signals from, the target Wi-Fi network or networks. In this way, those same target Wi-Fi networks may be periodically or continuously monitored, measured, and tested, and various RF parameter data measured and collected and analysed, and various alerts generated.

The radio network monitoring device's Wi-Fi radio components together constitute the Wi-Fi radio functional module or network functional module (39).

Various tests of the target Wi-Fi radio networks, including for example data downloads and data uploads may be defined by the user in the form of test scripts that are stored on internal RAM memory accessible by the radio network monitoring monitor device's CPU (44). These test scripts contain specific instructions that define the desired test sequences, and which are sent to the Wi-Fi radio transceivers (16) by the CPU (44) via an internal data bus connection (43) during the course of testing, measuring or monitoring of the target Wi-Fi radio networks. These scripted instructions control the operation of the Wi-Fi radio transceivers (16) so as to test the target Wi-Fi networks in specific ways, and in turn, to collect the various RF parameter measurement data that results from those tests. If desired, these test scripts can run periodically or continuously or in response to trigger events or alerts. The Wi-Fi radio transceivers (16) will promiscuously measure all available Wi-Fi channels concurrently so as to identify all access points and client devices and their relationships, allowing the complete state of the entire Wi-Fi spectrum to be measured and understood, including the number and types of client devices attached to a given Wi-Fi channel and Wi-Fi access point at a given time and location; and the extent of the congestion on each Wi-Fi channel and Wi-Fi access point at a given time and location.

The radio network monitoring device (100) may be optionally pre-programmed with instructions defining the particular combination of Wi-Fi RF parameters that it will monitor; or such instructions can be optionally downloaded to the radio network monitoring device (100) by a remote user, or by the centralised management server or system (60).

The radio network measurement data collected by the Wi-Fi radio transceivers (16) is transferred via an internal data bus connection (43) to one or more CPU modules (44), where certain parts of the recorded Wi-Fi radio network measurement data may be extracted, decoded and analysed. The CPU (44) then manages the transfer of the collected Wi-Fi radio network measurement data from the Wi-Fi radio transceivers (16) to the internal data storage module (45).

The radio network monitoring device (100) may be configured so as then upload any or all of the Wi-Fi radio network measurement data over a cellular or Wi-Fi or cabled link to the centralised management server or system (60) during the period in which the RF monitoring or measuring or testing is occurring and whilst the radio network measurements are being made. In this mode of operation, the internal data storage module acts to buffer the data during the transfer.

The radio network monitoring device (100) may also be pre-programmed or remotely re-programmed at any time with revised thresholds or ranges to be applied to each such monitored Wi-Fi RF parameter; these thresholds establishing the normal operating range for each such monitored Wi-Fi RF parameter.

Alternatively, the radio network monitoring device may be configured so as retain any or all of the Wi-Fi radio network measurement data on the internal data storage module (45) until such time as either the user expressly downloads the stored data in part or in whole from the internal data storage module (45), or the data is downloaded in part or in whole in response to a timed or other programmatic instruction from the CPU (44) or from the centralised management server or system (60).

Preferably, the radio network monitoring device (100) can have zero, one or more internal LoRA radio transceivers (21). The internal LoRA radio transceivers (21) are each in the form of a discrete LoRA radio transceiver or a SDR, FPGA, or ASIC-based LoRA radio transceiver. LoRA supports long-range low-power radio communications with Internet of Things (IOT) devices. Each of these LoRA radio transceivers may provide multi-band, multi-channel radio communications capabilities covering all available LoRA radio bands and channels, such as 433 MHZ, 868 MHz, 865 MHZ, 867 MHZ, 902 MHZ, 915 MHz, and 923 MHz.

In one implementation of an embodiment of the present invention, the internal LoRA radio transceivers (21) may be pre-configured or dynamically programmed by the processor or processing unit (44) to cover different combinations of LoRA bands and channels.

Each of these LoRA radio transceivers (21) interface to either an internal LoRA antenna module (22) or an external LoRA antenna (25) connected by an appropriate co-axial or similar cable (24) to an antenna port (23) provided on the radio network monitoring device. These internal and external antennas may be a combination of passive and active antennas capable of receiving and transmitting LoRA-modulated radio signals on various combinations of LoRA bands.

This arrangement allows the LoRA radio transceivers (21) to interact with, and to transmit radio signals to, and receive radio signals from, the target LoRA network or networks. In this way, those same target LoRA networks may be periodically or continuously monitored, measured, and tested, and various RF parameter data measured, collected and analysed, and various alerts generated.

The radio network monitoring device's LoRA network radio components together constitute the LoRA radio functional module or network functional module (40).

Various tests of the target LoRA radio networks, including for example data downloads and data uploads may be defined by the user in the form of test scripts that are stored on internal RAM memory accessible by the radio network monitoring device's CPU (44). These test scripts contain specific instructions that define the desired test sequences, and which are sent to the LoRA radio transceivers (21) by the CPU (44) via an internal data bus connection (43) during the course of testing, measuring or monitoring of the target LoRA radio networks. These scripted instructions control the operation of the LoRA radio transceivers (21) so as to test the target LoRA networks in specific ways, and in turn, to collect the various RF parameter measurement data that results from those tests. If desired, these test scripts can run periodically or continuously or in response to trigger events or alerts.

The radio network monitoring device (100) may be optionally pre-programmed with instructions defining the particular combination of LORA RF parameters that it will monitor; or such instructions can be optionally downloaded to the radio network monitoring device (100) by a remote user, or by the centralised management server or system (60).

The radio network measurement data collected by the LoRA radio transceivers (21) is transferred via an internal data bus connection (43) to one or more CPU modules (44), where certain parts of the recorded LoRA radio network measurement data may be extracted, decoded and analysed. The CPU (44) then manages the transfer of the collected LoRA radio network measurement data from the LoRA radio transceivers (21) to the internal data storage module (45).

The radio network monitoring device (100) may be configured so as then upload any or all of the LoRA radio network measurement data over a cellular or Wi-Fi or cabled link to the centralised management server or system (60) during the period in which the monitoring or measurement or testing is occurring and whilst the radio network measurements are being made. In this mode of operation, the internal data storage module acts to buffer the data during the transfer.

The radio network monitoring device (100) may also be pre-programmed or remotely re-programmed at any time with revised thresholds or ranges to be applied to each such monitored LoRA RF parameter; these thresholds establishing the normal operating range for each such monitored LoRA RF parameter.

Alternatively, the radio network monitoring device may be configured so as retain any or all of the LoRA radio network measurement data on the internal data storage module (45) until such time as either the user expressly downloads the stored data in part or in whole from the internal data storage module (45), or the data is downloaded in part or in whole in response to a timed or other programmatic instruction from the CPU (44) or from the centralised management server or system (60).

Preferably, the radio network monitoring device (100) can have zero, one or more internal NB-IoT cellular radio modems (26). The internal NB-IoT cellular radio modems (26) are each in the form of a discrete NB-IoT-capable cellular modem, or an NB-IoT-capable cellular modem embedded within a SOC, SOM or SIP. NB-IoT supports narrowband low-power radio communications with Internet of Things (IOT) devices.

In one implementation of an embodiment of the present invention, the internal NB-IoT-capable cellular radio modems may be pre-configured or dynamically programmed by the processor or processing unit (44) to utilise different combinations of LTE bands and channels that are used for NB-IoT.

Each of these NB-IoT cellular radio modems (26) interface to either an internal NB-IoT antenna module (27) or an external NB-IoT antenna (30) connected by an appropriate co-axial or similar cable (29) to an antenna port (28) provided on the radio network monitoring device. These internal and external antennas may be a combination of passive and active antennas capable of receiving and transmitting NB-IoT-modulated cellular radio signals on various combinations of LTE bands.

This arrangement allows the NB-IoT cellular radio modems (26) to interact with, and to transmit radio signals to, and receive radio signals from, the target NB-IoT cellular LTE network or networks. In this way, those same target NB-IoT cellular LTE networks may be periodically or continuously monitored, measured, and tested, and various RF parameter data measured and collected and analysed, and various alerts generated.

The radio network monitoring device's NB-IoT network radio components together constitute the NB-IoT radio functional module or network functional device (41).

Various tests of the target NB-IoT cellular radio networks, including for example data downloads and data uploads may be defined or pre-programmed by the user in the form of test scripts that are stored on internal RAM memory accessible by the radio network monitoring device's CPU (44). These test scripts contain specific instructions that define the desired test sequences, and which are sent to the NB-IoT radio modems (26) by the CPU (44) via an internal data bus connection (43) during the course of testing, measuring or monitoring of the target NB-IoT radio networks. These scripted instructions control the operation of the NB-IoT radio modems (26) so as to test the target NB-IoT cellular networks in specific ways, and in turn, to collect the various RF parameter measurement data that results from those tests. If desired, these test scripts can run periodically or continuously or in response to trigger events or alerts.

The radio network monitoring device (100) may be optionally pre-programmed with instructions defining the particular combination of NB-IoT RF parameters that it will monitor; or such instructions can be optionally downloaded to the radio network monitoring device (100) by a remote user, or by the centralised management server or system (60).

The radio network measurement data collected by the NB-IoT RF radio modems (26) is transferred via an internal data bus connection (43) to one or more CPU modules (44), where certain parts of the recorded NB-IoT radio network measurement data may be extracted, decoded and analysed. The CPU (44) then manages the transfer of the collected NB-IoT radio network measurement data from the NB-IoT radio modems (26) to the internal data storage module (45).

The radio network monitoring device (100) may be configured so as then upload any or all of the NB-IoT radio network measurement data over a cellular or Wi-Fi or cabled link to the centralised management server or system (60) during the period in which the monitoring or measurement or testing is occurring and whilst the radio network measurements are being made. In this mode of operation, the internal data storage module acts to buffer the data during the transfer.

The radio network monitoring device (100) may also be pre-programmed or remotely re-programmed at any time with revised thresholds or ranges to be applied to each such monitored NB-IoT RF parameter; these thresholds establishing the normal operating range for each such monitored NB-IoT RF parameter.

Alternatively, the radio network monitoring device may be configured so as retain any or all of the NB-IoT radio network measurement data on the internal data storage module (45) until such time as either the user expressly downloads the stored data in part or in whole from the internal data storage module (45), or the data is downloaded in part or in whole in response to a timed or other programmatic instruction from the CPU (44) or from the centralised management server or system (60).

Preferably, the radio network monitoring device (100) can have zero, one or more internal CAT-M1/CAT-M2 cellular radio modems (31). The internal CAT-M1/CAT-M2 cellular radio modems (31) are each in the form of a discrete CAT-M1 and/or CAT-M2-capable cellular modem, or a CAT-M1 and/or CAT-M2-capable cellular modem embedded within a SOC, SOM or SIP. CAT-M1 and CAT-M2 support cellular radio-based communications with Internet of Things (IOT) devices.

In one implementation of an embodiment of the present invention, the internal CAT-M1 and/or CAT-M2-capable cellular radio modems (31) may be pre-configured or dynamically programmed by the processor or processing unit (44) to utilise specific LTE bands and channels that are used for CAT-M1 and/or CAT-M2.

Each of these CAT-M1/CAT-M2 cellular radio modems (31) interface to either an internal cellular antenna module (32) or an external cellular antenna (35) connected by an appropriate co-axial or similar cable (34) to an antenna port (33) provided on the radio network monitoring device. These internal and external antennas may be a combination of passive and active antennas capable of receiving and transmitting CAT-M1/CAT-M2-modulated cellular radio signals on various combinations of cellular bands.

This arrangement allows the CAT-M1/CAT-M2 enabled cellular radio modems (31) to interact with, and to transmit radio signals to, and receive radio signals from, the target CAT-M1/CAT-M2 cellular LTE networks. In this way, those same target CAT-M1/CAT-M2 cellular LTE networks may be periodically or continuously monitored, measured, and tested, and various RF parameter data measured and collected and analysed, and various alerts generated.

The radio network monitoring device's CAT-M1/CAT-M2 network radio components together constitute the CAT-M1/CAT-M2 radio functional module (42).

Various tests of the target CAT-M1/CAT-M2 cellular radio networks, including for example data downloads and data uploads may be defined or pre-programmed by the user in the form of test scripts that are stored on internal RAM memory accessible by the radio network monitoring device's CPU (44). These test scripts contain specific instructions that define the desired test sequences, and which are sent to the CAT-M1/CAT-M2 cellular radio modems (31) by the CPU (44) via an internal data bus connection (43) during the course of testing, measuring or monitoring of the target CAT-M1/CAT-M2 cellular radio networks. These scripted instructions control the operation of the CAT-M1/CAT-M2 capable cellular radio modems (31) so as to test the target CAT-M1/CAT-M2 cellular networks in specific ways, and in turn, to collect to the various RF parameter measurement data that results from those tests. If desired, these test scripts can run periodically or continuously or in response to trigger events or alerts.

The radio network monitoring device (100) may be optionally pre-programmed with instructions defining the particular combination of CAT-M1/CAT-M2 RF parameters that it will monitor; or such instructions can be optionally downloaded to the radio network monitoring device (100) by a remote user, or by the centralised management server or system (60).

The radio network measurement data collected by the CAT-M1/CAT-M2 radio modems (31) is transferred via an internal data bus connection (43) to one or more CPUs (44), where certain parts of the recorded CAT-M1/CAT-M2 radio network measurement data may be extracted, decoded and analysed. The CPU (44) then manages the transfer of the collected CAT-M1/CAT-M2 radio network measurement data from the CAT-M1/CAT-M2 capable cellular radio modems (31) to the internal data storage module (45).

The radio network monitoring device (100) may be configured so as then upload any or all of the CAT-M1/CAT-M2 radio network measurement data over a cellular or Wi-Fi or cabled link to the centralised management server or system (60) during the period in which the monitoring or measurement or testing is occurring and whilst the radio network measurements are being made. In this mode of operation, the internal data storage module acts to buffer the data during the transfer.

The radio network monitoring device (100) may also be pre-programmed or remotely re-programmed at any time with revised thresholds or ranges to be applied to each such monitored CAT-M1/CAT-M2 RF parameter; these thresholds establishing the normal operating range for each such monitored CAT-M1/CAT-M2 RF parameter.

Alternatively, the radio network monitoring device may be configured so as retain any or all of the CAT-M1/CAT-M2 radio network measurement data on the internal data storage module (45) until such time as either the user expressly downloads the stored data in part or in whole from the internal data storage module (45), or the data is downloaded in part or in whole in response to a timed or other programmatic instruction from the CPU (44) or from the centralised management server or system (60).

The processing unit module (CPU) (43) may also schedule the operation of each of the radio network functional modules (36, 37, 38, 39, 40, 41, 42) for optimal communication and to minimise interference. Optionally, each network functional module (36, 37, 38, 39, 40, 41, 42) may associate with a temperature sensor and passive or active cooling system. The processing unit module (CPU) (43) may monitor the heat distribution in the radio network monitoring device (100) and schedule the operation of the radio network functional modules (36, 37, 38, 39, 40, 41, 42) to avoid overheating.

In one embodiment, the processing unit (44) is adapted to continuously write the radio network measurement data in a journaling or similar format to a fault-tolerant data structure in the internal non-volatile data storage (45). As such, the integrity of the radio network measurement data that is recorded and stored in the internal non-volatile data storage (45) is preserved if a fault occurs during the operation of the radio network monitoring device or if the power fails during the operation of the radio network monitoring device (100).

The processing unit (44) may also schedule or synchronise the radio network functional modules (36, 37, 38, 39, 40, 41, 42) to enhance their operation and to optimise radio signal reception characteristics.

In one preferred embodiment, the radio network monitoring device (100) is designed on the basis of an inherently scalable and extensible modularised radio architecture, an inherently scalable and extensible modularised CPU architecture, an inherently scalable and extensible modularised antenna architecture, and an inherently scalable and extensible modularised data storage architecture. This provides flexibility in provisioning different combinations of radio transceiver or radio modem, CPU, antenna, and data storage to meet specific deployment and end user requirements and radio network testing, measuring, and monitoring scenarios. Furthermore, it allows for additional types of radio transceivers to be added in order to periodically or continuously monitor, test and measure other types of radio networks, such as maritime radio, aircraft bands, military radio and private radio. When these additional types of radio transceivers are added, the use and interoperability of the internal and external antenna arrangements, the internal bus architecture, and the internal CPU and data storage modules as described above are retained.

A modular, self-contained, and scalable hardware architecture in the embodiment of the present invention can eliminate the need for external cellular handsets, P25 or TETRA radio handsets, Wi-Fi access points, scanning radio receivers, and IoT sensors as radio transceivers, and the need for external computing and external data storage devices, together with the physical or wireless tethers necessary to interconnect such separate physical devices. In this way, potential points of failure are eliminated, and the reliability of the radio network monitoring device is enhanced.

In another preferred embodiment, each individual radio network monitoring device (100) can be easily built and configured at the point of manufacture with none, one or more than one cellular radio modems (1), none, one or more than one P25 radio transceivers (6), none, one or more than one TETRA radio transceivers (11), none, one or more than one Wi-Fi radio transceivers (16), none, one or more than one LoRA radio transceivers (21), none, one or more than one NB-IoT capable cellular radio modems (26) and none, one or more than one CAT-M1/CAT-M2 capable cellular radio modems (31). In this way, individual radio network monitoring devices (100) can be configured on a cost-optimised basis so as to address specific deployment scenarios and use cases.

Further, the radio network monitoring device (100) of a preferred embodiment has none, one or more of each of the cellular (1), P25 (6), TETRA (11), Wi-Fi (16), LoRA (21), NB-IoT (26) and CAT-M1/CAT-M2 (31) radio modems or transceivers that can be operated separately or simultaneously, and the radio network monitoring device (100) is therefore capable of concurrently monitoring, testing, measuring and recording radio network measurement data pertaining to multiple cellular radio bands and channels, multiple P25 radio bands and channels, multiple TETRA radio bands and channels, multiple Wi-Fi radio bands and channels, multiple LoRA cellular bands and channels, multiple NB-IoT cellular bands and channels and multiple CAT-M1/CAT-M2 bands and channels simultaneously.

In one embodiment, the radio network monitoring device (100) is adapted to have the operation of each of the internal cellular, P25, TETRA, Wi-Fi, LORA, NB-IoT and CAT-M1/CAT-M2 radio transceivers and modems to be independently controlled using pre-defined sets of monitoring or test configurations, and monitoring or test sequence instructions that are contained within test scripts.

The processing unit (44) of the radio network monitoring device (100) may include one or more data analysis or artificial intelligence modules that determine how to respond to the events triggered by the radio network measurement data collected by, and the feedback of, the radio network functional modules (36, 37, 38, 39, 40, 41, 42). Further, the radio network monitoring device (100) may be optionally controlled remotely by a user communicating with the processing unit (44) of the radio network monitoring device (100), or programmatically by the centralised management server or system (60) issuing instructions to the processing unit (44) of the radio network monitoring device (100). In this way, individual network functional modules (36, 37, 38, 39, 40, 41, 42) may be remotely enabled or disabled, or their operation altered.

In this way, any individual cellular modem (1) can be set to progressively cycle through multiple cellular radio bands or multiple cellular radio channels to collect radio network measurement data from each, or can be locked onto a particular cellular radio band or particular cellular radio channel to collect radio network measurement data from it; any individual P25 radio transceiver can be set to progressively cycle through multiple P25 radio bands or multiple P25 radio channels to collect radio network measurement data from each, or can be locked onto a particular P25 radio band or particular P25 radio channel to collect radio network measurement data from it; any individual TETRA radio transceiver can be set to progressively cycle through multiple TETRA radio bands or multiple TETRA radio channels to collect radio network measurement data from each, or can be locked onto a particular TETRA radio band or particular TETRA radio channel to collect radio network measurement data from it; any individual Wi-Fi radio transceiver can be set to progressively cycle through multiple Wi-Fi radio bands or multiple Wi-Fi radio channels to collect radio network measurement data from each, or can be locked onto a particular Wi-Fi radio band or particular Wi-Fi radio channel to collect radio network measurement data from it; any individual LoRA radio transceiver can be set to progressively cycle through multiple LoRA radio bands or multiple LoRA radio channels to collect radio network measurement data from each, or can be locked onto a particular LoRA radio band or particular LoRA radio channel to collect radio network measurement data from it; any individual NB-IoT capable cellular modem can be set to progressively cycle through multiple NB-IoT cellular radio bands or multiple NB-IoT cellular radio channels to collect radio network measurement data from each, or can be locked onto a particular NB-IoT cellular radio band or particular NB-IoT cellular radio channel to collect radio network measurement data from it; and any individual CAT-M1/CAT-M2 capable cellular modem can be set to progressively cycle through multiple CAT-M1/CAT-M2 cellular radio bands or multiple CAT-M1/CAT-M2 cellular radio channels to collect radio network measurement data from each, or can be locked onto a particular CAT-M1/CAT-M2 cellular radio band or particular CAT-M1/CAT-M2 cellular radio channel to collect radio network measurement data from it.

Preferably, the radio network monitoring device (100) can be actively monitored, managed, and controlled by a user or by the centralised management server or system (60) whilst monitoring or measuring or testing one or more radio networks; or it can be configured so as to not require any active monitoring, management, or control by a user or by the centralised management server or system (60) whilst monitoring or testing—to allow fully autonomous, zero-touch operation.

In one embodiment, the processing unit (44) is adapted to periodically measure prescribed RF parameters associated with a given radio network or networks, including but not limited to transmission power levels, signal to noise ratios, signal quality measures and transmitter identifiers, and storing the radio network measurement data on internal non-volatile memory for later processing, or for transmission to the centralised management server or system (60).

In one embodiment, the processing unit (44) is adapted to receive one or more normal operating range values from a user or the centralised management server or system (60) for any of the RF parameters that the radio network monitoring device (100) measures whilst monitoring any radio network, and the frequencies at which each of the periodic measurements of each of those radio networks are to be made. The operating range of a particular RF parameter may be defined by an upper and a lower threshold; or as an average level and an operating tolerance constrained by upper and lower threshold values for that particular parameter.

In one embodiment, the processing unit (44) is adapted to automatically and autonomously derive a normal operating range for any of the RF parameters that the radio network monitoring device (100) measures whilst monitoring any radio network, and the frequencies with which each of these periodic measurements are to be made. The processing unit (44) is adapted to derive a normal operating range for any given RF parameter by measuring that parameter for a period of time and then algorithmically determining the normal operating range for that RF parameter using statistical modelling.

In another embodiment, the processing unit (44) is adapted to automatically and autonomously alter any threshold that defines the normal operating range for any of the monitored RF parameters, based on the radio network monitoring device's (100) analysis of the radio network measurement data it collects.

The processing unit (44) of the radio network monitoring device (100) can compare any particular RF parameter measurement that it records with the normal operating range for that particular RF parameter to determine whether the measurement falls within the normal operating range for that particular RF parameter or falls outside of the normal operating range for that particular RF parameter. Such a comparison can either occur immediately after the RF parameter is measured by the radio network monitoring device (100), or at any time after the measurement is made by retrieving the measurement data from the internal non-volatile memory (45). In one embodiment, the radio network monitoring device (100) is adapted to autonomously determine whether a measurement is within operating thresholds. In another embodiment, the radio network monitoring device (100) is adapted to collect the radio network measurement data, and forward it—either immediately or periodically—to the centralised management server or system (60), where the data is decoded and analysed, a determination as to whether particular RF parameters are within their respective normal operating limits is made, and alerts generated if required.

The processing unit (44) is adapted to measure particular combinations of RF parameters pertaining to prescribed networks, store the resulting radio network measurement data in internal non-volatile memory, and retrieve that measurement data at a later point in time to batch process it and determine whether user-definable combinations of RF parameters fall within their normal operating ranges.

Preferably, the processing unit (44) is adapted to determine whether additional measurements of the same or different RF parameters should be made in order to determine whether any particular radio network is operating normally after measuring particular RF parameters and comparing those parameters to the normal operating ranges for each such parameter.

The processing unit (44) may generate an alert if any RF parameter pertaining to one or more monitored radio networks is found to be outside of the normal operating range for that RF parameter, or if any combination of RF parameters are found to be outside of the normal operating ranges for that combination of RF parameters.

In one preferred embodiment, the radio network monitoring device (100) can forward an alert to a defined set of recipients. Alerts may be communicated in electronic form, including via email or short message service (SMS) text message; or may be communicated audibly via a sound alarm or visually via a light alarm, or as an event in a trouble ticketing, help desk or similar external system.

The alert may include a hyperlink that a user can click on to be directed to a system or portal or web page that contains details of the alert, including details of the physical location of the radio network monitoring device, details of the monitored radio network that has triggered the alert, and relevant radio network measurement data.

In another embodiment, the processing unit (44) is adapted to forward an alert to the centralised management server or system (60) via an application programming interface (API), or as a data payload in a flow-based data stream that uses a protocol such as NetFlow, sFlow, jFlow, or IPFIX, or similar data communication format.

Preferably, the centralised management server or system (60) complements the radio network monitoring device (100) by remotely administering one or more radio network monitoring devices (100); importing, storing, decoding and analysing radio network measurement data from one or more radio network monitoring devices (100); and optionally generating alerts if any RF parameter pertaining to one or more monitored radio networks is found to be outside of the normal operating range for that particular RF parameter, or if any combination of RF parameters are found to be outside of the normal operating ranges for that particular combination of RF parameters. Such administration and alert generation may be programmatically automated, or may be triggered manually by a user of the centralised management server or system (60).

In one embodiment, the centralised management server or system (60) incorporates a database or in which radio network measurement and alert data imported from one or more remote radio network monitoring devices (100), and the RF parameter data that has been extracted from the RF measurement data, can be stored indefinitely, and where that data can be processed, queried, visualised, reported upon, and analysed by users of the centralised management server or system (60), or by data analytics applications that run on the centralised management server or system (60).

The radio network monitoring device (100) may be pre-programmed with instructions defining which particular combination of RF parameters to monitor; or such instructions can be downloaded to the radio network monitoring device (100) by a remote user or the centralised management server or system (60) at any time via either a wireless connection (46) or ethernet connection (47). The RF parameters to be monitored may include for example the amount of received power in a particular band, represented by RSRP; or the signal to noise ratio, represented by SiNR; or the serving cell identifier, represented by PCI.

The radio network monitoring device (100) may also be pre-programmed or remotely re-programmed at any time with revised RF parameter thresholds or RF parameter normal operating ranges to be applied to each such monitored RF parameter; these thresholds establishing the normal operating range for each such monitored RF parameter.

When being actively monitored, managed, and controlled by a user during a test of a radio network, the user can interact with the radio network monitoring device via the centralised management server or system (60) connected to the radio network monitoring device (100) by either a wireless connection made to the radio network monitoring device's (100) internal Wi-Fi access point (46) or by a cabled ethernet connection (48) made to the radio network monitoring device's (100) ethernet port (47) or by a cellular connection made to one of the radio network monitoring device's (100) cellular radio modems (1).

Once this connection to the centralised management server or system (60) is made, the user can direct a standard web browser to the radio network monitoring device's (100) internal web server provided by the CPU (44) which will afford the user access to the radio network monitoring device's (100) administration portal. This administration portal can be used to query the status of the radio network monitoring device (100) and of the individual radio network functional modules (36, 37, 38, 39, 40, 41, 42) and components that constitute the radio network monitoring device (100); control the overall operation of the radio network monitoring device (100), control the operation of the individual radio modems and radio transceivers (1), (6), (11), (16), (21), (26) and (31); initiate and stop testing, measurement and monitoring of radio networks; write and execute test scripts; schedule automated test sequences; trigger downloads of radio network measurement data via an Ethernet connection (48) made to the Ethernet port (47), or via the Wi-Fi access point (46) or via one of the cellular radio modems (1); undertake housekeeping tasks such as the deletion of old radio network measurement data; and apply software and firmware upgrades and updates to the various modules and components that constitute the radio network monitoring device (100).

In one embodiment, the radio network monitoring device (100) comprises a power module adapted to receiving Power over Ethernet (POE) so as to lower installation costs; or optionally by an external direct current (DC) power source, or an external alternating current (AC) power source.

In another preferred embodiment, the radio network monitoring device (100) is powered by an internal battery (50). This aids portability, simplicity, and reliability. A related feature of the radio network monitoring device is that provision is made for it to be optionally powered by an external source of electrical power (52) via a power cable (51) connected to an external power port (49). This supports long-term monitoring of large numbers of radio networks, and also permanent or semi-permanent fixing of the radio network monitoring device (60) to a vehicle for untended and therefore fully autonomous testing and measurement of radio networks. The uses of one or more internal battery modules may provide power to the radio network monitoring device (100) to support autonomous operation.

In one embodiment of the present invention, the radio network monitoring device (100) is equipped with one or more internal geo-location receiving modules, that are capable of receiving signals from external radionavigation systems such as GPS, GLONASS, Galileo, BeiDou, NavIC, and QZSS (53) through a suitable internal antenna (56) or external antenna (54) that is connected to an external antenna port (57) on the radio network monitoring device (100) by a cable (55).

The radio network monitoring device (100) is adapted to use the signals received from external radionavigation systems (53) to establish the geographic location of the radio network monitoring device (100) at the time at which a particular radio network measurement was made so that the radio network measurement data captured by the radio network monitoring device (100) can be accurately geo-located.

These geo-location signals are decoded within the radio network monitoring device (100) and the geo-location information is then persistently associated with the radio network measurement data in order to establish the precise geographic location at which particular radio network measurements are made.

Preferably, the radio network monitoring device (100) is self-contained, light weight, highly portable and is able to operate in fully-autonomous mode as a zero-touch device. This contrasts with traditional radio network testing and measurement systems which comprise multiple physically separate components, including cellular handsets, radios and RF scanners, computers, and data storage devices that must interoperate and that must be actively controlled and managed by a skilled technician.

The radio network monitoring device (100) has a modular, self-contained, extensible, and scalable hardware architecture. The radio network monitoring device (100) eliminates the need for external cellular handsets, P25 or TETRA radio handsets, Wi-Fi access points, scanning radio receivers or IoT sensors as radio receivers, and the need for external computing and external data storage devices, together with the physical or wireless tethers necessary to connect such separate physical devices and allow them to interoperate.

The radio network monitoring device (100) also has a processor to control the operation of the network monitoring device and of network measurement modules, including but not limited to the monitoring of radio networks, the testing of radio networks by executing test scripts and the collection of resulting radio network measurement data, the processing or partial processing of the radio network measurement data collected by the radio modules, and the management of the storage, processing, analysis and uploading of the radio network measurement data.

The processing unit (44) is adapted to allow users to configure and periodically or continuously execute specific tests of multiple heterogeneous radio networks in scripts containing sequenced test steps, including but not limited to, placing voice calls, and downloading data from specific servers so that the radio network monitoring device (100) can measure the effects of the tests on the radio networks being tested and collect radio network measurement data.

The test scripts may allow each of the modems and radio transceivers including, but not limited to, the multi-band capable cellular modems (1), the multi-band and multi-channel capable P25 radio transceivers (6), the multi-band and multi-channel capable TETRA radio transceivers (11), multi-band and multi-channel capable Wi-Fi radio transceivers (16), the multi-band and multi-channel capable LoRA radio transceivers (21), the multi-band and multi-channel capable NB-IoT cellular radio modems (26), and the multi-band and multi-channel CAT-M1/CAT-M2 capable cellular radio modems (31) to run separately and concurrently so as to simultaneously measure, monitor and test multiple heterogeneous radio networks.

The radio network monitoring device (100) is adapted to be installed with pre-configured tests of one or more monitored radio networks. These tests may include, but not be limited to, the making of voice calls on a cellular or trunked radio network, or the downloading or uploading of data on a Wi-Fi network or IoT network. These tests may be defined by the user in the form of a series of operational instructions that are written as test scripts that are stored within each radio network monitoring device (100) and that can be executed by each radio network monitoring device (100), on a periodic or continuous basis, or in response to programmatic instructions or by being triggered by the remote user. The response of the monitored radio network to the execution of these tests then generates a range of RF parameters that the radio network monitoring device (100) can monitor and measure and capture in the form of recorded radio network measurement data.

The radio network monitoring device (100) preferably comprises one or more fixed or removable non-volatile data storage devices (45) to store the radio network measurement data collected by the radio network functional modules (36, 37, 38, 39, 40, 41, 42).

In one preferred embodiment, the radio network monitoring device (100) comprises one or more wireless communication devices used to establish a mesh network between multiple radio network monitoring device (100) so as to allow any radio network monitoring device (100) to convey data or alerts or other data payload to the centralised management server or system (60) by forwarding the data and alerts to another radio network monitoring device (100), which can in turn can convey the data or alerts or other data payload to the centralised management server or system (60), or on to another radio network monitoring device (100), and so on until such time as any radio network monitoring device (100) can convey the data or alerts or other data payload to the centralised management server or system (60).

In one embodiment of the present invention, multiple radio network monitoring devices (100) can automatically self-organise into a mesh network, utilising either wireless or Ethernet connections, such that each radio network monitoring device (100) becomes a node within a localised mesh network. In this way, if one or more individual radio network monitoring devices (100) lose the ability to communicate alerts or radio network measurement data, or other data payload to users or to the external centralised management server or system (60) via default cellular or Wi-Fi connection routes, the affected radio network monitoring devices can transmit that data or alert or other data payload via the mesh network to other radio network monitoring devices (100). This transfer of radio network monitoring data, or alert or other data payloads continues from one radio network monitoring device (100) in the mesh network to another radio network monitoring device (100) on that mesh network until the radio network measurement data or alert or other data payload reaches a radio network monitoring device (100) that is able to establish a wireless or Ethernet or other connection to the internet, therefore allowing the radio network measurement data or alert or data payload to reach the user or the centralised management server or system (60).

The external centralised management server or system (60) of an embodiment of the present invention is adapted to receive radio network measurement data or alert notifications from one or more radio network monitoring devices (100) and apply a set of pre-defined or automatically-derived rules and algorithmic functions to the data or alerts so as to determine whether the performance of any one or more monitored radio networks warrants that a specific action be taken, and then to optionally trigger such an action.

Each of the individual or multiple radio network monitoring devices (100) and the external centralised management server or system (60) are adapted to forward radio network radio network measurement data pertaining to one or more monitored radio networks to a self-optimising network (SON) controller in real-time or in near real-time, thus enabling the SON controller to optimise the performance of the monitored radio networks.

Each of the individual or multiple radio network monitoring devices is adapted to upload radio network measurement data or alerts to the external centralised management server or system (60) or network or SON controller by either a wireless or wired connection.

This radio network measurement data can be forwarded either directly from the radio network monitoring device to the SON controller or system, or indirectly from the centralised management server or system (60). In this way, the effects on coverage and quality resulting from optimisation changes made to radio networks including cellular networks by SON controllers or systems can be immediately determined by one or more radio network monitoring devices (100) operating at locations impacted by those changes, allowing the SON system to improve its optimisation of such networks.

The radio network monitoring device (100) further comprises a geo-location module capable of receiving signals from external radionavigation systems such as GPS, GLO- NASS, Galileo, BeiDou, NavIC, and QZSS (53) and using those signals to establish the geographic location of the radio network monitoring device, and to persistently associate radio network measurement data with geographic location data so as to accurately geo-locate all recorded network measurement data.

The radio network monitoring device (100) further comprises an internal battery module (50) to provide power to the radio network monitoring device (100). The internal battery module (50) may comprise a charging and discharging management circuit and a rechargeable battery. The charging and discharging management circuit is adapted to manage the optimal charging and discharging of the rechargeable battery. The radio network monitoring device (100) also has a power interface module that supports the connection of external batteries or power sources (52).

In another preferred embodiment, the internal battery module (50) has its own individual battery thermal management unit. The battery thermal management unit may comprise one or more temperature sensors and a passive or active cooling system associated with the charging and discharging management circuit to control the temperature of the internal battery module.

In one preferred embodiment, the radio network monitoring device (100) of the present invention comprises a machine-to-machine interface to connect an external computer or smart device such as a smart phone or tablet to the radio network monitoring device (100) by either a wireless or wired connection to allow the radio network monitoring device (100) to be monitored and managed during the course of its operation.

In one embodiment, the radio network monitoring device (100) is adapted to be optionally configured to operate autonomously. As such, the radio network monitoring device (100) automatically enters a discovery mode and measures a prescribed combination of RF parameters pertaining to the radio networks being monitored for a set time period after it is powered on or if it is initialised. In the discovery mode, the radio network monitoring device (100) is adapted to scan a wide range of radio spectrum using each of its internal radio network modules (36, 37, 38, 39, 40, 41, 42).

The measured RF parameters are then analysed by the radio network monitoring device (100) to derive a set of statistics for each of the measured RF parameters, including an average level and standard deviation for each. This statistical data is then used to automatically derive the limits of the normal operating range for each measured RF parameter, and the setting of thresholds for each RF parameter. Once the radio network monitoring device (100) has completed this discovery, it automatically transitions to normal operational mode.

In its normal operational mode or normal operation state, the radio network monitoring device (100) periodically measures each of the RF parameters that it has been programmed to monitor, and the processing unit (44) compares each RF parameter measurement with the normal operating range for that RF parameter. The frequency with which these measurements are made, and the sequence in which particular RF parameters are measured can be pre-programmed or re-programmed at any time by a remote user or programmatically by the centralised management server or system (60).

If the measured result for any monitored radio network RF parameter is found to be within the normal operating range for that network, then the radio network monitoring device (100) records the data on the internal non-volatile data storage module (45) for later processing by the radio network monitoring device (100), or for transmission of that data to the external centralised management server or system (60) for further analysis, and continues its monitoring cycle.

If the measured result for any monitored radio network RF parameter is found to be outside of the normal operating range for that parameter, then the radio network monitoring device (100) can either immediately generate an alert notification and direct it to a specified user or group of users or system via an auto-generated email or short message service (SMS) message or similar means; or to the centralised management server or system (60) or SON controller via a data message sent through an application program interface (API).

The radio network monitoring device (100) can also continuously and independently analyse the network radio network measurement data it accumulates in the internal non-volatile data storage module (45) to determine whether the performance of a monitored radio network is such that an alert notification should be generated and sent to either a user or the centralised management server or system (60).

The centralised management server or system (60) imports the radio network measurement data from one or more radio network monitoring devices (100), decodes and analyses that data, and determines if any aspect of the performance of any monitored network has fallen outside of its normal operating range. In this way, the external centralised management server or system (60) rather than the individual radio network monitoring devices (100) may optionally analyse the radio network measurement data, and generate alert notifications if necessary.

In another embodiment, the processing unit (44) is programmable to allow the radio network monitoring device (100) to be actively monitored and managed by a user whilst monitoring radio networks and collecting radio network measurement data; or that can instead be deployed in such a way that no such active monitoring or management or control of the radio network monitoring device (100) is required whilst it is operational, thus enabling fully automated and autonomous measurement of radio networks and gathering and analysis of radio network measurement data, and zero-touch operation. This supports widescale and frequent measurement of radio networks using standard fleet vehicles, including those operated by postal and parcel/mail delivery operators, waste collection and disposal companies, taxi and ride share providers and by and on behalf of government agencies and departments such as those providing first responder and emergency response services. This is an important feature of the radio network monitoring device (100).

In one embodiment, the processing unit (44) is adapted to connect to a user device for monitoring and managing the plurality of removable radio network functional modules whilst collecting radio network measurement data in real time.

In another embodiment, the processing unit (44) has a communication module to connect to a user device remotely via wireless connection for periodically or continuously determining the status of the radio network monitoring device (100) and of the measurements being made. In this way, the radio network monitoring device (100) can be controlled whilst it is monitoring one or more radio networks such that a remotely-located user may periodically or continuously determine the status of the radio network monitoring device (100) and therefore for the networks being monitored, and may alter the configuration and operation of the radio network monitoring device so as to change the way in which the radio network monitoring device is interacting with the target radio network or radio networks and therefore the type of measurements being made and the radio network measurement data being collected.

The hardware architecture of the present invention is adapted to eliminate many of the potential points of failure inherent in traditional radio testing and measurement systems, and is therefore resilient and fault-tolerant, thereby improving the reliability of the radio network monitoring device (100). The hardware architecture is also adapted to be extensible, so as to allow many radio network monitoring devices (100) to be interconnected to form a single large virtual radio network monitoring, testing and radio network measurement system, and therefore expand the number of radio networks that can be simultaneously monitored, measured and tested beyond the number that could be monitored, measured and tested by a single radio network monitoring device (100).

The radio network monitoring device (100) of an embodiment of the present invention is adapted to be deployed in a mode that does not require intervention or active management whilst the radio network monitoring device (100) is monitoring, measuring or testing radio networks.

The radio network monitoring device (100) is preferably adapted to be controlled remotely via wireless or wired connection whilst it is monitoring, measuring or testing radio networks such that a remotely-located user may periodically or continuously determine the status of the radio network monitoring device (100) and of the radio network measurements being made, and may alter the operation of the radio network monitoring device (100) so as to change the way in which the radio network monitoring device (100) is interacting with the target radio network or radio networks and therefore the type of radio network measurements being made, and the radio network measurement data being collected.

The user may change the radio networks being monitored, measured or tested, the periodicity of the radio network measurements being made, and the thresholds that are applied to any monitored, measured or tested RF parameter against which the RF parameters that are consisted with normal operation of those networks are compared to determine whether a threshold has been exceeded and that a corresponding alert should be generated.

The radio network measurement data collected by the radio network monitoring device (100) whilst it is monitoring, measuring and testing radio networks can either be accumulated and stored onboard the radio network monitoring device (100) in the non-volatile data storage module (45) until such time that the radio network monitoring device (100) is automatically or manually triggered to download the stored radio network measurement data to the centralised management server or system (60); or alternatively the stored radio network measurement data can be uploaded to the external centralised management server or system (60) in real time or near real time whilst the radio network measurement data is being collected. In this latter mode, the onboard storage module acts as a data buffer.

In another embodiment, the external centralised management server or system (60) may automatically detect the presence of the radio network monitoring device (100) over a wireless or wired connection, and automatically retrieve radio network measurement data stored in the radio network monitoring device (100) and transfer that data to the external centralised management server or system (60) where it may be processed, or partially processed, stored and optionally transferred to another system.

In one embodiment, the processing unit (44) is adapted to continuously monitor radio transmissions from radio transmitters at geographically dispersed locations so as to determine the geographical locations of each radio transmitter, the number of antennas at each transmitter location, the vertical and horizontal orientation of each antenna, and the direction of propagation of radio signals transmitted from each antenna.

In another embodiment, the radio network monitoring device (100) is adapted to continuously or periodically transfer radio network measurement data collected whilst the radio network monitoring device (100) is monitoring radio transmissions from radio transmitters at geographically dispersed locations to the centralised management server or system (60), where the transferred radio network measurement data is analysed so as to determine the geographical locations of each radio transmitter, the number of antennas at each transmitter location, the vertical and horizontal orientation of each antenna, and the direction of propagation of radio signals transmitted from each antenna. This is an important feature of the present invention.

In one embodiment, the processing unit (44) is adapted to continuously monitor radio transmissions from radio transmitters and analyse the collected radio network measurement data so as to determine whether any new radio transmitters have recently commenced operation and are likely to be a rogue transmitter, and particularly a rogue cellular transmitter or IMSI catcher. In the event that the radio network monitoring device (100) determines that such a rogue transmitter has commenced operation in the vicinity of the radio network monitoring device (100), then the radio network monitoring device (100) may generate and forward an alert to an external centralised management server or system (60). This is an important feature of the present invention.

In another embodiment, the external centralised management server or system (60) is adapted to continuously and automatically analyse radio network measurement data collected by, and received from, multiple radio network monitoring devices (100) so as to determine whether any new radio transmitters have recently commenced operation in the area being monitored by those devices, and whether any such new radio transmitter is likely to be a rogue transmitter, and particularly a rogue cellular transmitter or IMSI catcher. In the event that the external centralised management server or system (60) determines that such a rogue transmitter has commenced operation in the vicinity of one or more radio network monitoring devices (100), then the external centralised management server or system (60) can analyse the received radio network measurement data to determine the real-time or near real-time location or locations of such rogue transmitters. Then, the external centralised management server or system (60) may generate and forward an alert to a user or a group of users, or to an external system. This is an important feature of the present invention.

In one embodiment, the radio network monitoring device (100) is adapted to continuously monitor and measure electromagnetic energy (EME) levels associated with one or more radio networks, and/or one or more radio network operators, and/or one or more radio technologies, and/or one or more radio bands and/or one or more radio channels, and to record the measured EME data for each radio network operator/radio network/radio technology/band/channel combination, and to make that EME data available for analysis. Alternatively, the radio network monitoring device (100) is adapted to continuously derive electromagnetic energy (EME) level data from analysis of monitored and measured RF parameters. In this way, the radio network monitoring device (100) can continuously monitor, measure, record and temporally analyse changes in EME levels produced by any combination of radio network operator, radio network, radio technology, band, and channel at a fixed or moving location. This is an important feature of the present invention.

In another embodiment, the measured EME data, or the measured RF parameters from which EME levels can be derived, is periodically or continuously transferred to the centralised management server or system (60), and the derivation of EME level data, and the analysis of the measured or derived EME data is performed by the centralised management server or system (60). In this way, the external centralised management server or system (60) can continuously monitor, measure, record and temporally analyse changes in EME levels produced by any combination of radio network operator, radio network, radio technology, band, and channel at multiple fixed or moving locations at which radio network measurement data has been measured by multiple radio network monitoring devices (100) to the centralised management server or system (60). This is an important feature of the present invention.

In one embodiment, the processing unit (44) is adapted to receive one or more normal or acceptable instantaneous or cumulative EME level ranges from a user or from the centralised management server or system (60) (60). These acceptable ranges may be specific to a location and/or time and/or time duration or any combination of location, time and duration. The acceptable EME level ranges may be defined by an upper and a lower EME level threshold; or by an average EME level and an acceptable tolerance constrained by upper and lower EME level threshold values.

In another embodiment, the processing unit (44) is adapted to algorithmically derive location and time specific average instantaneous or cumulative EME levels together with acceptable tolerances defined by upper and lower thresholds from either measured EME level data or derived EME level data using statistical modelling techniques.

Alternatively, the external centralised management server or system (60) can algorithmically derive average instantaneous or cumulative EME levels together with acceptable tolerances using statistical modelling techniques for multiple locations and or time periods from either measured EME level data or measured RF parameter data transferred to it by one or more network monitoring devices (100).

The processing unit (44) is adapted to determine whether instantaneous or cumulative EME threshold levels have been exceeded for one or more radio networks, one or more radio network operators, one or more radio network technologies, one or more radio bands and/or one or more radio channels. The processing unit is adapted to automatically compare measured or derived EME levels with the EME level thresholds to determine whether thresholds have been exceeded. In one embodiment, an alert message will be generated if an instantaneous or cumulative EME level threshold is exceeded, and the alert message will be forwarded by the network monitoring device (100) to the external centralised management server or system (60) via an application programming interface (API), or as a data payload in a flow-based alert message that uses a protocol such as NetFlow, sFlow, jFlow, or IPFIX, or similar data communication message format. This is an important feature of the present invention.

Alternatively, the external centralised management server or system (60) is adapted to determine whether instantaneous or cumulative EME threshold levels have been exceeded for one or more radio networks, one or more radio network operators, one or more radio network technologies, one or more radio bands and/or one or more radio channels at one or more locations. The external centralised management server or system (60) can analyse EME level data, so as to determine instantaneous and cumulative EME levels at multiple locations at which multiple radio network monitoring devices (100) are located, and compare those EME levels with the thresholds to determine whether thresholds have been exceeded. In one embodiment, an alert will be generated if an instantaneous or cumulative EME level threshold is exceeded. This is an important feature of the present invention.

The external centralised management server or system (60) can forward an EME alert to a defined set of recipients. EME alerts may be communicated in electronic form, including via email or short message service (SMS) text message; or may be communicated audibly via a sound alarm or visually via a light alarm, or as an event in a trouble ticketing, help desk or similar external system. The email or SMS alerts that are sent to a defined set of recipients can include a hyperlink that a user can click on to be directed to a system or portal or web page that contains details of the EME alert, including specifying the physical location or locations at which the EME level or levels were exceeded, details of the monitored radio network, radio network operator, radio technology, band, and channel that has triggered the EME alert, and relevant EME measurement data.

The external centralised management server or system (60) can optionally perform computer housekeeping functions on the radio network monitoring device (100), including deleting stored radio network measurement data once it has been successfully transferred to the centralised management server or system (60), and updating stored configurations that will control the manner in which the radio network monitoring device (100) monitors, measures and tests radio networks.

In one embodiment, the processing unit (44) is adapted to modify the radio network functional modules (36, 37, 38, 39 40, 41, 42) by transferring software or firmware updates or upgrades, or by transferring configuration instructions to one or more radio network functional modules (36, 37, 38, 39 40, 41, 42) to allow for additional types of radio networks, such as those supporting maritime radio, aircraft radio, military radio and private radio, to be monitored, measured and tested.

Figure 4:
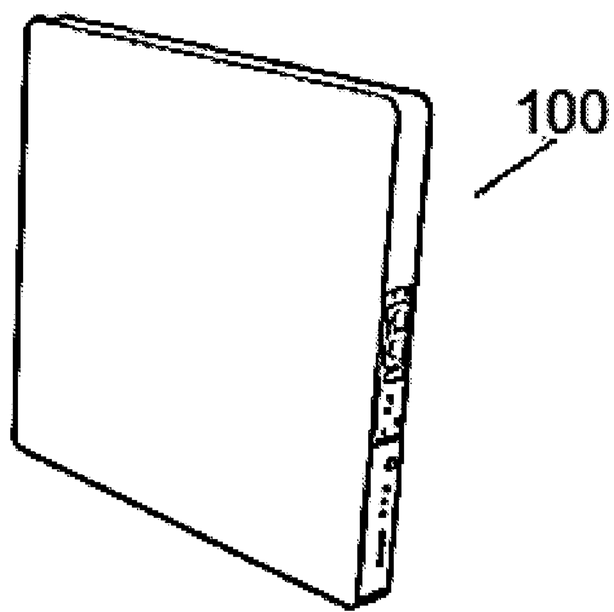
FIG. 4 shows a schematic diagram of single radio communications network monitoring device of FIG. 3.

FIG. 4 shows a radio network monitoring device (100) that is self-contained, highly portable and that is provided in a form factor that is easily transportable and readily extensible by cascading more than one such radio network monitoring device (100) together. The radio network monitoring device (100) in FIG. 4 is compact and modular. The radio network monitoring device (100) in FIG. 4 can operate autonomously and without intervention by a user—that is, in zero-touch mode. The radio network monitoring device (100) in FIG. 4 may comprise zero, one or more cellular radio modems (1), zero, one or more P25 radio transceivers (6), zero, one or more TETRA radio transceivers (11), zero, one or more Wi-Fi radio transceivers (16), zero, one or more LoRA radio transceivers (21), zero, one or more NB-IoT cellular radio modems (26), zero, one or more CAT-M1/CAT-M2 cellular radio modems (31), zero, one or more cellular radio antennas (2), zero, one or more P25 radio antennas (7), zero, one or more TETRA radio antennas (12), zero, one or more Wi-Fi radio antennas (17), zero, one or more LoRA radio antennas (22), zero, one or more NB-IoT radio antennas (27), zero, one or more CAT-M1/CAT-M2 antennas (32), zero, one or more CPUs (44), zero, one or more internal non-volatile data storage modules (45), zero, one or more data buses (43), zero, one or more internal batteries (50), zero, one or more internal geo-location antennas (56), zero, one or more Wi-Fi antennas (46) zero, one or more external antenna ports, (3, 8, 13, 18, 23, 28, 33), zero, one or more USB ports (57), zero, one or more external power ports (49), and zero, one or more Ethernet ports (47), all of which are contained within a single physical enclosure (58). This contrasts with traditional radio testing and measurement tools which comprise multiple physically separate components, including cellular handsets, radios and RF scanners, computers, and data storage devices that are tethered together in order to interoperate. This is therefore an important feature of the present invention.

The physical enclosure (58) is rated at IP56 or better for installation in an outdoor environment so as to ensure that the operation of the radio network monitoring device (100) is not adversely affected by unfavourable weather or environmental conditions.

Multiple radio network monitoring devices (100) of an embodiment of the present invention may be interconnected with one another, either wirelessly, or by using Ethernet cables connected to the internal Ethernet ports (47). By cascading multiple radio network monitoring devices (100) together, the capacity to monitor, measure and test many heterogeneous radio networks is expanded. When multiple radio network monitoring devices (100) are interconnected in this way, a single source of geo-location data obtained by connecting a single GPS or similar geo-location antenna (54) or (56) to a single radio network monitoring device's (100) USB GPS antenna port (57) can be shared amongst all interconnected radio network monitoring devices (100). In this way, the locations at which radio network measurements are made can be synchronised across all interconnected radio network monitoring devices (100).

In another embodiment, the processing unit (44) is adapted to autonomously monitor, measure and test one or more heterogeneous radio networks by executing radio network tests according to pre-defined test scripts that have been downloaded to the radio network monitoring device (100) from the centralised management server or system (60), and automatically transferring radio network measurement data resulting from those scripted tests to the external centralised management server or system (60) for processing, decoding, storage and analysis. This negates the need to rely on traditional costly, complex and resource-intensive RF walk testing or RF drive testing to assess radio network coverage and quality at the location at which the radio network monitoring device (100) is installed and is therefore an important feature of the present invention.

In another embodiment, the radio network monitoring device (100) is adapted to automatically and concurrently determine the location of each cellular transmitter, each DAS antenna and cellular small cell, each P25 transmitter, each TETRA transmitter, each Wi-Fi access point, each LoRA transmitter each NB-IoT transmitter, and each CAT-M1/CAT-M2 transmitter.

The location of transmitters and access points can be determined by analysing the radio network measurement data in near real time; or by processing the radio network measurement data in the centralised management server or system (60).

The present invention is therefore able to provide a radio network monitoring device (100) capable of continuously monitoring multiple heterogeneous radio networks by measuring radio network measurement data pertaining to each monitored network.

The present invention is therefore able to provide a radio network monitoring device (100) that is capable of either separately or concurrently or sequentially monitoring multiple instances of multiple heterogeneous radio communications networks and technologies, including those utilising cellular, P25, TETRA, Wi-Fi, and IoT-specific networks including LoRA, NB-IoT and CAT-M1/CAT-M2.

The present invention is therefore able to provide a radio network monitoring device (100) that is capable of measuring radio networks by either active testing of all monitored networks wherein the radio network monitoring device (100) can make voice calls and/or download or upload data and gathering radio network measurement data accordingly so as to measure the effects of those activities on the operation of the network; or by passive or idle testing wherein the radio network monitoring device (100) does not make voice calls or download or upload data whilst gathering radio network measurement data.

The present invention is therefore able to provide a radio network monitoring device (100) that is capable of being programmatically configured to repeatedly execute specific tests of radio communications networks in scripts containing sequenced test steps, including but not limited to, placing voice calls, and downloading data from specific servers so that the radio network monitoring device (100) can measure the effects of the tests on the radio networks being tested and collect corresponding radio network measurement data.

The present invention is therefore able to provide a radio network monitoring device (100) that is capable of autonomously processing the radio network measurement data and independently analysing the radio network measurement data so as to determine whether the monitored radio network is operating normally, and if the radio network monitoring device determines that the monitored radio network is not operating normally, to generate a corresponding alert, and forward the alert to an external computer or control system or person in real-time or in near real-time.

The present invention provides a radio network monitoring device (100) that is capable of continuously or periodically forwarding the collected radio network measurement data to the centralised management server or system (60) in real-time or in near real-time.

The present invention is therefore able to provide a radio network monitoring device (100) that is capable of autonomous, zero-touch operation. This is an important feature of the present invention.

The present invention is therefore able to provide a centralised management server or system (60) that remotely manages multiple radio network monitoring devices (100), and that can forward instructions to one or more radio network monitoring devices (100) concurrently, and that can receive alerts and raw radio network measurement data from one or more radio network monitoring devices (100) concurrently and that can then process, decode, store, and analyse the received alerts and radio network measurement data, and take actions accordingly.

Portable

FIG. 4 shows a radio network monitoring device (100) that is self-contained, highly portable and that is provided in a form factor that is easily transportable and readily extensible by cascading more than one such radio network monitoring device (100) together. The radio network monitoring device (100) in FIG. 4 is compact and modular. The radio network monitoring device (100) in FIG. 4 may comprise zero, one or more cellular radios (1), zero, one or more P25 radio transceivers, (6), zero, one or more TETRA radio transceivers (11), zero, one or more Wi-Fi radio transceivers (16), zero, one or more LoRA radio transceivers (21), zero, one or more NB-IoT radio transceivers (26), zero, one or more CAT-M1/CAT-M2 radio transceivers (31), zero, one or more cellular radio antennas (2), zero, one or more P25 radio antennas (7), zero, one or more TETRA radio antennas (12), zero, one or more Wi-Fi radio antennas (17), zero, one or more LoRA radio antennas (22), zero, one or more NB-IoT radio antennas (27), zero, one or more CAT-M1/CAT-M2 radio antennas (32), zero, one or more CPUs (44), zero, one or more internal non-volatile data storage modules (45), zero, one or more data buses (43), zero, one or more internal batteries (50), zero, one or more internal geo-location antennas (56), zero, one or more Wi-Fi antennas (46) supporting connection to external computing devices, zero, one or more external antenna ports, (3, 8, 13, 18, 23, 28, 33), zero, one or more USB ports (55), zero, one or more external power ports (49), and zero, one or more Ethernet ports (47) that are all contained within a single physical enclosure (58).

Multiple radio network monitoring devices (100) of an embodiment of the present invention may be interconnected with one another, either wirelessly using a Wi-Fi connection, or by using Ethernet cables (48) connected to the internal Ethernet ports (47). By cascading multiple radio network monitoring devices (100) together, the capacity to test and measure radio networks of various types is expanded. When multiple radio network monitoring devices (100) are interconnected in this way, a single source of geo-location data obtained by connecting a single GPS or similar geo-location antenna (54) or (56) to a single radio network monitoring device's GPS antenna port (57) can be shared amongst all interconnected radio network monitoring devices (100). In this way, the locations at which radio network measurements are made can be synchronised across all interconnected radio network monitoring devices (100), and all radio network measurement data recorded by all interconnected radio network monitoring devices can be persistently associated with GPS data and therefore accurately geo-located.

In one embodiment, the radio network monitoring device (100) is portable. The radio network monitoring device (100) can be readily deployed in an RF walk test mode to test and measure radio network coverage and quality provided by multiple heterogeneous radio networks in buildings and on sites inaccessible by vehicle. In this RF walk test mode, the radio network monitoring device (100) can be carried in a standard backpack, or a purpose-made backpack as shown in FIGS. 5, 6, 7 and 8.

In one aspect of the present invention, there is provided an engineered backpack that accommodates one or more radio network monitoring devices (100) for RF walk tests. The backpack is adapted to locate the radio antennas such that the effects of absorption of received and transmitted radio signals by the body of the walk tester are minimised or eliminated to ensure that the radio network measurement data collected during the walk test is true and correct and does not require compensation to be applied after the RF walk test to correct the radio network measurement data.

Figure 5:
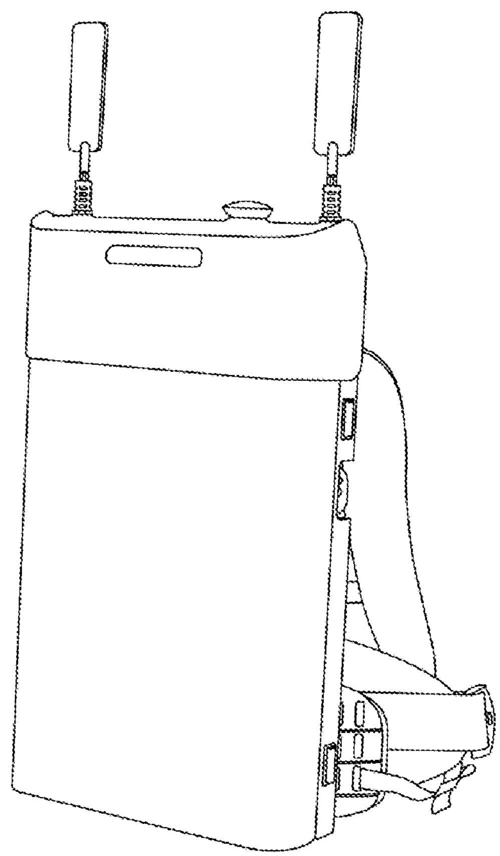
FIG. 5 shows a schematic diagram of an engineered backpack in a closed configuration for accommodating a single radio communications network monitoring device of FIG. 3.

FIG. 5 shows an example of the engineered backpack (122) which is an engineered backpack used to carry a single radio network monitoring device (100). The engineered backpack (122) shown in FIG. 5 is in a closed configuration.

Figure 6:
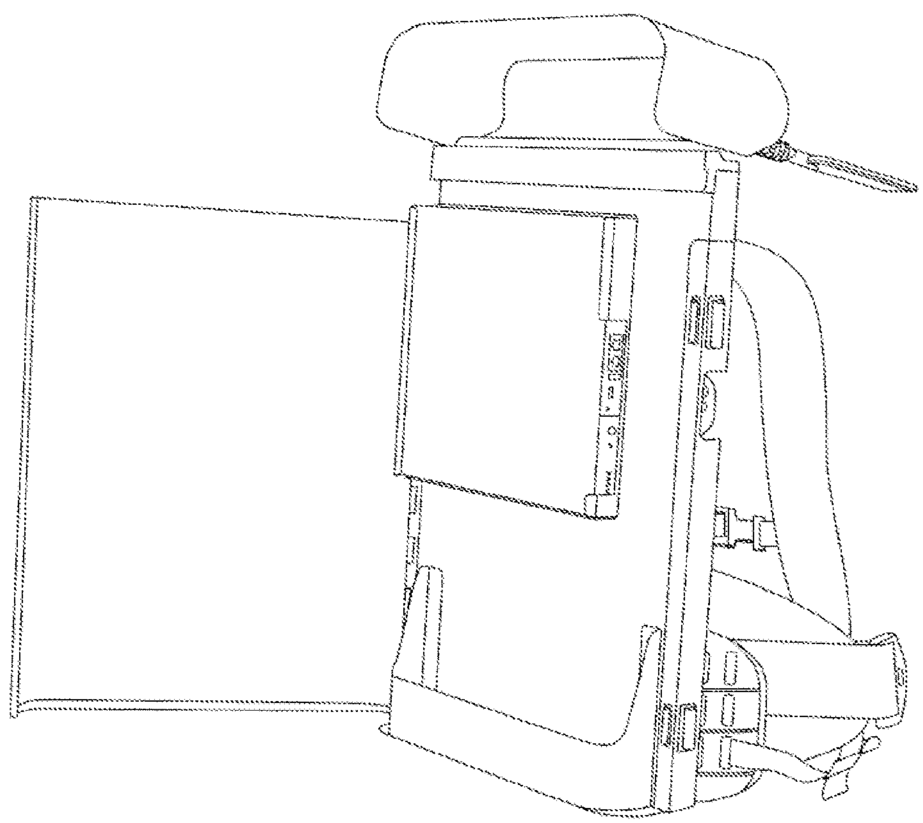
FIG. 6 shows a schematic diagram of an engineered backpack of FIG. 5 in an opened configuration.

FIG. 6 shows an example of the engineered backpack (124) used to carry two or more interconnected radio network monitoring devices (100). The engineered backpack (124) shown in FIG. 6 is in a closed configuration.

The engineered backpack (122, 124) allows the radio network monitoring devices (100) being carried to be positioned such that the attenuating effects of the backpack wearer's body on received and transmitted radio signals is minimised. This is achieved by placing all radio antennas at the top of the radio network monitoring device (100), and by accommodating each radio network monitoring device (100) in the engineered backpacks such that all radio network monitoring devices' (100) antennas are positioned above the shoulder line of the individual carrying the backpack.

Figure 7:
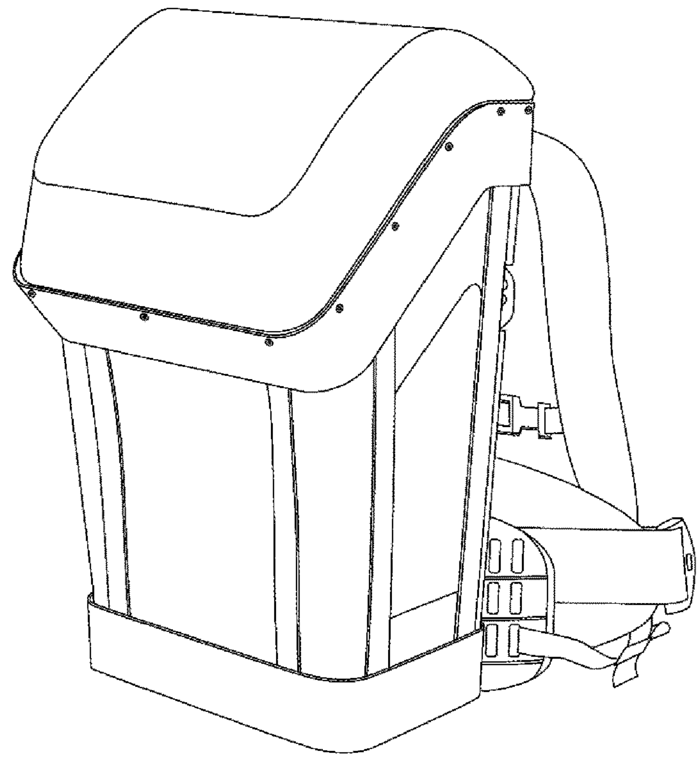
FIG. 7 shows a schematic diagram of an engineered backpack in a closed configuration for accommodating multiple radio communications network monitoring devices of FIG. 3.

FIG. 7 shows the engineered backpack (126) used to carry a single radio network monitoring device (100). The engineered backpack (126) represented in FIG. 7 is shown in an open configuration. The positioning of the radio network monitoring device (100) at the top of the engineered backpack (126), with internal antennas above the shoulder level of the wearer is also shown in FIG. 7.

Figure 8:
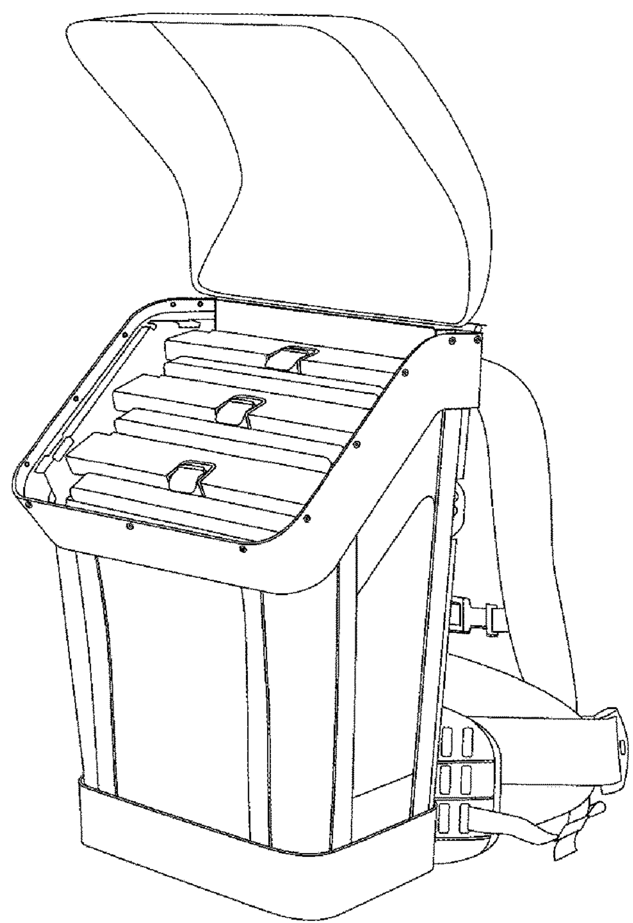
FIG. 8 shows a schematic diagram of an engineered backpack of FIG. 7 in an opened configuration.

FIG. 8 shows the engineered backpack (128) used to carry two or more radio network monitoring devices (100). The engineered backpack (128) shown in FIG. 8 is in an open configuration. Referring to FIG. 8, the positioning of the radio network monitoring devices (100) is at the top of the engineered backpack (128), with internal radio antennas positioned above the shoulder level of the wearer, and angled so as to minimise the attenuation effects of adjacent radio network monitoring devices (100) on the radio signals being received and transmitted by other radio network monitoring devices (100).

Because of the portability, simplicity, extensibility, and reliability of the radio network monitoring device (100) of the present invention, it may also be readily deployed in an RF drive test mode to test and measure radio network coverage and quality on road networks and in other locations accessible by vehicle. In this RF drive test mode, multiple radio network monitoring devices can be mounted in the engineered rack that can be installed in an off-the-shelf rooftop box, pod, or rooftop cargo carrier, such as is manufactured by Thule. This purpose-built rack is shown in FIG. 9.

Figure 9:
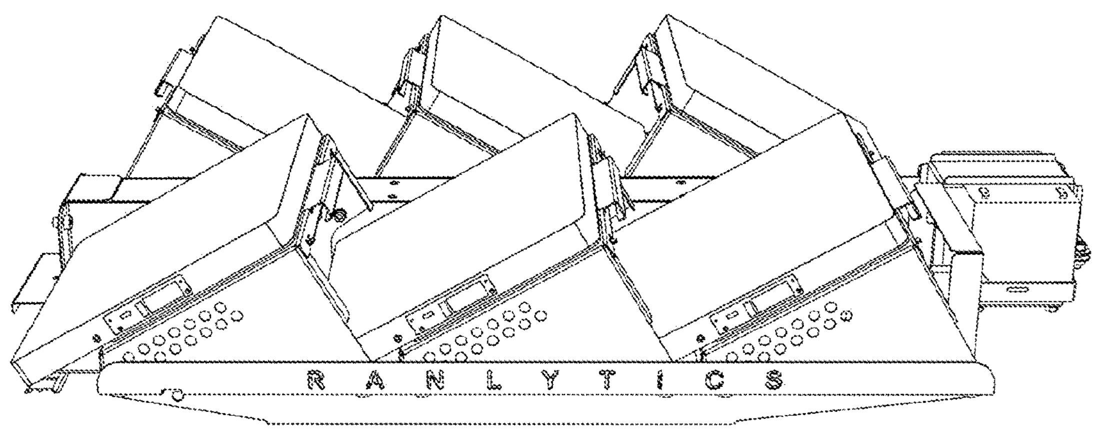
FIG. 9 shows a schematic diagram of a vehicle-mounted rack for accommodating multiple radio communications network monitoring devices of FIG. 5; and, FIG. 10 shows a schematic diagram of a Radio Network Measurement Data Management System for processing, storage, and analysis of very large quantities of radio network measurement data and of RF parameter data resulting from the testing, measurement, and monitoring of multiple instances of multiple heterogeneous radio networks according to an embodiment of the present invention.

FIG. 9 shows an engineered rack (130) used to carry one or more radio network monitoring devices (100) within an off-the-shelf rooftop box, pod, or rooftop cargo carrier on top of a vehicle.

A feature of the engineered rack is that, as the radio network monitoring devices (100) being carried are positioned on the roof of the vehicle in a rooftop box primarily constructed of plastic, the attenuating effects of the vehicle on received and transmitted radio signals are eliminated. This provides a significant benefit in that the radio network measurement data is true and correct and it is therefore not necessary to calculate and apply compensation factors to the recorded data to account for the attenuation.

In one embodiment of the present invention, the processing unit (44) of the radio network monitoring device (100) is adapted to embed an image of the plan of the area being walk tested into each of the RF log files containing the radio network measurement data produced during the RF walk test. This ensures that the correct plan image is permanently associated with each of the RF log files produced during an RF walk test, thereby eliminating the possibility of an error in manually associating the correct plan image with the corresponding walk test RF log files after the walk test is completed.

The present invention provides a radio network monitoring device (100) that is capable of having its status queried, and its operation altered, remotely using an 'over-the-air' wireless connection between the radio network monitoring device (100) and the centralised management server or system (60).

Preferably, the processing unit (44) is adapted to operate with a set of zoomable Slippy Maps covering one or more countries or parts thereof loaded into the non-volatile data storage module (45), thereby eliminating the requirement that the radio network monitoring device (100) be connected to the internet to operate during an RF drive test; and with an associated method of storing all vector map data such that the maps can be quickly and easily retrieved and rendered when and as required without requiring access to external servers or resources, thereby reducing the load on the CPU (44) and CPU processing time; and so as to support more efficient and simplified RF drive testing.

In another embodiment, wherein the processing unit (44) comprises a bootstrap module adapted to automatically boot up and automatically commence testing and measuring multiple heterogeneous radio networks by executing multiple pre-defined and stored test scripts when the radio network monitoring device (100) is powered on, and automatically saving radio network measurement data to RF log files when the radio network monitoring device (100) is powered down; thereby negating the need to manually initiate test scripts and separately save RF log files at the end of tests. From that point, the radio network monitoring device (100) can be operated autonomously and the radio network monitoring device is able to self-recover from disruption.

In another embodiment, the radio network monitoring device (100) is adapted to automatically and continuously track the location and progress of the walk tester during an RF walk test using the output of a combination of compasses, gyroscopes, accelerometers, barometers, gravitational and visual odometry sensors carried by the walk tester; and to automatically associate the decoded location information with corresponding radio network measurement data to ensure that the radio network measurement data is correctly located relative to the plan of the site being tested within the RF log file.

In another embodiment, the radio network monitoring device (100) is adapted to automatically and concurrently identify the location of each cellular DAS antenna and cellular small cell, each P25 transmitter, each TETRA transmitter, each Wi-Fi access point, each LoRA transmitter, each NB-IoT transmitter and each CAT-M1/CAT-M2 transmitter during an RF walk test and record the location of each such antenna, small cell, transmitter and access point relative to the plan of the site being tested that is stored within the RF log file.

In another embodiment the centralised management server or system (60) can automatically identify the location of each cellular DAS antenna and cellular small cell, each P25 transmitter, each TETRA transmitter, each Wi-Fi access point, each LoRA transmitter, each NB-IoT transmitter and each CAT-M1/CAT-M2 transmitter by analysing radio network measurement data collected and forwarded to the centralised management server or system (60) by one or more radio network monitoring devices (100) that undertook RF walk tests; and recording the location coordinates of each such transmitter, antenna and access point relative to a site plan in a database.

Similarly, the radio network monitoring device (100) can also automatically and concurrently identify the location of each cellular transmitter and antenna, each P25 transmitter, each TETRA transmitter, each Wi-Fi access point, each LoRA transmitter, each NB-IoT transmitter and each CAT-M1/CAT-M2 transmitter during an RF drive test and record the geographic coordinates of each such transmitter, antenna and access point in the RF log file.

In another embodiment the centralised management server or system (60) can automatically identify the location of each cellular transmitter and antenna, each P25 transmitter, each TETRA transmitter, each Wi-Fi access point, each LoRA transmitter, each NB-IoT transmitter and each CAT-M1/CAT-M2 transmitter by analysing radio network measurement data collected and forwarded to the centralised management server or system (60) by one or more radio network monitoring devices (100) that undertook RF drive tests; and recording the geographic coordinates of each such transmitter, antenna and access point in a database.

In another embodiment, the radio network monitoring device (100) is adapted to connect to a scanning radio receiver such that the operation of the scanning radio receiver can be controlled by the radio network monitoring device (100), and any measurement data collected by the scanning radio receiver can be stored in the radio network monitoring device's (100) internal non-volatile data storage module (45) in RF log file format.

Storage System

Figure 10:
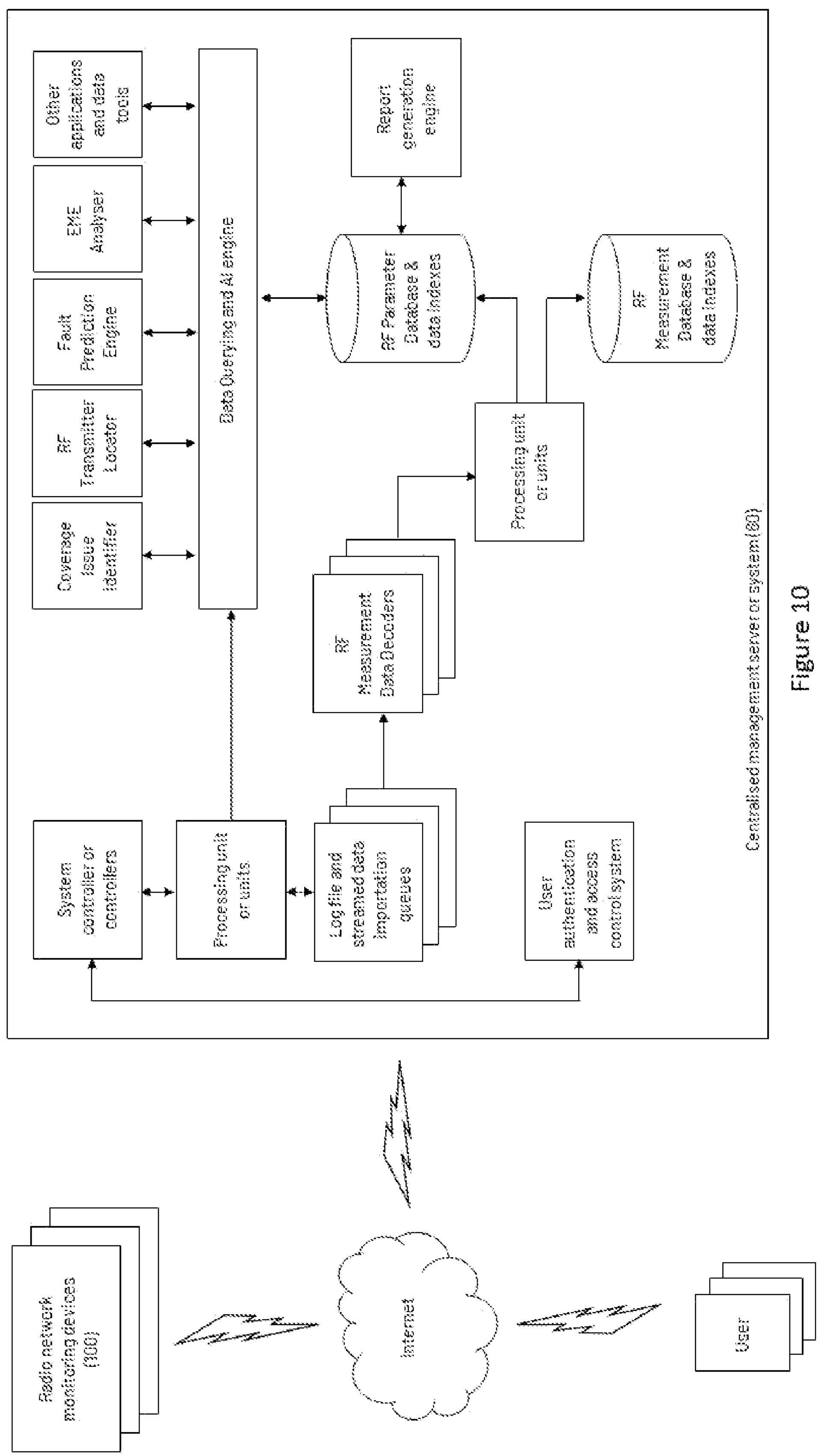

Reference is now made to FIG. 10. Radio network monitoring devices (100) are able to collect very large amounts of radio network measurement data within short periods of time. This is particularly so when multiple radio network monitoring devices (100) are installed on vehicle fleets, including those operated by postal and parcel/mail delivery operators, waste collection and disposal companies, taxi and ride share providers and by and on behalf of government agencies and departments such as those providing first responder and emergency response services, to support widescale and frequent measurement of multiple radio networks, These radio network measurement data cannot be made useful without a method and a system that is capable of efficiently processing, decoding, persistently storing, and supporting the analysis of, very large volumes of such data.

One embodiment of the present invention provides a centralised management server or system (60) for processing, decoding, indexing and persistently storing, and supporting the analysis of, very large volumes of raw radio network measurement data collected, recorded and forwarded to the centralised management server or system (60) by a large number of radio network monitoring devices (100); and the RF parameter data extracted by the centralised management server or system (60) from the raw radio network measurement data; and more particularly, a centralised management server or system (60) and set of methods for the importation of radio network measurement data, the indexing and persistent storage of radio network measurement data in a highly-scalable computer database, and a set of data querying, visualisation, reporting, analysis, and export functions. This is an important feature of the present invention.

In a further embodiment of the present invention, the centralised management server or system (60) can simultaneously support radio network measurement data and RF parameter data produced by testing, measuring and/or monitoring multiple instances of multiple heterogeneous radio networks. This is an important feature of the present invention.

The radio network measurement data processing, storage, and analysis system ('Radio Network Measurement Data Management System') of an embodiment of the present invention includes one or more system control processes or applications ('System Controllers'). The System Controllers are adapted to import, decode and process radio network measurement data and pass the RF parameters that have been extracted from that radio network measurement data to a database or data storage sub-system, receive user or system-generated data filtering queries that are passed to the processing unit, create user interfaces for presenting results of data queries and manipulations from the processing unit, and generally control the operation and functioning of the Radio Network Measurement Data Management System.

The Radio Network Measurement Data Management System of an embodiment of the present invention, and each of the components that comprise the Radio Network Measurement Data Management System are specifically designed, engineered and implemented so as to import, decode, process and store extremely high peak data importation, processing, indexing and storage rates; and especially when the radio measurement data it is receiving is being streamed from a multitude of radio network monitoring devices (100) that record radio network measurement data continuously, and transmit that recorded radio network measurement data in real time or in near real time to the Radio Network Measurement Data Management System.

In one embodiment, the various components of the Radio Network Measurement Data Management System, including but not limited, to the System Controllers, the Processing Units, the radio network measurement data database, the RF Parameter Database, the Authentication and Authorisation System, the Data Querying Engine, the Report Generation Engine, the EME Analyser and the AI and Data Analytics Engine are built using dynamic allocation of computer resources, multi-threading, modularisation, caching, asynchronism, virtualisation and other computer architecture, programming, data management and control principles and techniques so as to be highly and dynamically scalable and therefore capable of supporting highly variable computing workloads and the importation, decoding, processing, analysis, indexing and storage of very large amounts of data.

Raw input radio network measurement data comprising values corresponding to various RF parameters such as received power levels in the form of RSRP or RSSI, noise in the form of SiNR or ECNO, transmission power in the form of TXP, channel number, MIMO rank, the identity of the cellular operator in the case of cellular data, and the identity of the serving cell or transmitter in the form of PCI or SSID is imported into the Radio Network Measurement Data Management System in the form of log files or streamed data. The RF parameters imported into the Radio Network Measurement Data Management System are generally associated with geographic location information identifying the locations at which individual data were recorded and represented in the form of tagged geographic coordinates; and tagged timestamp information identifying the date and time at which individual data were recorded.

In one embodiment, the Radio Network Measurement Data Management System is adapted to import RF log files containing radio network measurement data that have been forwarded to the Radio Network Measurement Data Management System either directly or indirectly from radio network monitoring devices (100), and that are deposited into specific log file importation directories within the Radio Network Measurement Data Management System's file system, at which point processing of the radio network measurement data can be either automatically or manually initiated.

In one embodiment, the System Controllers and Processing Unit of the Radio Network Measurement Data Management System are adapted to run one or more radio network measurement data analysis daemons or processes that monitor each of the log file importation directories. These daemons or processes can be configured to automatically analyse an RF log file when the log file is loaded into a log file importation directory, or may be configured such that the log file is stored temporarily in the log file importation directory until the daemon or process is manually or programmatically triggered. The daemons or processes then determine the type of radio network measurement data being imported in the log file, such as cellular, P25, and TETRA 2-way trunked radio, Wi-Fi, and IoT-specific services including LoRA, NB-IoT and CAT-M1/CAT-M2, and initiate decoding of each log file by invoking the appropriate RF Measurement Data Decoder.

In another embodiment, the Radio Network Measurement Data Management System is adapted to import radio network measurement data that is simultaneously streamed from multiple radio network monitoring devices (100) through one or more application programming interfaces (API). These APIs can be configured to store the incoming radio network measurement data temporarily as records or similar data structures in a holding data store; or to store the incoming radio measurement data temporarily in one or more files; or to pass the radio network measurement data stream or streams to the radio network measurement data analysis daemons or processes that analyse the streamed radio network measurement data in real time or close to real time to determine the type of radio network measurement data being imported in the incoming data stream, such as cellular, P25, and TETRA 2-way trunked radio, Wi-Fi, and IoT-specific services including LoRA, NB-IoT and CAT-M1/CAT-M2, and initiate decoding of each data stream by invoking the appropriate RF Measurement Data Decoder.

In one embodiment, the Radio Network Measurement Data Management System includes one or more RF Measurement Data Decoders, each of which is specific to a particular type of radio network and radio technology. The RF parameters that result from the measurement of cellular networks will be extracted from the RF Measurement Data by a cellular RF Measurement Data Decoder. The RF parameters that result from the measurement of P25 networks will be extracted from the RF Measurement Data by a P25 RF Measurement Data Decoder. The RF parameters that result from the measurement of TETRA networks will be extracted from the RF Measurement Data by a TETRA RF Measurement Data Decoder. The RF parameters that result from the measurement of Wi-Fi networks will be extracted from the RF Measurement Data by a Wi-Fi RF Measurement Data Decoder. The RF parameters that result from the measurement of LoRA networks will be extracted from the RF Measurement Data by a LoRA RF Measurement Data Decoder. The RF parameters that result from the measurement of NB-IoT networks will be extracted from the RF Measurement Data by an NB-IoT RF Measurement Data Decoder. The RF parameters that result from the measurement of CAT-M1/CAT-M2 networks will be extracted from the RF Measurement Data by a CAT-M1/CAT-M2 RF Measurement Data Decoder.

The RF parameter data extracted from the radio network measurement data by the RF Measurement Data Decoder are specific to the type of radio network that was measured, tested or monitored, and the manner in which the radio network was measured, tested, or monitored. The RF parameter data is passed to the RF Parameter Database where it is indexed and persistently stored. The RF Parameter Database is specifically designed and engineered to handle very large peak data importation loads, and to resiliently and reliably store and index very large amounts of data, and so is capable of persistently storing exabytes of RF parameter data, other data derived from the RF parameter data, and other data imported into the Radio Network Measurement Data Management System (60).

In the case of measurements of a radio network that were made using a vehicle to carry test equipment, typically by a process known as RF drive testing, the radio network measurement data and the resulting RF parameter data is typically geospatial as it has been recorded at a number of geographical locations specified by latitude and longitude co-ordinates.

In the case of measurements of a radio network that were made inside buildings, typically by a process known as RF walk testing, the radio network measurement data and the resulting RF parameter data is typically associated with location co-ordinates that reference a plan of the building or site that was measured or tested. Each set of such measurements are associated with and cross-referenced to, a plan of the building or site that typically exists as an image file.

In the case of measurements of a radio network that result from continuous monitoring of a radio network at a fixed location, the radio network measurement data and the resulting RF parameter data from a given monitoring device is typically associated with a fixed geospatial location specified by latitude and longitude co-ordinates, together with location co-ordinates that reference a plan of the building or site in which the monitor is located.

In one embodiment, the Radio Network Measurement Data Management System incorporates an extensible Data Analytics Engine to further process the RF parameter data. The Data Analytics Engine is adapted to analyse RF parameter data, and any data derived from the RF parameter data and to derive information, including radio network behaviour trends, from that analysis, and to take actions according to the analysis performed, and to train various AI algorithms embodied in the Data Analytics Engine in respect to the patterns and trends in the data. In this way, the Data Analytics Engine continuously fine-tunes and improves the AI algorithms and their ability to discern patterns and trends in the RF parameter data, and to draw conclusions accordingly.

The System Controllers are adapted to write the raw and unprocessed radio network measurement data to the RF Measurement Data database and to categorise it as raw, unfiltered 'RF Measurement Data'. This can occur either after the RF Measurement Data Decoder has completed decoding of a particular log file or data stream, or in parallel with the decoding.

The raw, unfiltered RF Measurement Data written to the RF Measurement Database are indexed, and is stored in sequence and without alternation or modification. The Radio Network Measurement Data Management System can handle an extremely high data importation, processing and recording rate; and especially when the RF Measurement Data it is importing is being streamed from a multitude of radio network monitoring devices (100) that record RF Measurement Data continuously and upload that recorded RF Measurement Data in real time or in near real time to the Radio Network Measurement Data Management System (10).

The RF Measurement Database has been specifically designed and engineered to resiliently and reliably import, persistently store and index very large amounts of data, and so is capable of persistently storing exabytes of RF Measurement Data.

In one embodiment, the RF Measurement Database and the RF Parameter Database are each adapted to comprise a federated database that maps one or more physical databases that exist in a distributed cloud computing environment, or in an on-premises computing environment, or in a hybrid configuration combining cloud and on-premises computing environments. The Radio Network Measurement Data Management System's data storage management system creates and maintains data indices to allow for faster querying and retrieval of the data that is persistently stored in each of the RF Parameter Database and the RF Measurement Data database.

In another embodiment, separate virtual or physical databases may be created to segment RF parameter data temporally, or that relate to specific types of radio networks, or that relate to specific radio operators, or that relate to specific radio technologies, or that are collected in specific geographies, or that are collected during specific time periods, or that relate to any combination of radio network, radio operator, radio technology, geography, and time period.

The Radio Network Measurement Data Management System may operate either within a cloud computing environment, or in an on-premises computing environment, or in a hybrid configuration combining cloud and on-premises computing environments.

The Radio Network Measurement Data Management System is designed and optimised to import, decode and persistently store RF Measurement Data comprising multiple RF parameters; and to support the rapid querying and analysis of RF parameters that are specific to each instance of each type of radio network. The RF Measurement Data is collected through the testing, measurement, and monitoring of different radio networks and technologies including cellular, P25 & TETRA 2-way trunked radio services, Wi-Fi, IoT-specific networks including LoRA, NB-IoT and CAT-M1/CAT-M2, and maritime, aircraft, military and other private and government radio networks.

In one embodiment, the Radio Network Measurement Data Management System is a highly-scalable data store comprising multiple, linked databases and data indices that allow for the persistent storage of exabytes of RF Measurement Data that may be both timestamped and tagged with geographic location information.

In one embodiment, the Radio Network Measurement Data Management System is adapted to support the importation of raw RF Measurement Data in the form of log files or streamed data containing RF parameter values pertaining to specific radio networks or bands or channels that have been recorded by radio network monitoring devices (100) at specific locations over varying periods of time. The Radio Network Measurement Data Management System of the present invention is adapted to store various RF parameters derived from multiple instances of multiple heterogeneous radio networks, including but not limited to power levels in the form of RSRP or RSSI, noise in the form of SiNR or ECNO, transmission power in the form of TXP, channel number, MIMO rank, the identity of the cellular operator in the case of cellular data, and the identity of the serving cell or transmitter in the form of PCI or SSID. All data may be time-stamped to identify the date and time at which particular measurements were made, and may be tagged with geospatial location co-ordinates to identify the location at which particular measurements were made.

The RF Measurement Data processing function of the Radio Network Measurement Data Management System is adapted to open each imported log file or data stream, read the radio network measurement data contained in the RF log file or data stream, decode any data as required, load the decoded RF parameter data into a named collection in the RF Parameter Database, and register the imported RF parameter data with various RF Parameter Database indices.

The use of the Radio Network Measurement Data Management System is controlled by an access authorisation function of the Authentication and Authorisation System such that only authorised persons or computer applications or processes may access the Radio Network Measurement Data Management System and the data contained within it, and different users or computer applications or processes may be allocated different rights in respect to different subsets of the RF Measurement Data and of the RF parameter data, and in respect to the querying, visualisation and analysis tools and functions embodied within the Radio Network Measurement Data Management System.

In another preferred embodiment, the Radio Network Measurement Data Management System has a library of pre-defined data queries, together with a tool that allows each individual user to build and store custom data queries, and to then execute any of those queries on an ad-hoc, as required basis on any of the data stored within the Radio Network Measurement Data Management System.

Preferably, the Radio Network Measurement Data Management System may provide different collections of data visualisation, pre-defined data queries, reporting, graphing, statistical analysis, and general analysis functions in the form of graphical user interfaces ('GUI'). Users of the Radio Network Measurement Data Management System who have the appropriate technical skills and experience, and the appropriate access rights and authorisations may be allocated a particular default GUI that provides access to particular combination of data tools and functions appropriate to a technical user. Additionally, users of the Radio Network Measurement Data Management System who do not have technical skills and experience may be allocated a different default GUI that provides a different set of data tools and functions that are appropriate to non-technical users. Critically however, all users of the Radio Network Measurement Data Management System access and use the same data, ensuring that the Radio Network Measurement Data Management System is able to represent a 'single source of truth' to all users of the system. This is an important feature of the present invention.

In another embodiment, the Radio Network Measurement Data Management System may export data, either in whole or in part as a result of a query used to create a filtered subset of any of the data stored within any of Radio Network Measurement Data Management System databases to another system, such as a geospatial information system (GIS), or a reporting system.

Preferably, the Radio Network Measurement Data Management System comprises a user Authentication and Authorisation System and a Data Access Control System that allow for controlled access to the Radio Network Measurement Data Management System's functions, features, and data.

The Radio Network Measurement Data Management System of one embodiment of the present invention comprises a Data Querying Engine that is adapted to interpret data query commands and language and executes data queries against any data stored within any of the databases contained within the Radio Network Measurement Data Management System. In one embodiment, the Data Querying Engine is a distributed data querying engine.

The Data Querying Engine is adapted to allow data queries to be executed manually by a user, or that may be executed programmatically by the Radio Network Measurement Data Management System as a timed or automated function, or in response to a trigger event.

In one embodiment, the Data Querying Engine is adapted to provide an inbuilt data query editor that allows authenticated and authorised users to build custom data queries that can be executed against any RF parameter data and any raw RF log file data which the user is authorised to access as required, and that can be persistently stored in personalised query libraries such that a user can access the query at any time and execute any such query against any data stored within the Radio Network Measurement Data Management System that they are authorised to access.

In another embodiment, the Data Querying Engine is adapted to provide a graphical data query building tool that allows authenticated and authorised users to build queries by graphically selecting and linking symbols representing data query and filtering commands or groups of data query and filtering commands, thereby alleviating the need for the user to understand data query and filtering commands and language.

Data returned from the RF Parameter Database by the Data Query Engine in response to a query may be filtered and represented graphically on an appropriately authenticated and authorised user's computing device screen as an overlay on a map or a plan of a building or site; or it may be used to populate a report; or it may be used to populate a file for export from the Radio Network Measurement Data Management System; or it may be combined with other data that may be sourced from the Radio Network Measurement Data Management System or from elsewhere to produce a new dataset.

In another embodiment, the Data Query Engine of the Radio Network Measurement Data Management System comprises one or more different graphical user interfaces to allow appropriately authenticated and authorised users of varying skill levels and access rights to interact with the Radio Network Measurement Data Management System and the data contained in the RF Measurement Data database and the RF Parameter Database. Each graphical user interface comprises a collection of pre-defined data queries; data query editing functions; data visualisation, reporting, and analysis functions; and interactive links and graphical icons that trigger actions that may be invoked by an appropriately authenticated and authorised user. The access control system is used to associate a particular graphical user interface with a particular user or particular group of users. Users with varying technical experience and skills may use graphical user interfaces that are suited to their individual skill and experience level whilst still using and referencing the same RF parameter data, thereby eliminating the contention that arises when different groups of users use and reference different sets of RF parameter data and information.

The Radio Network Measurement Data Management System of a preferred embodiment comprises a geospatial information system (GIS) for storing and managing overlaying GIS data. Overlay GIS data can also be imported into the Radio Network Measurement Data Management System from an external data source. The overlay data may be combined with RF parameter data extracted from the RF Parameter Databases as the result of various queries, so as to produce maps with composite overlays that combine geo-located attributes of the input data sets.

Preferably, the Radio Network Measurement Data Management System is adapted to support the querying of RF parameter data that relates to a given radio network and that has been collected at one or more locations at any two or more points in time. This supports temporal analysis of the RF parameter data, and the identification of changes that have occurred in the RF parameters over time, which may be indicative of certain changes that have occurred over time in that radio network, or of issues that have impacted or are impacting or that may yet impact that radio network. These queries can be used to produce a single consolidated graphical representation of the data matching the query; or to populate a consolidated file for export from the Radio Network Measurement Data Management System or to be combined with other data that may be sourced from the Radio Network Measurement Data Management System or from elsewhere to produce a new dataset. This is an important feature of the present invention.

In one embodiment of the present invention, the Radio Network Measurement Data Management System is adapted to support the querying of RF parameter data that relates to two or more radio networks of the same type, to support comparative benchmarking of different radio services of the same network type. In this way, any combination of RF parameter data pertaining to two or more cellular radio networks; or to two or more cellular radio bands or channels; or to two or more P25 radio networks; or to two or more TETRA radio networks; or to two or more Wi-Fi radio networks; or to two or more LoRA radio networks; or to two or more NB-IoT radio networks; or to two or more CAT-M1/CAT-M2 radio networks may be compared by executing a single query. These queries can be used to produce a single consolidated graphical representation of the data resulting from the query; or to populate a consolidated file for export from the Radio Network Measurement Data Management System or to be combined with other data that may be sourced from the Radio Network Measurement Data Management System or from elsewhere to produce a new dataset. In this way, the coverage and quality of two or more radio networks, or two or more radio network providers' service can be compared and benchmarked. This is an important feature of the present invention.

In another preferred embodiment, the Radio Network Measurement Data Management System is adapted to execute a single query through the Data Query Engine against the RF parameter data that compares multiple radio networks operated by a single network operator to identify areas where that network operator provides no radio coverage or poor-quality radio coverage (areas known as 'black spots'). Additionally, a single query may be executed against the RF parameter data that compares multiple radio networks operated by multiple network operators to identify areas with no overall radio coverage or poor-quality overall radio coverage (areas known as 'no spots'). These queries can be used to produce a single consolidated graphical representation of the data matching the query; or to populate a consolidated file for export from the Radio Network Measurement Data Management System or to be combined with other data that may be sourced from the Radio Network Measurement Data Management System or from elsewhere to produce a new dataset. This is an important feature of the present invention.

Further, the Radio Network Measurement Data Management System may apply a single query to RF parameter data that relates to two or more different types of radio networks at once, to support comparative benchmarking of different radio services of different network types. In this way, any combination of RF parameter data pertaining to one or more cellular radio networks, one or more P25 radio networks, one or more TETRA radio networks, one or more Wi-Fi radio networks, one or more LoRA radio networks, one or more NB-IoT radio networks and one or more CAT-M1/CAT-M2 radio networks may be compared by executing a single query. These queries can be used to produce a single consolidated graphical representation of the data matching the query; or to populate a consolidated file for export from the Radio Network Measurement Data Management System (10) or to be combined with other data that may be sourced from the Radio Network Measurement Data Management System (10) or from elsewhere to produce a new dataset. This is an important feature of the present invention.

Preferably, the Radio Network Measurement Data Management System is adapted to store the raw unfiltered RF Measurement Data persistently in the Radio Network Measurement Data Management System RF Measurement Database, and to cross-reference all data stored within the RF Measurement Database to the corresponding decoded RF parameter data that has been extracted from the RF Measurement Data and stored in the RF Parameter Database. This supports the ready identification and retrieval of the raw RF Measurement Data corresponding to particular RF parameter data.

In one preferred embodiment, the Radio Network Measurement Data Management System comprises a Report Generation Engine adapted to interpret data querying, filtering, analysis and manipulation commands and language contained within report templates and that can be executed against data stored in the RF Parameter Database.

The Report Generation Engine allow reports to be produced manually by a user, or in response to a timed or automated or programmatic function, or in response to a trigger event.

The Report Generation Engine may query any data contained within the RF Parameter Database and collate and format the resulting data into a customised report. In this way, RF parameter data pertaining to multiple types of radio networks, and recorded at any location at any time, can be combined in a single report.

Preferably, the Report Generation Engine is adapted to dynamically adjust the sizes of the images such as building plans and maps to ensure that all images appearing in a given report are of a consistent shape and size. This is an important feature of the present invention.

In another embodiment, the Report Generation Engine is adapted to recursively execute data filtering and output logic so that a particular query can be made to run on the data that results from the output of a preceding query, with no limit as to the number of recursive loops that may be executed. This is an important feature of the present invention.

The Report Generation Engine is capable of only populating a page in a report if data that would populate that page is returned from the query that built that page. Similarly, an element on a report page, such as a table, plot, or graph is only populated and output if data that would populate that element is returned from the query that built that page. In this way, pages that are empty due to null data, or page elements that are empty due to null data are not output in reports. This is an important feature of the present invention.

The Processing Unit supports a variety of data analysis applications that execute a variety of functions using the data stored in the RF Parameter Database.

In one embodiment, the Processing Unit comprises an extensible data analytics engine that can support a wide variety of existing and future data analysis applications. This is an important feature of the present invention.

In one embodiment, a data analysis application is adapted to programmatically determine the location of each radio transmitter in a geographic area in which RF Measurement Data has been collected by a process of triangulation ('RF Transmitter Locator'). This is an important feature of the present invention.

The RF Transmitter Locator may determine the directions of propagation of radio signals in a given area based on an analysis of the RF parameter extracted from RF Measurement Data collected in that area, and therefore derive the locations of each transmitter based on radio propagation paths. The RF Transmitter Locator also identifies the orientation of the individual antennas that constitute a radio transmitter, including the pan and tilt angles of each antenna head. The geographic area in which radio transmitters are to be located can be either defined manually by a user drawing a polygon on a GUI, or can be specified using geographic co-ordinates. This is an important feature of the present invention.

In one embodiment, the RF Transmitter Locator is adapted to provide the identification, location, and real-time or near real-time tracking of rogue transmitters, cell spoofers, or 'IMSI catchers' that seek to emulate a cellular transmitter so as to execute a man-in-the-middle attack on target cellular handsets. This is an important feature of the present invention.

In another embodiment, a data analytics application is adapted to programmatically identify geographic areas impacted by coverage issues that include but are not limited to cell overshooting, shadowing, pilot pollution, congestion, swapped feeders and handover failures ('Coverage Issue Identifier') by searching for RF parameter data patterns that are correlated to each of these issues. The Coverage Issue Identifier then flags issues that it identifies by generating an alert or by outputting a report. This is an important feature of the present invention.

Preferably, the Coverage Issue Identifier is adapted to automatically determine the root cause of each issue identified, and an automatically-derived determination of a recommended rectification approach. In this way, the Radio Network Measurement Data Management System can perform an automated first-pass radio engineering function. This is an important feature of the present invention.

In another embodiment, a data analytics application is adapted to programmatically identify patterns of RF parameter data that are correlated with radio network fault conditions, before such faults actually occur ('Fault Prediction Engine'). Over time, and by analysing greater quantities of RF parameter data the Fault Prediction Engine will also determine when and where such faults are likely to occur. The Fault Prediction Engine then flags probable or possible future fault conditions that it identifies before such faults occur by generating an alert. This is an important feature of the present invention.

In one embodiment, the Radio Network Measurement Data Management System comprises an electromagnetic energy ('EME') analysis application that is adapted to derive electromagnetic energy ('EME') level information from RF power metric data ('EME Analyser'). This is an important feature of the present invention.

The resulting EME level data is stored, represented graphically as map overlays, analysed, and reported upon. Additionally, thresholds for EME levels may be applied by a user or by the Radio Network Measurement Data Management System or by an external system, and comparisons made between derived EME level data and those thresholds to determine whether EME levels at particular locations are within those thresholds. Alerts may be generated if EME levels are found to be outside of the prescribed thresholds. This is an important feature of the present invention.

In one embodiment, the EME Analyser is adapted to discriminate between the EME emitted by different types of radio networks, by different network operators, on different radio technologies, on different radio bands and channels, by different radio transmitters and antennas, and by any combination of network type, network operator, radio technology, radio band or channel, and radio transmitter or antenna. The EME Analyser can also determine EME emitted by a particular type of radio network, and by a particular cellular operator or other radio network operator, and using a particular cellular or other radio technology, and on a particular frequency band or channel, and from a particular transmitter, and from a particular antenna, and on any combination of radio network, radio network operator, radio technology, band or channel, and transmitter or antenna, wherein time-stamped and geo-located EME level data are stored in the RF Parameter Database, and are available to be queried, reported upon, represented as GIS map overlays on GUIs and analysed. This is an important feature of the present invention.

Preferably, the EME Analyser is adapted to determine the cumulative EME levels based on measured data at any geographical location over any user or system-defined time period, wherein the EME Analyser can determine cumulative EME levels emitted over prescribed time periods by a particular type of radio network, by particular cellular operator or other radio network operator, with a particular radio technology, on a particular frequency band or channel, from a particular transmitter, and from a particular antenna, and on any combination of radio network type, radio network operator, radio technology, radio band, or channel, and transmitter or antenna. This is an important feature of the present invention.

In one preferred embodiment, the EME Analyser is adapted to make provision for a user or an Radio Network Measurement Data Management System computer application or process or an external system to specify an EME operating range bound by upper and lower threshold EME values for any specified network operator, any specified radio network, any specified radio technology, any specified radio band or channel, any specified radio transmitter or antenna, or for any combination of specified network operator, specified radio network, specified radio technology, specified radio band or channel, and specified radio transmitter or antenna at a particular geographic location. The geographic area may be defined by a user drawing a polygon representing the boundary of the geographic area of interest on a map displayed on a GUI, or by specifying boundaries using geographic co-ordinates which allows the instantaneous EME level at a particular location and emitted by a particular radio network type, particular network operator, particular radio technology, particular radio transmitter or antenna in a particular radio band or channel to be determined. In another preferred embodiment, the date range may be defined by a user specifying start and end dates which allows the cumulative EME level at a particular location and emitted by a particular radio network type, particular network operator, particular radio technology, particular radio transmitter or antenna in a particular radio band or channel to be determined. This is an important feature of the present invention.

Preferably, the EME Analyser is adapted to present derived EME level data graphically as GIS overlays on maps displayed in GUIs which allow users to query and visualise EME level data and determine whether EME emitted by any combination of radio network type, network operator, radio technology, radio band or channel and radio transmitter or antenna at locations or interest is within prescribed EME levels. This is an important feature of the present invention.

In one embodiment, the EME Analyser is adapted to output derived EME level data in reports produced by a report generator which allows users to generate reports describing EME levels emitted by any combination of radio network type, network operator, radio technology, radio band or channel and radio transmitter or antenna at user-specified geographic locations and over user-specified date ranges.

Although the invention has been described with reference to specific examples, it will be appreciated by those skilled in the art that the invention may be embodied in many other forms, in keeping with the broad principles and the spirit of the invention described herein.

The present invention and the described embodiments specifically include the best method known to the applicant of performing the invention. The present invention and the described preferred embodiments specifically include at least one feature that is industrial applicable.

The invention claimed is:

1. A radio network measurement and monitoring device comprising:

a plurality of removable or fixed network functional modules, wherein each network functional module comprises one or more radio modems or radio transceivers; one or more internal antenna array modules adapted to receive and transmit radio signals; and one or more antenna interface modules and accompanying SMA, SMB, BNC, or similar antenna ports that support the connection of external antennas; and one or more processing units removably connected to the plurality of network functional modules through one or more internal computer expansion buses;

wherein the processing unit is adapted to dynamically reconfigure the plurality of network functional modules for monitoring, testing, and measuring multiple heterogeneous radio communications networks of different types, technologies and modulation schemes, and collecting multiple radio access network parameter measurements from the plurality of network functional modules to produce multiple radio frequency ('RF') log files or data streams containing radio network measurement data; wherein one or more of the cellular radio modems is in the form of discrete cellular, NB-IoT or CAT-M1/CAT-M2 modems, or cellular, NB-IoT or CAT-M1/CAT-M2 modems embedded within 'systems on chip' (SOCs) or 'systems in package' (SIPs) or 'systems on module' (SOM's); and wherein one or more of the radio transceivers is in the form of discrete Wi-Fi, P25, TETRA or LoRA radio transceivers, or Wi-Fi, P25, TETRA or LoRA radio transceivers, each in the form of a software defined radio module (SDR) based radio transceiver, a field programmable gate array (FPGA) based radio transceiver, or an application-specific integrated circuit (ASIC) based radio transceiver.

2. The radio network monitoring device of claim 1, wherein one radio cellular radio modem on one or more of the plurality of network functional modules is adapted to operate as a multi-cellular technology, multi-band capable cellular modem for testing, measuring, and monitoring, and gathering radio network measurement data pertaining to, cellular radio networks.

3. The radio network monitoring device of claim 1, wherein one radio on one or more of the plurality of network functional modules is adapted to operate as a multi-band and multi-channel P25 radio transceiver for testing, measuring, and monitoring, and gathering radio network measurement data pertaining to, P25 radio networks.

4. The radio network monitoring device of claim 1, wherein one radio on one or more of the plurality of network functional modules is adapted to operate as a multi-band and multi-channel TETRA radio transceiver for testing, measuring, and monitoring, and gathering radio network measurement data pertaining to, TETRA radio networks.

5. The radio network monitoring device of claim 1, wherein one radio on one or more of the plurality of network functional modules is adapted to operate as a multi-band and multi-channel Wi-Fi radio transceiver, for testing, measuring, and monitoring, and gathering radio network measurement data pertaining, to Wi-Fi radio networks.

6. The radio network monitoring device of claim 1, wherein one radio on one or more of the plurality of network functional modules is adapted to operate as a multi-band and multi-channel LoRA radio transceiver for testing, measuring, and monitoring, and gathering radio network measurement data pertaining to, LoRA radio networks.

7. The radio network monitoring device of claim 1, wherein one radio modem on one or more of the plurality of network functional modules is adapted to operate as a multi-band and multi-channel capable NB-IoT modem for testing, measuring, and monitoring, and gathering radio network measurement data pertaining to, NB-IoT radio networks.

8. The radio network monitoring device of claim 1, wherein one radio modem on one or more of the plurality of network functional modules is adapted to operate as a multi-band and multi-channel capable CAT-M1/CAT-M2 modem for testing, measuring, and monitoring, and gathering radio network measurement data pertaining to, CAT-M1 and CAY-M2 radio networks.

9. The radio network monitoring device of claim 1, wherein the processing unit comprises one or more central computer processing units for the processing or partial processing of the radio network measurement data that is collected, and the management of the storage and upload of the radio network measurement data to an external Radio Network Measurement Data Management System as RF log files or as streamed data; wherein the processing unit comprises non-volatile data storage to store the radio network measurement data collected during the testing, measuring, and monitoring of radio networks; and further comprising one or more geo-location modules adapted to receive signals from external geo-location, positioning, or navigation systems such as GPS, GLONASS, Galileo, BeiDou, NavIC, and QZSS for use in establishing the current geographic location of the radio network monitoring device at the locations at which radio networks are being tested, measured, or monitored, and so that all radio network measurement data recorded can be associated with accurate geographic location data; further comprising non-volatile data storage for storing radio network measurement data in a journaling format to a fault-tolerant file structure; further comprising one or more internal power sources, and which additionally supports connection to external electrical power sources if required.

10. The radio network monitoring device of claim 1, wherein the processing unit is adapted to be programmatically configured to repeatedly or singularly execute specific tests of multiple radio networks according to sequenced test steps that are stored in user-configurable test scripts, including but not limited to, placing voice calls, and downloading data from specific servers so that the radio network monitoring device can measure the effects of the tests on the radio networks being tested, and collect corresponding radio network measurement data; and wherein the processing unit is adapted to execute test scripts separately and concurrently on each of the plurality of removable network functional modules, so as to simultaneously measure multiple instances of multiple heterogeneous radio networks of multiple types, technologies, and modulation schemes; and wherein the processing unit is adapted to connect to a user device or external computing system for monitoring and managing the plurality of removable network functional modules whilst collecting radio network measurement data during an RF walk or RF drive test in real time; and wherein the processing unit has a communication module to connect to a user device or external computing system remotely via wireless connection for periodically or continuously determining the status of the radio network monitoring device and of the measurements being made; and wherein the processing unit is adapted to analyse the radio network measurement data.

11. The radio network monitoring device of claim 1, wherein the processing unit has a communication module to connect to a user device or external computing system remotely via wireless connection for periodically or continuously determining the status of the radio network monitoring device and of the measurements being made; wherein the processing unit is adapted to provide remote procedure call or similar programmatic support for users or external computing systems so that the configuration and operation of the plurality of removable network functional modules, and the test cases thereof, may be altered remotely; and wherein the processing unit is adapted to provide remote procedure call or similar programmatic support for users or external computing systems so that the radio network monitoring device may be dynamically configured so as to store radio network measurement data in the device's internal data storage until such time that the radio network monitoring device is automatically or programmatically or manually triggered to download the stored data to an external Radio Network Measurement Data Management System; or to continuously or periodically upload the radio network measurement data to an external Radio Network Measurement Data Management System in real time or near real time whilst the radio network measurement data is being collected.

12. The radio network monitoring device of claim 1, wherein the processing unit is adapted to provide remote procedure call or similar programmatic support for users or external computing systems so that the radio network monitoring device may be dynamically configured so as to store radio network measurement data in the device's internal data storage until such time that the radio network monitoring device is automatically or programmatically or manually triggered to download the stored data to an external Radio Network Measurement Data Management System; or to continuously or periodically upload the radio network measurement data to an external Radio Network Measurement Data Management System in real time or near real time whilst the radio network measurement data is being collected; wherein the processing unit is adapted to automatically detect data connectivity to an internet-connected host computing device, and automatically upload the radio network measurement data accumulated in the data storage to the external Radio Network Measurement Data Management System via that internet-connected host computing device.

13. The radio network monitoring device of claim 1, wherein the radio antennas are configured and positioned such that the deleterious effects of absorption of received and transmitted radio signals by an external object are minimised or eliminated so as to ensure that the radio network measurement data collected is true and correct, and that the need to apply adjustments to the data to compensate for the attenuation of received radio signals caused by such absorption is eliminated.

14. The radio network monitoring device of claim 1, wherein the radio network monitoring device can be carried in a complementary engineered vehicle roof-mounted rack that accommodates one or more radio network monitoring devices for RF drive testing and that is adapted to locate the radio network monitoring device's radio antennas such that the effects of absorption of received and transmitted radio signals by the vehicle are minimised or eliminated to ensure that the radio network measurement data collected during the drive test is true and correct and does not require compensation to be applied after the RF drive test to correct the radio network measurement data; and wherein an enclosure adapted to be removably secured to vehicles in a vehicle rooftop box, pod, or rooftop cargo carrier where the radio network monitoring device's antennas are located such that the deleterious effects of absorption of received and transmitted radio signals by the vehicle are minimised to ensure that the radio network measurement data collected are true and correct, and that the need to apply adjustments to the data to compensate for the attenuation of received radio signals caused by such absorption is eliminated.

15. The radio network monitoring device of claim 1, wherein the radio network monitoring device is adapted to automatically and continuously track the location and progress of an RF walk test using the output of a combination of sensors, including but not limited to, compasses, gyroscopes, accelerometers, barometers, gravitational, inertial, and visual odometry sensors carried by the walk tester; and that automatically associates the decoded output of the sensors as location data that is automatically associated with corresponding radio network measurement data to ensure that the radio network measurement data is automatically and correctly located relative to the plan of the site being tested within the RF log file; and wherein the processing unit is adapted to embed an image of a plan of a site at which radio networks are being walk tested into each of the RF log files produced to ensure that the correct plan image is persistently associated with the corresponding RF log files produced, thereby eliminating the possibility of an error in manually associating the correct plan image with the corresponding RF log file after an RF walk test is completed.

16. The radio network monitoring device of claim 15, wherein the processing unit is adapted to operate with a set of zoomable Slippy Maps covering one or more countries or part thereof in the radio network monitoring device's non-volatile data store, thereby eliminating the requirement that the radio network monitoring device be connected to the internet to access or retrieve remote mapping data whilst operating during a drive test; and with an associated method of storing all vector map data such that the maps can be retrieved and rendered locally on the radio network monitoring device without requiring access to external servers or resources, thereby reducing CPU load and processing time; wherein the processing unit can be programmatically configured to enable zero-touch operation and therefore fully automated and autonomous measurement of multiple instances of multiple heterogeneous radio networks, and the gathering and analysis of radio network measurement data, eliminating any requirement for the radio network monitoring device to be actively monitored or managed by a user during its operation; and wherein the radio network monitoring device can be configured to enable zero-touch operation and therefore fully automated and autonomous measurement of multiple instances of multiple heterogeneous radio networks; fully automated and autonomous execution of scripted tests of radio networks; fully automated and autonomous gathering of radio network measurement data; and fully automated and autonomous uploading of collected radio network measurement data to the external Radio Network Measurement Data Management System in real-time or near real-time as the radio network measurement data is collected, or in batch mode in response to a timed or programmatic or manually-triggered event, or when the radio network monitoring device automatically detects an internet-connected host computing device; thereby supporting the frequent testing, measurement, and monitoring of multiple instances of multiple heterogeneous radio networks over large geographic areas by deploying radio network monitoring devices on fleet vehicles, including but not limited to, those operated by postal and parcel/mail delivery operators, waste collection and disposal companies, taxi, and ride share providers and by and on behalf of government agencies and departments such as those providing first responder and emergency services response services.

17. The radio network monitoring device of claim 1, wherein the radio network monitoring device can be configured to operate as a scanning radio receiver, and automatically scan all discrete radio frequencies within a user or remote computing system-defined portion of the radio spectrum, stopping on any discrete frequency within that portion of the radio spectrum when it identifies a signal, recording some RF parameter measurements pertaining to the identified signal, then continuing to scan other remaining frequencies within that portion of the radio spectrum; and continuously repeating that same scanning process for that user or remote computing system-defined portion of the radio spectrum until it is stopped by user intervention or a timed or programmatic event, wherein the radio network monitoring device is capable of automatically determining which radio frequencies or bands are being utilised by different radio networks, and determining whether any radio interference exists, and wherein when radio interference does exist, the radio network monitoring device is capable of collecting radio measurement data and determining the characteristics of detected interference.

18. The radio network monitoring device of claim 1, wherein the radio network monitoring device's Wi-Fi network module can be configured to promiscuously measure all available Wi-Fi channels concurrently so as to identify all access points and client devices and their relationships, allowing the complete state of the entire Wi-Fi spectrum to be measured and understood, including the number and types of client devices attached to a given Wi-Fi channel and Wi-Fi access point at a given time and location; and the extent of the congestion on each Wi-Fi channel and Wi-Fi access point at a given time and location.

19. The radio network monitoring device of claim 1, wherein the processing unit is adapted to be remotely administered by an external Radio Network Measurement Data Management System; wherein the processing unit is adapted to forward radio network measurement data in real time or near real time or periodically in batch mode in response to user or programmatic requests to an external Radio Network Measurement Data Management System via an application programming interface (API), or as a data payload in a flow-based message or data stream that uses a protocol such as NetFlow, sFlow, jFlow, or IPFIX, or similar data communication format, where the radio network measurement data can be stored indefinitely, and where all RF parameter data extracted from the radio network measurement data can be stored indefinitely, and which supports the processing, querying, visualisation, reporting, and both temporal and point-in-time analysis of all stored data by users of the Radio Network Measurement Data Management System, or by data analysis applications supported by the Radio Network Measurement Data Management System, or by other external computing servers or systems.

20. The radio network monitoring device of claim 19, wherein the processing unit is adapted to automatically self-organise into a mesh network, utilising either wireless or Ethernet connections to enable multiple radio network monitoring devices to becomes nodes within a localised mesh network such that if one or more individual radio network monitoring devices lose the ability to communicate with users or with the Radio Network Measurement Data Management System via default cellular, Wi-Fi or wired connection routes, the affected radio network monitoring devices can transmit alerts or radio network measurement data or other data payloads via the mesh network to other local radio network monitoring devices in that mesh network until the alerts or radio network measurement data or other data payloads reach a radio network monitoring device that is able to establish a wireless or Ethernet or other connection to the internet, therefore allowing the alerts or radio network measurement data or other data payload to reach a user or an external Radio Network Measurement Data Management System; and wherein the processing unit is adapted to periodically or continuously monitor and measure electromagnetic energy (EME) levels, or to periodically or continuously derive EME levels from measured RF parameters associated with one or more radio network operators, radio networks, radio technologies, radio bands, or radio channels, or that are associated with any combination of radio network operator, radio network, radio technology, radio band and radio channel, record corresponding EME data and forward that data to an external Radio Network Measurement Data Management System for processing, storage, analysis and determination of whether user-defined or programmatically derived instantaneous or cumulative EME threshold levels for one or more radio network operator, radio network, radio technology, radio band, or radio channel, or any combination of radio network operator, radio network, radio technology, radio band and radio channel have been exceeded, and to automatically generate an alert if an instantaneous or cumulative EME level threshold is exceeded.

* * * * *